US010430066B2

(12) United States Patent
Ludwig et al.

(10) Patent No.: US 10,430,066 B2
(45) Date of Patent: Oct. 1, 2019

(54) GESTEME (GESTURE PRIMITIVE) RECOGNITION FOR ADVANCED TOUCH USER INTERFACES

(71) Applicant: Lester F. Ludwig, Belmont, CA (US)

(72) Inventors: Lester F. Ludwig, San Antonio, TX (US); Vadim Zaliva, Saratoga, CA (US)

(73) Assignee: NRI R&D PATENT LICENSING, LLC, San Antonio, TX (US)

( * ) Notice: Subject to any disclaimer, the term of this patent is extended or adjusted under 35 U.S.C. 154(b) by 0 days.

(21) Appl. No.: 13/707,518

(22) Filed: Dec. 6, 2012

(65) Prior Publication Data

US 2013/0141375 A1    Jun. 6, 2013

Related U.S. Application Data

(60) Provisional application No. 61/567,626, filed on Dec. 6, 2011.

(51) Int. Cl.
*G06F 3/041*     (2006.01)
*G06K 9/00*     (2006.01)
(Continued)

(52) U.S. Cl.
CPC .......... *G06F 3/0488* (2013.01); *G06F 3/017* (2013.01); *G06F 3/0416* (2013.01); *G06F 3/04883* (2013.01)

(58) Field of Classification Search
CPC ..... G06F 7/04; G06F 3/00; G06F 3/01; G06F 3/033; G06F 3/041; G06F 3/044; (Continued)

(56) References Cited

U.S. PATENT DOCUMENTS 4,748,676 A    5/1988 Miyagawa
4,899,137 A    2/1990 Behrens et al.
(Continued)

FOREIGN PATENT DOCUMENTS

EP    0 574 213 B1    12/1993

OTHER PUBLICATIONS

Viberg, M., Subspace Fitting Concepts in Sensor Array Processing, Department of Electrical Engineering, Linkoping University, 1989, Sweden, 15 pgs.

(Continued)

*Primary Examiner* — Chanh D Nguyen
*Assistant Examiner* — Nguyen H Truong
(74) *Attorney, Agent, or Firm* — Procopio, Cory, Hargreaves & Savitch LLP

(57) ABSTRACT

This invention relates to signal space architectures for generalized gesture capture. Embodiments of the invention includes a gesture-primitive approach involving families of "gesteme" from which gestures can be constructed, recognized, and modulated via prosody operations. Gestemes can be associated with signals in a signal space. Prosody operations can include temporal execution modulation, shape modulation, and modulations of other aspects of gestures and gestemes. The approaches can be used for advanced touch user interfaces such as High-Dimensional Touch Pad (HDTP) in touchpad and touchscreen forms, video camera hand-gesture user interfaces, eye-tracking user interfaces, etc.

24 Claims, 57 Drawing Sheets

(51) Int. Cl.
*G06F 3/0488* (2013.01)
*G06F 3/01* (2006.01)

(58) Field of Classification Search
CPC ........ G06F 3/048; G06F 3/0488; G06F 17/00;
G06F 17/60; G06F 7/00; G06F 12/14;
G06F 9/72; G06F 19/00; G06F 17/30;
G06F 3/0304; G06F 3/14; G06F 1/32;
G06F 21/22; G06T 11/20; G09G 5/00;
G09G 5/08; G06K 9/00; G06K 9/18;
G06K 9/46; G06K 9/62; A63F 9/24;
G10L 13/00; H04L 9/32; G06Q 40/00
USPC .................... 345/156–184; 178/18.01–20.04
See application file for complete search history.

(56) References Cited

U.S. PATENT DOCUMENTS

| | | |
|---|---|---|
| 5,237,647 A | 8/1993 | Roberts et al. |
| 5,270,711 A | 12/1993 | Knapp |
| 5,292,999 A | 3/1994 | Tumura |
| 5,341,133 A | 8/1994 | Savoy |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,577,135 A * | 11/1996 | Grajski ............... G06K 9/00422 382/187 |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,786,540 A | 7/1998 | Westlund |
| 5,763,806 A | 8/1998 | Willis |
| 5,801,340 A | 9/1998 | Peter |
| 5,805,137 A | 9/1998 | Yasutake |
| 5,809,267 A * | 9/1998 | Moran ................. G06F 3/04883 715/863 |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 | 6/2002 | Senior |
| 6,404,898 B1 | 6/2002 | Rhoads |
| 6,408,087 B1 | 6/2002 | Kramer |
| 6,570,078 B2 | 5/2003 | Ludwig |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2005/0222848 A1* | 10/2005 | Napper et al. ............... 705/1 |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1 | 10/2007 | Ludwig |
| 2007/0263932 A1* | 11/2007 | Bernardin ............ G06F 3/0416 382/187 |
| 2008/0010616 A1 | 1/2008 | Algreatly |
| 2008/0143690 A1 | 6/2008 | Jang |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2009/0284482 A1* | 11/2009 | Chin .................. G06F 3/04883 345/173 |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1* | 5/2010 | Lim ............................ 345/173 |
| 2010/0117978 A1 | 5/2010 | Shirado |
| 2010/0127991 A1* | 5/2010 | Yee .................... G06K 9/00422 345/173 |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0262905 A1* | 10/2010 | Li ................................ 715/702 |
| 2010/0283742 A1* | 11/2010 | Lam .................... G06F 3/04883 345/173 |
| 2010/0289754 A1 | 11/2010 | Sleeman et al. |
| 2010/0302172 A1 | 12/2010 | Wilairat |
| 2010/0306698 A1* | 12/2010 | Sellers .................. G06F 17/241 715/805 |
| 2010/0328032 A1 | 12/2010 | Rofougaran |
| 2011/0007000 A1 | 1/2011 | Lim |
| 2011/0037735 A1 | 2/2011 | Land |
| 2011/0063251 A1 | 3/2011 | Geaghan |

(56) References Cited

U.S. PATENT DOCUMENTS

| | | | |
|---|---|---|---|
| 2011/0066984 A1* | 3/2011 | Li | G06F 3/04883 |
| | | | 715/863 |
| 2011/0086706 A1 | 4/2011 | Zalewski | |
| 2011/0154268 A1* | 6/2011 | Trent, Jr. | G06F 3/04883 |
| | | | 715/863 |
| 2011/0202889 A1 | 8/2011 | Ludwig | |
| 2011/0202934 A1 | 8/2011 | Ludwig | |
| 2011/0260829 A1* | 10/2011 | Lee | G06F 3/0414 |
| | | | 340/5.51 |
| 2011/0260998 A1 | 10/2011 | Ludwig | |
| 2011/0261049 A1 | 10/2011 | Cardno et al. | |
| 2011/0282785 A1* | 11/2011 | Chin | G06F 3/04883 |
| | | | 705/42 |
| 2011/0285648 A1 | 11/2011 | Simon et al. | |
| 2012/0007821 A1 | 1/2012 | Zaliva | |
| 2012/0034978 A1 | 2/2012 | Lim | |
| 2012/0056846 A1 | 3/2012 | Zaliva | |
| 2012/0066650 A1* | 3/2012 | Tirpak | G06F 21/46 |
| | | | 715/863 |
| 2012/0194461 A1 | 4/2012 | Lim | |
| 2012/0108323 A1 | 5/2012 | Kelly et al. | |
| 2012/0126940 A1* | 5/2012 | Coggill | G06F 21/36 |
| | | | 340/5.54 |
| 2012/0192119 A1 | 7/2012 | Zaliva | |
| 2012/0194462 A1 | 8/2012 | Lim | |
| 2012/0195522 A1 | 8/2012 | Ludwig | |
| 2012/0223903 A1 | 9/2012 | Ludwig | |
| 2012/0235940 A1 | 9/2012 | Ludwig | |
| 2012/0262401 A1 | 10/2012 | Rofougaran | |
| 2012/0280927 A1 | 11/2012 | Ludwig | |
| 2012/0317521 A1 | 12/2012 | Ludwig | |
| 2013/0009896 A1 | 1/2013 | Zaliva | |
| 2013/0038554 A1 | 2/2013 | West | |

OTHER PUBLICATIONS

Moog, R. A., The Human Finger—A Versatile Electronic Music Instrument Component, Audio Engineering Society Preprint, 1977, New York, NY, 4 pgs.

Johnson, C., Image sensor tracks moving objects in hardware, Electronic Engineering Times, Apr. 5, 1999, 1 pg.

Kaoss pad dynamic effect/controller, Korg Proview Users' magazine Summer 1999, 2 pgs.

Leiberman, D., Touch screens extend grasp Into consumer realm, Electronic Engineering Times, Feb. 8, 1999.

Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.

Pennywitt, K., Robotic Tactile Sensing, Byte, Jan. 1986, 14 pgs.

Review of Korg X-230 Drum (later called Wave Drum), Electronic Musician, Apr. 1994, 1 pg.

Rich, R., Buchla Lightning MIDI Controller, Electronic Musician, Oct. 1991, 5 pgs.

Rich, R., Buchla Thunder, Electronic Musician, Aug. 1990, 4 pgs.

Dario P., et al., Tactile sensors and the gripping challenge, IEEE Spectrum, vol. 5, No. 22, Aug. 1985, pp. 46-52.

Snell, J. M., Sensors for Playing Computer Music with Expression, Proceedings of the Intl. Computer Music Conf. at Eastman, 1983, pp. 113-126.

Verner J., Artif Starr Switch Company Ztar 624-D, Electronic Musician, Nov. 1994, 5 pgs.

Haken, L., An Indiscrete Music Keyboard, Computer Music Journal, Spring 1998, pp. 30-48.

USPTO Notice of Allowance dated May 8, 2013 issued in U.S. Appl. No. 12/541,948, filed Aug. 15, 2009.

Buxton, W. A. S., Two-Handed Document Navigation, Xerox Disclosure Journal, 19(2), Mar.-Apr. 1994 [online] [retreived on May 28, 2013] URL: http://www.billbuxton.com/2Hnavigation.html, pp. 103-108.

USPTO Notice of Allowance dated Mar. 20, 2012 issued in U.S. Appl. No. 12/724,413, filed Mar. 15, 2010.

USPTO Notice of Allowance dated Jan. 10, 2008 issued in U.S. Appl. No. 10/683,914, filed Oct. 10, 2003.

USPTO Notice of Allowance dated Nov. 9, 2012 issued in U.S. Appl. No. 12/502,230, filed Jul. 13, 2009.

USPTO Notice of Allowance dated Mar. 12, 2012 issued in U.S. Appl. No. 12/511,930, filed Jul. 29, 2009.

USPTO Notice of Allowance dated May 16, 2013 issued in U.S. Appl. No. 13/441,842, filed Apr. 7, 2012.

USPTO Notice of Allowance dated May 24, 2013 issued in U.S. Appl. No. 13/442,815, filed Apr. 9, 2012.

USPTO Notice of Allowance dated Dec. 24, 2002 issued in U.S. Appl. No. 09/812,870, filed Mar. 19, 2001.

Otsu's method, [online] [retrieved on Jun. 26, 2013] URL: http://en.wikipedia.org/wiki/Otsu_method, Sep. 13, 2010, 2 pgs.

Principal component analysis, [online] [retrieved on Jun. 26, 2013] URL: http://en.wikipedia.org/wiki/Principal_component_analysis, Feb. 25, 2011, 9 pgs.

USPTO Notice of Allowance dated May 30, 2013 issued in U.S. Appl. No. 13/442,806, filed Apr. 9, 2012.

DIY Touchscreen Analysis, MOTO, [online] [retrieved on May 12, 2013] URL: http://labs.moto.com/diy-touchscreen-analysis/, Jul. 15, 2010, 23 pgs.

Wilson, T.V., How the iPhone Works, howstuffworks, [online] [retrieved on May 12, 2013] URL: http://electronics.howstuffworks.com/iphone2.htm, Jan. 8, 2011, 11 pgs.

Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.

Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.

Roberts Cross, [online] [retrieved on May 12, 2013] URL: http://en.wikipedia.org/wiki/Roberts_Cross, Jul. 20, 2010, visited Feb. 28, 2011, 3 pgs.

Sobel Operator, [online] [retrieved on May 12, 2013] URL: http://en.wikipedia.org/wiki/Sobel_operator, Mar. 12, 2010, visited Feb. 28, 2011, 5 pgs.

Prewitt, [online] [retrieved on May 12, 2013] URL: http://en.wikipedia.org/wiki/Prewitt, Mar. 15, 2010, visited Feb. 28, 2011, 2 pgs.

Coefficient of variation, [online] [retrieved on May 12, 2013] URL: http://en.wikipedia.org/wiki/Coefficient_of_variation, Feb. 15, 2010, visited Feb. 28, 2011, 2 pgs.

Canny edge detector, [online] [retrieved on May 12, 2013] http://en.wikipedia.org/wiki/Canny_edge_detector, Mar. 5, 2010, 4 pgs.

Polynomial regression, [online] [retrieved on May 12, 2013] URL: http://en.wikipedia.org/wiki/Polynomial_regression, Jul. 24, 2010, 4 pgs.

Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en.

Osian, M., et. al., Fitting Superellipses to Incomplete Contours, IEEE Computer Society Conference on Computer Vision and Pattern Recognition Workshops (CVPRW '04), Jun. 2004, 8 pgs.

Hough transform, [online] [retrieved on Feb. 13, 2010] URL: http://en.wikipedia.org/wiki/Hough_transform, Feb. 13, 2010, 7 pgs.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors,Sensor Products LLC, Oct. 26, 2006, [online] [retrieved on Aug. 6, 2013] URL: http://www.sensorprod.com, 2 pgs.

Pressure Profile Systems, Jan. 29, 2011, [online] [retrieved on Jan. 29, 2011] URL: http://www.pressureprofile.com, 1 pg.

Xsensor Technology Corporation, Feb. 7, 2011, [online] [retrieved on May 12, 2013] URL: http://www.xsensor.com, 1 pg.

(56) References Cited

OTHER PUBLICATIONS

Balda AG, Feb. 26, 2011, [online] [retrieved on May 12, 2013] URL: http://www.balda.de, 1 pg.

Cypress Semiconductor, Feb. 28, 2011, [online] [retrieved on May 12, 2013] URL: http://www.cypress.com, 1 pg.

Synaptics, Jan. 28, 2011, [online] [retrieved on May 12, 2013] URL: http://www.synaptics.com, 1 pg.

Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.

Davis, R. C., et al., NotePals: Lightweight Note Taking by the Group, for the Group, University of California, Berkeley, Computer Science Division, 1998, 8 pgs.

Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.

Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.

VeriFinger Information, [online] [retrieved on Jun. 11, 2013] URL: http://www.fingerprint-it.com/_sol_verifinger.html, 2 pgs.

Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.

Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.

Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.

Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.

Image moment, Jul. 12, 2010, 3 pgs, [online] [retrieved on Jun. 13, 2013] URL: http://en.wikipedia.org/wiki/Image_moment.

Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.

Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.

Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.

Bishop, C.M., Pattern Recognition and Machine Learning, Springer New York, 2006, pp. 561-593.

Euler Angles, 2011, [online] [retrieved on Jun. 30, 2011] URL: http://en.wikipedia.org/w/index.php?title=Euler_angles&oldid=436460926, 8 pgs.

Electronic Statistics Textbook, StatSoft, Inc., 2011, [online] [retrieved on Jul. 1, 2011] URL: http://www.statsoft.com/textbook, 1 pg.

Central Moment, Dec. 16, 2009, [online] [retrieved on Oct. 26, 2010] URL: http://en.wikipedia.org/w/index.php?title=Central_moment&oldid=332048374.

Local regression, Nov. 16, 2010, [online] [retrieved on Jun. 28, 2011] URL: http://en.wikipedia.org/w/index.php?title=Local_regression&oldid=416762287.

USPTO Notice of Allowance dated Jun. 6, 2013 issued in U.S. Appl. No. 13/846,830, filed Mar. 18, 2013.

Hernandez-Leon, R., et al., Classifying using Specific Rules with High Confidence, 9th Mexican International Conference on Artificial Intelligence, IEEE, Nov. 2010, pp. 75-80.

Fang, Y., et al., Dynamics of a Winner-Take-All Neural Network, Neural Networks, 9(7), Oct. 1996, pp. 1141-1154.

* cited by examiner

— PRIOR ART —

— PRIOR ART —

— PRIOR ART —

Position
Information

{x, y, p} and/or

{Δx, Δy, Δp} together
with

Angle
Information

{φ, ψ, θ} and/or

{Δφ, Δψ, Δθ}

Example:

{Δx, Δy, Δp, φ, ψ, θ, Δφ, Δψ, Δθ}

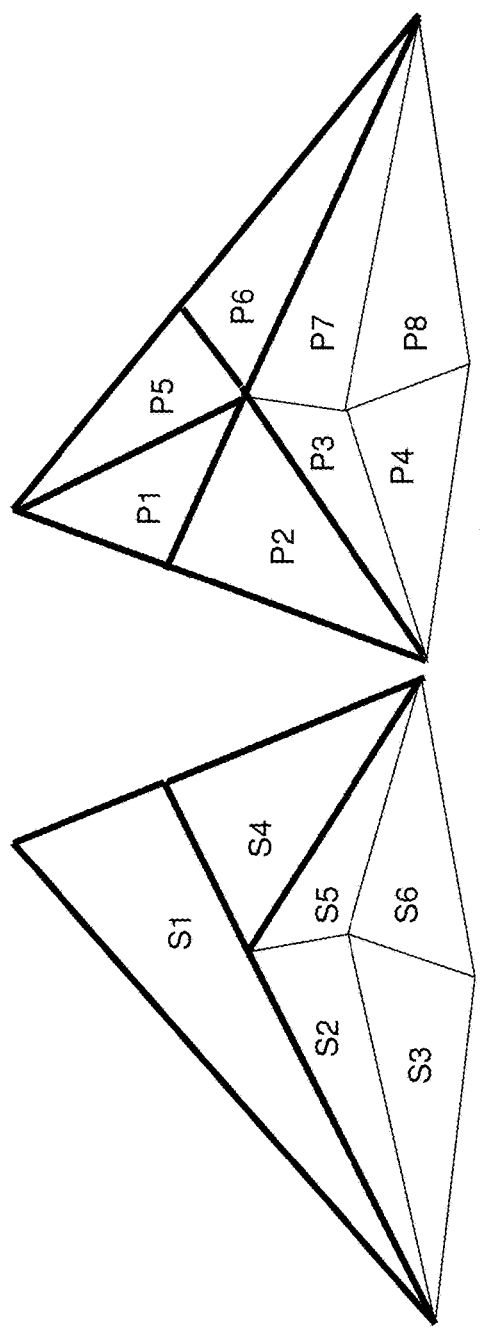
FIG. 41b
FIG. 41a
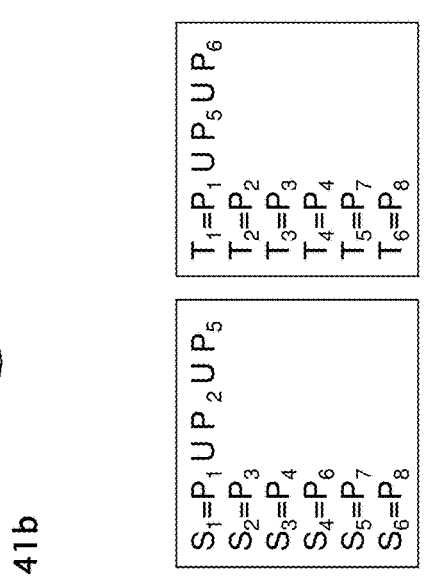
$S_1 = P_1 \cup P_2 \cup P_5$
$S_2 = P_3$
$S_3 = P_4$
$S_4 = P_6$
$S_5 = P_7$
$S_6 = P_8$
$T_1 = P_1 \cup P_5 \cup P_6$
$T_2 = P_2$
$T_3 = P_3$
$T_4 = P_4$
$T_5 = P_7$
$T_6 = P_8$
FIG. 41d
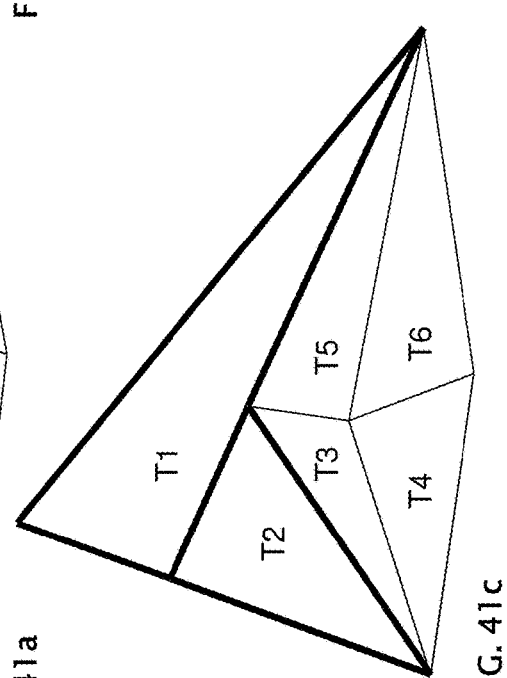
FIG. 41c

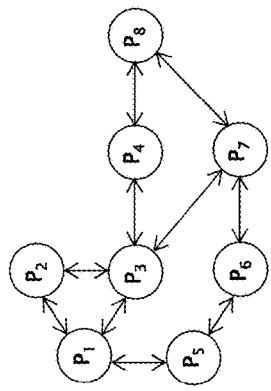
FIG. 43c
FIG. 44c
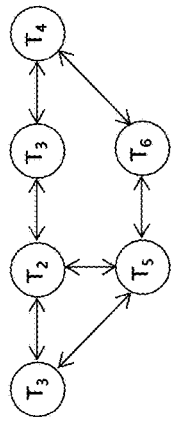
FIG. 43b
FIG. 44b
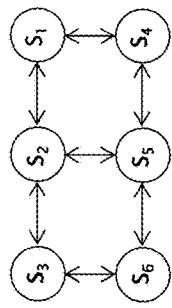
FIG. 43a
FIG. 44a

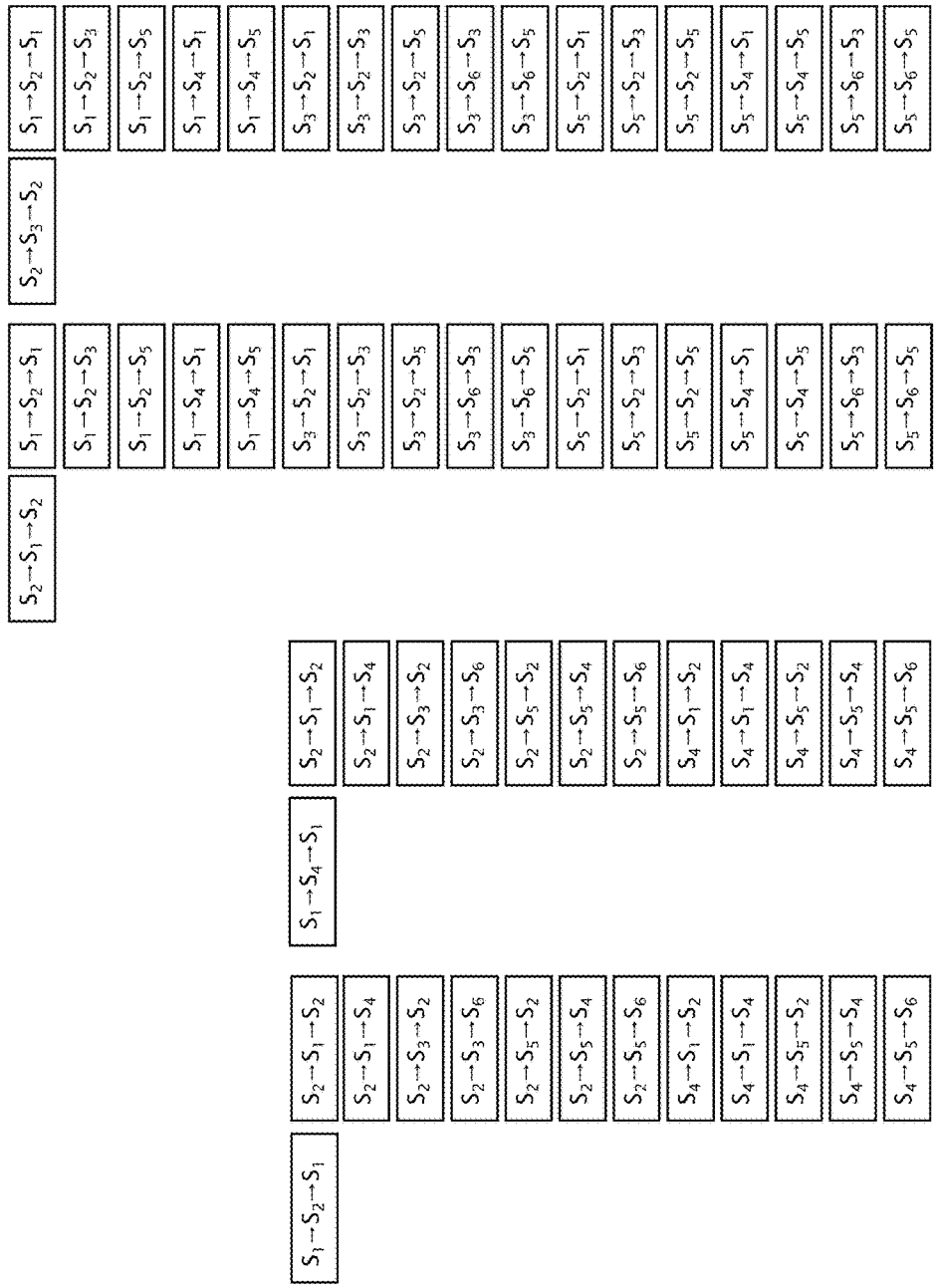

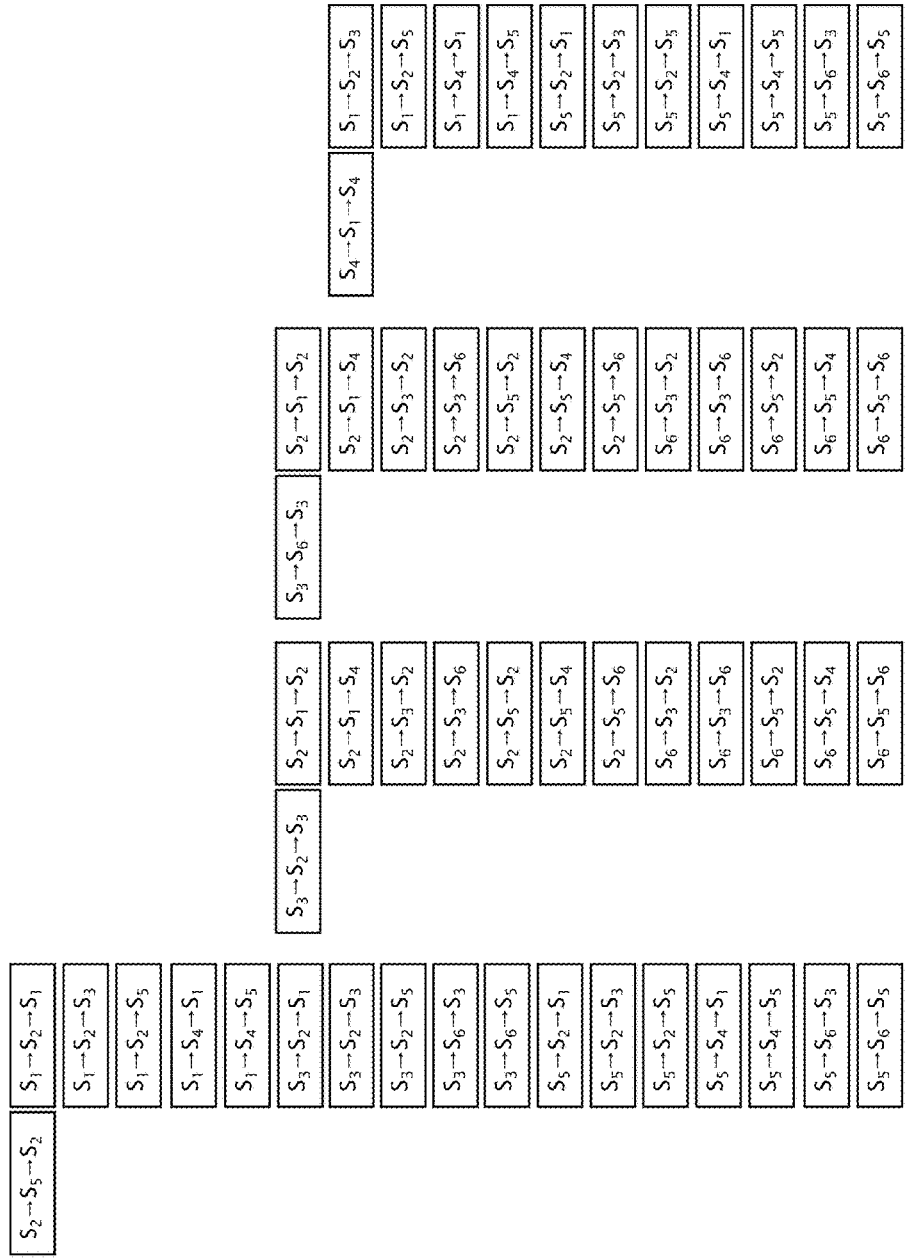

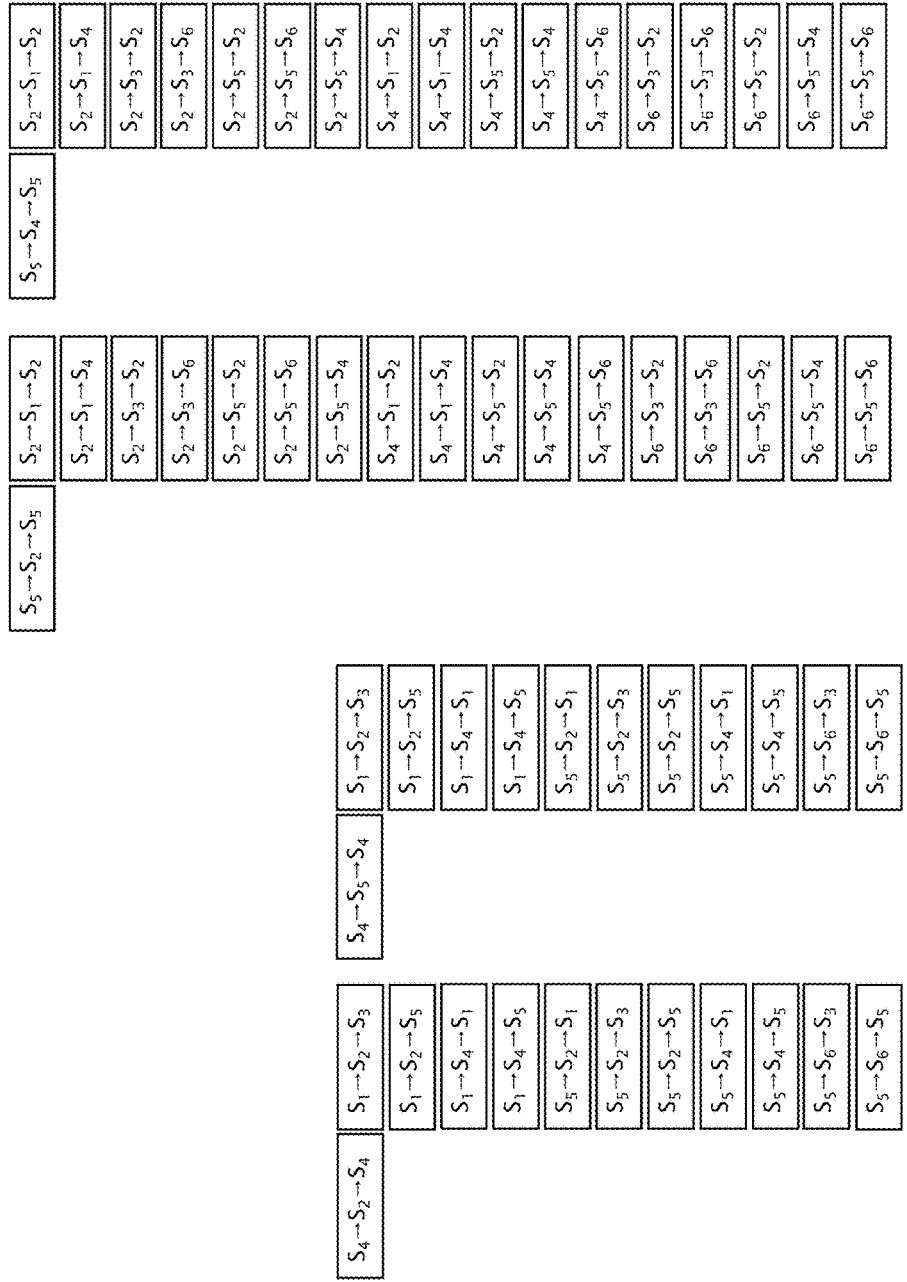

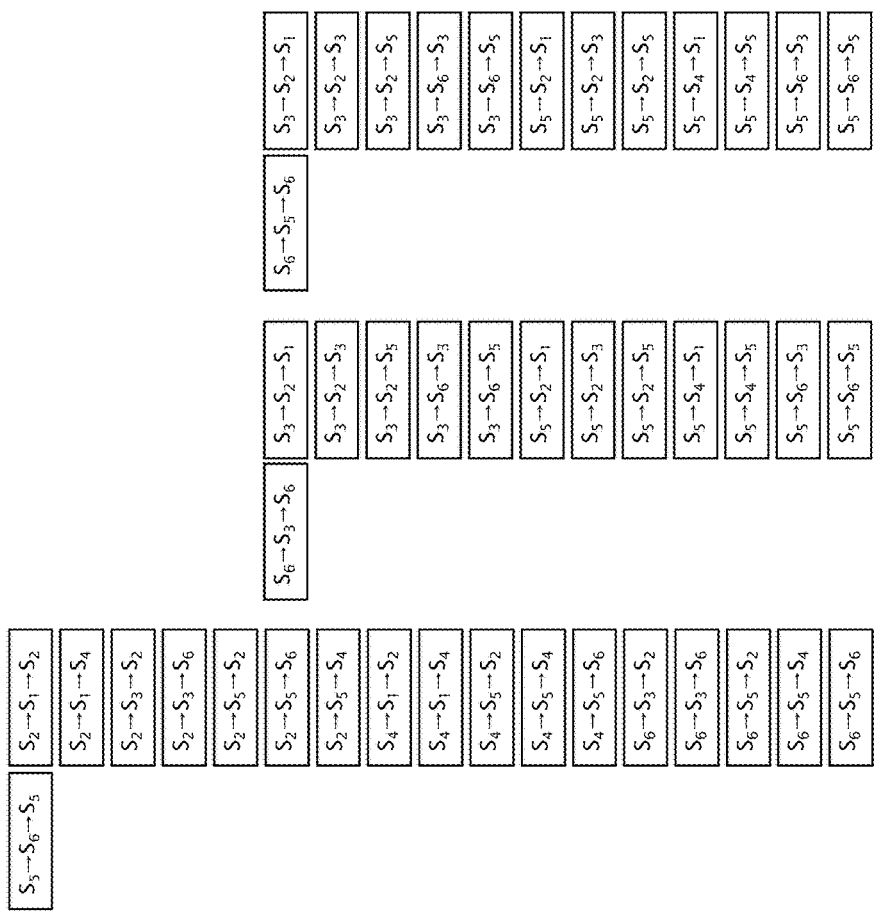

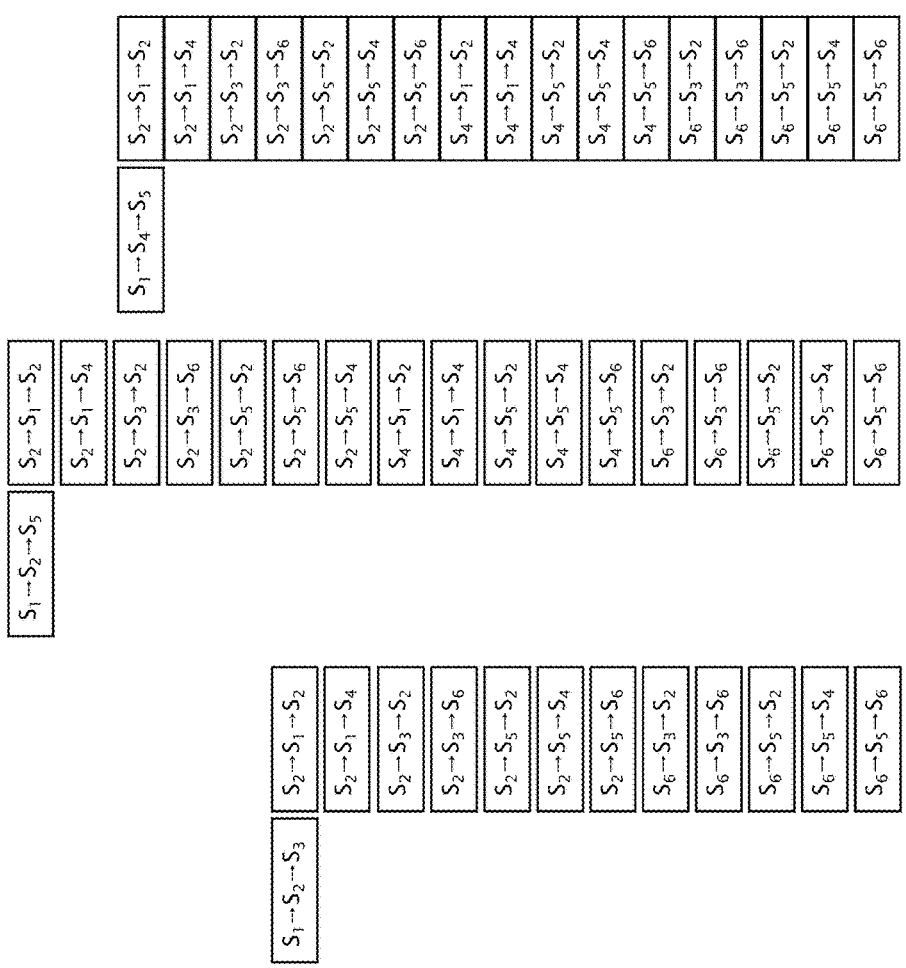

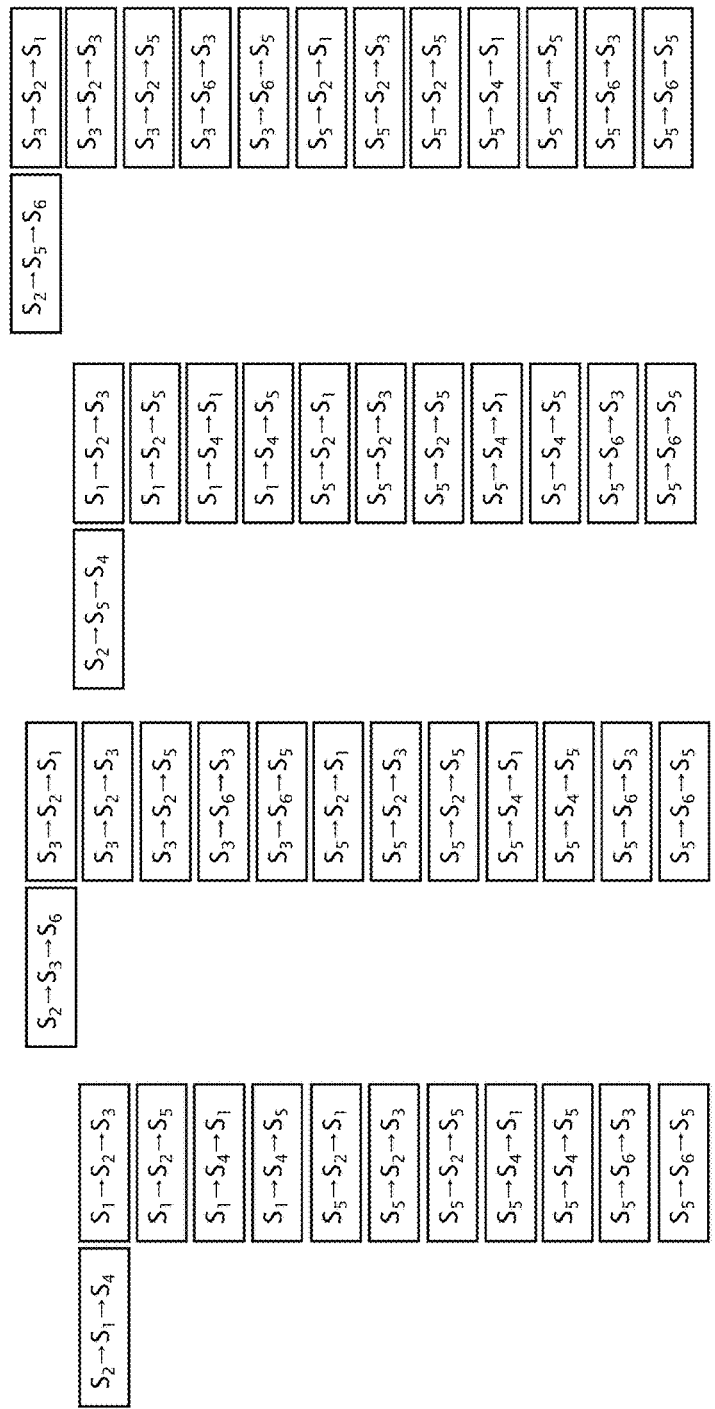

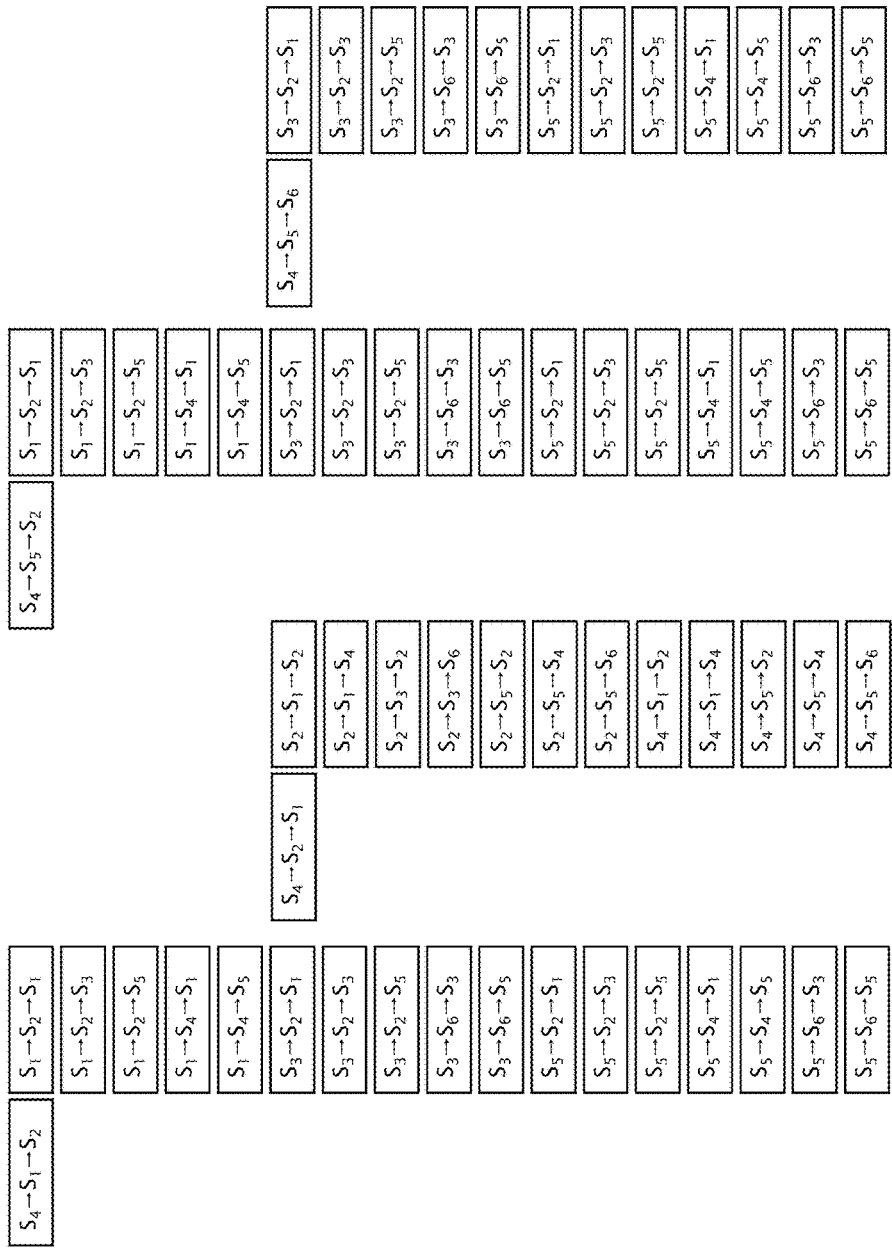

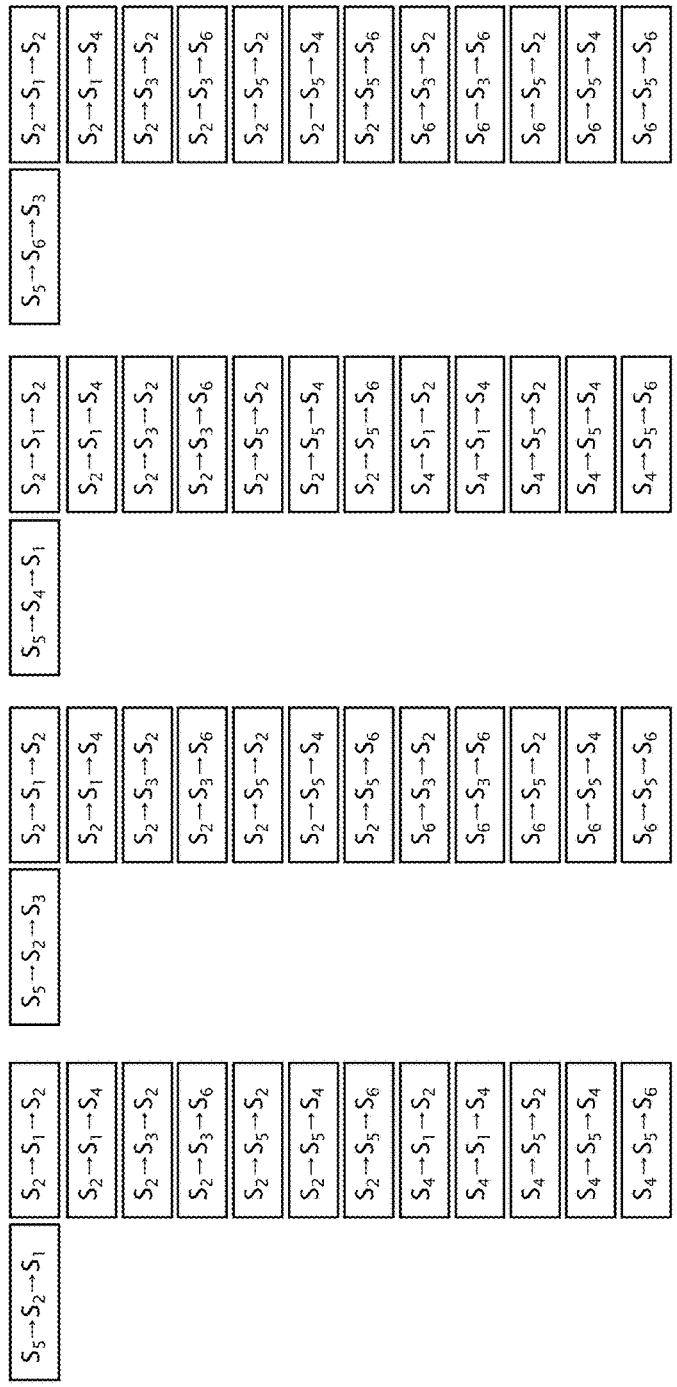

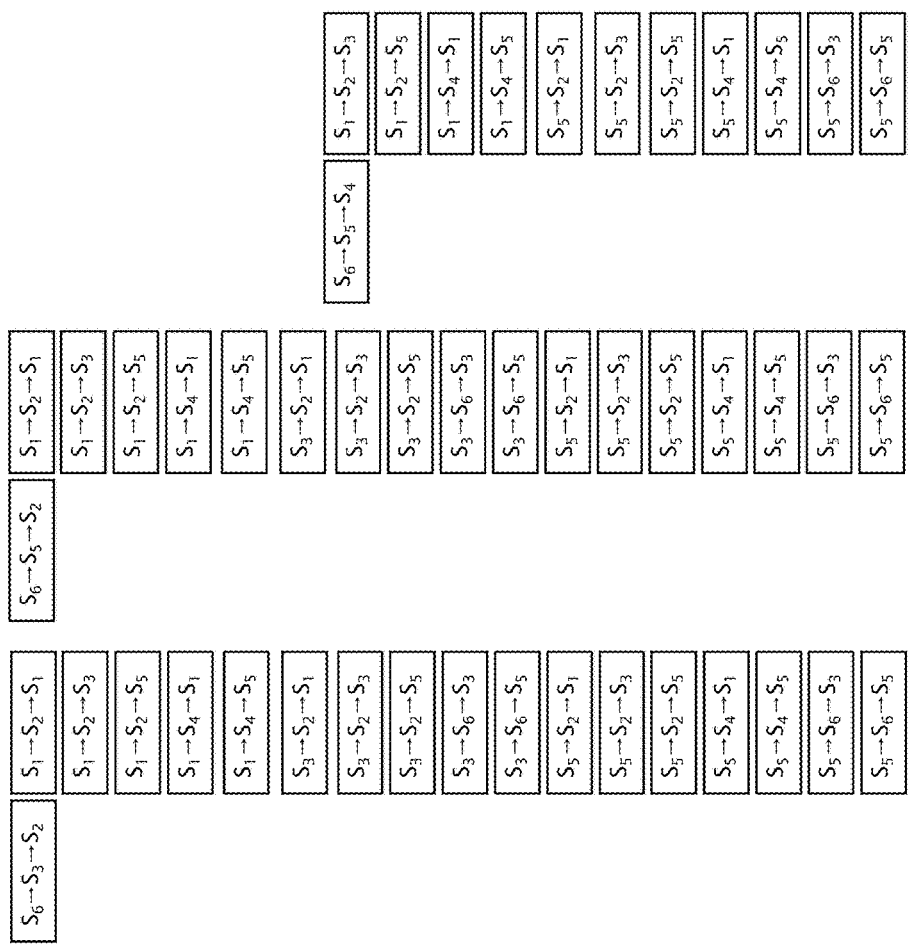

$$
\begin{bmatrix}
P_{aa} & P_{ab} & P_{ac} & P_{ad} & P_{ae} & P_{af} \\
P_{ba} & P_{bb} & P_{bc} & P_{bd} & P_{be} & P_{bf} \\
P_{ca} & P_{cb} & P_{cc} & P_{cd} & P_{ce} & P_{cf} \\
P_{da} & P_{db} & P_{dc} & P_{dd} & P_{de} & P_{df} \\
P_{ea} & P_{eb} & P_{ec} & P_{ed} & P_{ee} & P_{ef} \\
P_{fa} & P_{fb} & P_{fc} & P_{fd} & P_{fe} & P_{ff}
\end{bmatrix}
$$

FIG. 60b $$
\begin{bmatrix}
0 & P_{ab} & P_{ac} & P_{ad} & P_{ae} & P_{af} \\
P_{ba} & 0 & P_{bc} & P_{bd} & P_{be} & P_{bf} \\
P_{ca} & P_{cb} & 0 & P_{cd} & P_{ce} & P_{cf} \\
P_{da} & P_{db} & P_{dc} & 0 & P_{de} & P_{df} \\
P_{ea} & P_{eb} & P_{ec} & P_{ed} & 0 & P_{ef} \\
P_{fa} & P_{fb} & P_{fc} & P_{fd} & P_{fe} & 0
\end{bmatrix}
$$

FIG. 60a $$\begin{bmatrix} P_{11} & P_{12} & 0 & P_{14} & 0 & 0 \\ P_{21} & P_{22} & P_{23} & 0 & P_{25} & 0 \\ 0 & P_{32} & P_{33} & 0 & 0 & P_{36} \\ P_{41} & 0 & 0 & P_{44} & P_{45} & 0 \\ 0 & P_{52} & 0 & P_{54} & P_{55} & P_{56} \\ 0 & 0 & P_{63} & 0 & P_{65} & P_{66} \end{bmatrix}$$

FIG. 62

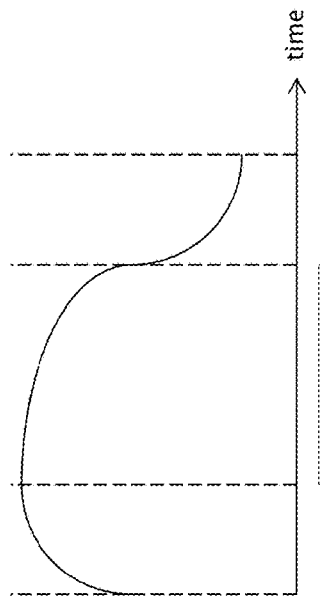
FIG. 63e SSF
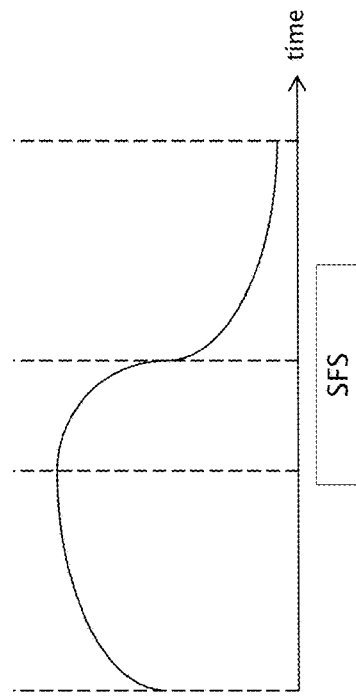
FIG. 63f FSF
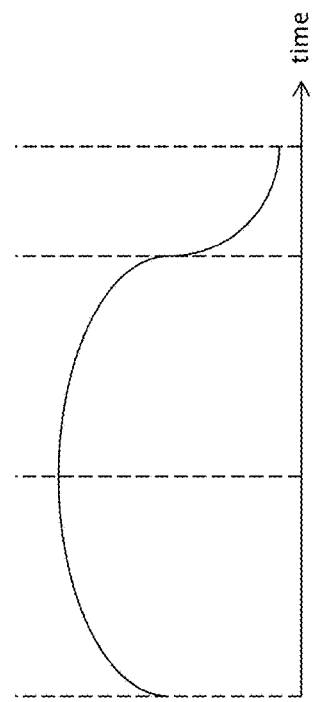
FIG. 63g SFF
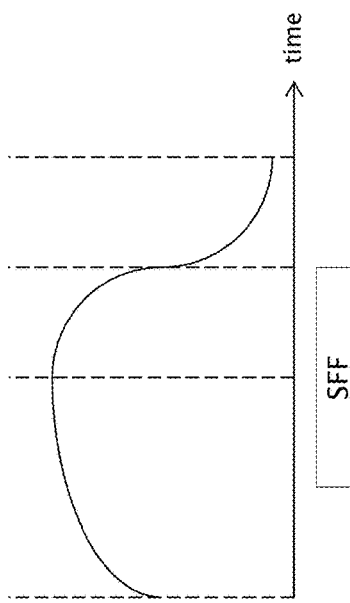
FIG. 63h SFS

MFS
MFM
MFF
FSS
FSM
FSF
FMS
FMM
FMF

FIG. 65b

SMS
SMM
SMF
SFS
SFM
SFF
MSS
MSM
MSF

FIG. 65a

SSS
SSM
SSF
MMS
MMM
MMF
FFS
FFM
FFF

GESTEME (GESTURE PRIMITIVE) RECOGNITION FOR ADVANCED TOUCH USER INTERFACES

CROSS-REFERENCE TO RELATED APPLICATIONS

This application claims benefit of priority from Provisional U.S. Patent application Ser. No. 61/567,626, filed Dec. 6, 2011, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

FIELD OF THE INVENTION

This invention relates to signal space architectures for generalized gesture capture, and more specifically to "gesteme"-based (gesture primitives) gesture recognition, including the recognition of gesture shapes and gesture prosody, for at least advanced touch user interfaces.

BACKGROUND OF THE INVENTION

By way of general introduction, touch screens implementing tactile sensor arrays have recently received tremendous attention with the addition multi-touch sensing, metaphors, and gestures. After an initial commercial appearance in the products of FingerWorks™, such advanced touch screen technologies have received great commercial success from their defining role in the iPhone™ and subsequent adaptations in PDAs and other types of cell phones and hand-held devices. Despite this popular notoriety and the many associated patent filings, tactile array sensors implemented as transparent touchscreens were taught in the 1999 filings of issued U.S. Pat. No. 6,570,078 and pending U.S. patent application Ser. No. 11/761,978.

Despite the many popular touch interfaces and gestures, there remains a wide range of additional control capabilities that can yet be provided by further enhanced user interface technologies. A number of enhanced touch user interface features are described in U.S. Pat. Nos. 6,570,078 and 8,169,414 as well as, pending U.S. patent application Ser. Nos. 11/761,978, 12/418,605, 12/502,230, 12/541,948, and a significant number of related pending U.S. patent applications by the present and associated inventors. These patents and patent applications also address popular contemporary gesture and touch features. The enhanced user interface features taught in these patents and patent applications, together with popular contemporary gesture and touch features, can be rendered by the "High Dimensional Touch Pad" (HDTP) technology taught in those patents and patent applications. Implementations of the HDTP provide advanced multi-touch capabilities far more sophisticated that those popularized by FingerWorks™, Apple™, NYU, Microsoft™, Gesturetek™, and others.

Example Devices and Configurations Employing a Touchpad or Touchscreen

FIGS. 1a-1g (adapted from U.S. patent application Ser. No. 12/418,605) and 2a-2e (adapted from U.S. Pat. No. 7,557,797) depict a number of arrangements and embodiments employing a touch-based user interface. FIG. 1a illustrates a touch-based user interface as a peripheral that can be used with a desktop computer (shown) or laptop) not shown). FIG. 1b depicts a touch-based user interface integrated into a laptop in place of the traditional touchpad pointing device. In FIGS. 1a-1b a touch-based user interface tactile sensor can be a stand-alone component or can be integrated over a display so as to form a touchscreen. FIG. 1c depicts a touch-based user interface integrated into a desktop computer display so as to form a touchscreen. FIG. 1d shows a touch-based user interface integrated into a laptop computer display so as to form a touchscreen.

FIG. 1e depicts a touch-based user interface integrated into a cell phone, smartphone, PDA, or other hand-held consumer device. FIG. 1f shows a touch-based user interface integrated into a test instrument, portable service-tracking device, portable service-entry device, field instrument, or other hand-held industrial device. In FIGS. 1e-1f a touch-based user interface tactile sensor can be a stand-alone component or can be integrated over a display so as to form a touchscreen. FIG. 1g depicts a user interface touchscreen configuration that can be used in a tablet computer, wall-mount computer monitor, digital television, video conferencing screen, kiosk, etc. In at least the arrangements of FIGS. 1a, 1c, 1d, and 1g, or other sufficiently large tactile sensor implementation of a touch-based user interface, more than one hand can be used an individually recognized as such.

FIGS. 2a-2e and FIGS. 3a-3b (these adapted from U.S. Pat. No. 7,557,797) depict various integrations of a touch-based user interface into the back of a conventional computer mouse. Any of these arrangements can employ a connecting cable, or the device can be wireless.

In the integrations depicted in FIGS. 2a-2d a touch-based user interface tactile sensor can be a stand-alone component or can be integrated over a display so as to form a touchscreen. Such configurations have very recently become popularized by the product release of Apple™ "Magic Mouse™" although such combinations of a mouse with a tactile sensor array on its back responsive to multitouch and gestures were taught earlier in pending U.S. patent application Ser. No. 12/619,678 (priority date Feb. 12, 2004) entitled "User Interface Mouse with Touchpad Responsive to Gestures and Multi-Touch."

In another embodiment taught in the specification of issued U.S. Pat. No. 7,557,797 and associated pending continuation applications more than two touchpads can be included in the advance mouse embodiment, for example as suggested in the arrangement of FIG. 2e. As with the arrangements of FIGS. 2a-2d, one or more of the plurality of touch-based user interface tactile sensors or exposed sensor areas of arrangements such as that of FIG. 2e can be integrated over a display so as to form a touchscreen. Other advance mouse arrangements include the integrated trackball/touchpad/mouse combinations of FIGS. 3a-3b taught in U.S. Pat. No. 7,557,797.

Overview of Touch-Based User Interface Sensor Technology

The information in this section provides an overview of HDTP user interface technology as described in U.S. Pat. Nos. 6,570,078 and 8,169,414 as well as pending U.S. patent application Ser. Nos. 11/761,978, 12/418,605, 12/502,230, 12/541,948, and related pending U.S. patent applications.

As an example, a touchpad used as a pointing and data entry device can comprise an array of sensors. The array of sensors is used to create a tactile image of a type associated with the type of sensor and method of contact by the human hand. The individual sensors in the sensor array can be pressure sensors and a direct pressure-sensing tactile image is generated by the sensor array. Alternatively, the individual sensors in the sensor array can be proximity sensors and a direct proximity tactile image is generated by the sensor array. Since the contacting surfaces of the finger or hand tissue contacting a surface typically increasingly deforms as pressure is applied, the sensor array comprised of proximity sensors also provides an indirect pressure-sensing tactile image. Alternatively, the individual sensors in the sensor array can be optical sensors. In one variation of this, an optical image is generated and an indirect proximity tactile image is generated by the sensor array. In another variation, the optical image can be observed through a transparent or translucent rigid material and, as the contacting surfaces of the finger or hand tissue contacting a surface typically increasingly deforms as pressure is applied, the optical sensor array also provides an indirect pressure-sensing tactile image.

Further, the array of sensors can be transparent or translucent and can be provided with an underlying visual display element such as an alphanumeric, graphics, or image display. The underlying visual display can comprise, for example, an LED array display, a backlit LCD, etc. Such an underlying display can be used to render geometric boundaries or labels for soft-key functionality implemented with the tactile sensor array, to display status information, etc. Tactile array sensors implemented as transparent touchscreens are taught in the 1999 filings of issued U.S. Pat. No. 6,570,078 and pending U.S. patent application Ser. No. 11/761,978.

In some implementations, the touchpad or touchscreen can comprise a tactile sensor array obtains or provides individual measurements in every enabled cell in the sensor array that provides these as numerical values. The numerical values can be communicated in a numerical data array, as a sequential data stream, or in other ways. When regarded as a numerical data array with row and column ordering that can be associated with the geometric layout of the individual cells of the sensor array, the numerical data array can be regarded as representing a tactile image. The only tactile sensor array requirement to obtain the full functionality of a touch-based user interface is that the tactile sensor array produce a multi-level gradient measurement image as a finger, part of hand, or other pliable object varies is proximity in the immediate area of the sensor surface.

Such a tactile sensor array should not be confused with the "null/contact" touchpad which, in normal operation, acts as a pair of orthogonally responsive potentiometers. These "null/contact" touchpads do not produce pressure images, proximity images, or other image data but rather, in normal operation, two voltages linearly corresponding to the location of a left-right edge and forward-back edge of a single area of contact. Such "null/contact" touchpads, which are universally found in existing laptop computers, are discussed and differentiated from tactile sensor arrays in issued U.S. Pat. No. 6,570,078 and pending U.S. patent application Ser. No. 11/761,978. Before leaving this topic, it is pointed out that these the "null/contact" touchpads nonetheless can be inexpensively adapted with simple analog electronics to provide at least primitive multi-touch capabilities as taught in issued U.S. Pat. No. 6,570,078 and pending U.S. patent application Ser. No. 11/761,978 (pre-grant publication U.S. 2007/0229477 and therein, paragraphs [0022]-[0029], for example).

More specifically, FIG. 4 (adapted from U.S. patent application Ser. No. 12/418,605) illustrates the side view of a finger 401 lightly touching the surface 402 of a tactile sensor array. In this example, the finger 401 contacts the tactile sensor surface in a relatively small area 403. In this situation, on either side the finger curves away from the region of contact 403, where the non-contacting yet proximate portions of the finger grow increasingly far 404a, 405a, 404b, 405b from the surface of the sensor 402. These variations in physical proximity of portions of the finger with respect to the sensor surface should cause each sensor element in the tactile proximity sensor array to provide a corresponding proximity measurement varying responsively to the proximity, separation distance, etc. The tactile proximity sensor array advantageously comprises enough spatial resolution to provide a plurality of sensors within the area occupied by the finger (for example, the area comprising width 406). In this case, as the finger is pressed down, the region of contact 403 grows as the more and more of the pliable surface of the finger conforms to the tactile sensor array surface 402, and the distances 404a, 405a, 404b, 405b contract. If the finger is tilted, for example by rolling in the user viewpoint counterclockwise (which in the depicted end-of-finger viewpoint clockwise 407a) the separation distances on one side of the finger 404a, 405a will contract while the separation distances on one side of the finger 404b, 405b will lengthen. Similarly if the finger is tilted, for example by rolling in the user viewpoint clockwise (which in the depicted end-of-finger viewpoint counterclockwise 407b) the separation distances on the side of the finger 404b, 405b will contract while the separation distances on the side of the finger 404a, 405a will lengthen.

In many various implementations, the tactile sensor array can be connected to interface hardware that sends numerical data responsive to tactile information captured by the tactile sensor array to a processor. In various implementations, this processor will process the data captured by the tactile sensor array and transform it various ways, for example into a collection of simplified data, or into a sequence of tactile image "frames" (this sequence akin to a video stream), or into highly refined information responsive to the position and movement of one or more fingers and other parts of the hand.

As to further detail of the latter example, a "frame" can refer to a 2-dimensional list, number of rows by number of columns, of tactile measurement value of every pixel in a tactile sensor array at a given instance. The time interval between one frame and the next one depends on the frame rate of the system and the number of frames in a unit time (usually frames per second). However, these features are and are not firmly required. For example, in some implementations a tactile sensor array can not be structured as a 2-dimensional array but rather as row-aggregate and column-aggregate measurements (for example row sums and columns sums as in the tactile sensor of year 2003-2006 Apple™ Powerbooks™, row and column interference measurement data as can be provided by a surface acoustic wave or optical transmission modulation sensor as discussed later in the context of FIG. 13, etc.). Additionally, the frame rate can be adaptively-variable rather than fixed, or the frame can be segregated into a plurality regions each of which are scanned in parallel or conditionally (as taught in U.S. Pat. No. 6,570,078 and pending U.S. patent application Ser. No. 12/418,605), etc.

FIG. 5a (adapted from U.S. patent application Ser. No. 12/418,605) depicts a graphical representation of a tactile image produced by contact with the bottom surface of the most outward section (between the end of the finger and the most nearby joint) of a human finger on a tactile sensor array. In this example tactile array, there are 24 rows and 24 columns; other realizations can have fewer, more, or significantly more (hundreds or thousands) of rows and columns. Tactile measurement values of each cell are indicated by the numbers and shading in each cell. Darker cells represent cells with higher tactile measurement values. Similarly, FIG. 5b (also adapted from U.S. patent application Ser. No. 12/418,605) provides a graphical representation of a tactile image produced by contact with multiple human fingers on a tactile sensor array. In other implementations, there can be a larger or smaller number of pixels for a given images size, resulting in varying resolution. Additionally, there can be larger or smaller area with respect to the image size resulting in a greater or lesser potential measurement area for the region of contact to be located in or move about.

FIG. 6 (adapted from U.S. patent application Ser. No. 12/418,605) depicts a realization wherein a tactile sensor array is provided with real-time or near-real-time data acquisition capabilities. The captured data reflects spatially distributed tactile measurements (such as pressure, proximity, etc.). The tactile sensory array and data acquisition stage provides this real-time or near-real-time tactile measurement data to a specialized image processing arrangement for the production of parameters, rates of change of those parameters, and symbols responsive to aspects of the hand's relationship with the tactile or other type of sensor array. In some applications, these measurements can be used directly. In other situations, the real-time or near-real-time derived parameters can be directed to mathematical mappings (such as scaling, offset, and nonlinear warpings) in real-time or near-real-time into real-time or near-real-time application-specific parameters or other representations useful for applications. In some implementations, general purpose outputs can be assigned to variables defined or expected by the application.

The tactile sensor array employed by touch-based user interface technologies can be implemented by a wide variety of means, for example:

Pressure sensor arrays (implemented by for example—although not limited to—one or more of resistive, capacitive, piezo, optical, acoustic, or other sensing elements);

Pressure sensor arrays (implemented by for example—although not limited to—one or more of resistive, capacitive, piezo, optical, acoustic, or other sensing elements);

Proximity sensor arrays (implemented by for example—although not limited to—one or more of capacitive, optical, acoustic, or other sensing elements);

Surface-contact sensor arrays (implemented by for example—although not limited to—one or more of resistive, capacitive, piezo, optical, acoustic, or other sensing elements).

Below a few specific examples of the above are provided by way of illustration; however these are by no means limiting. The examples include:

Pressure sensor arrays comprising arrays of isolated sensors (FIG. 7);

Capacitive proximity sensors (FIG. 8);

Multiplexed LED optical reflective proximity sensors (FIG. 9);

Video camera optical reflective sensing (as taught in U.S. Pat. No. 6,570,078 and U.S. patent application Ser. Nos. 10/683,915 and 11/761,978):

direct image of hand (FIG. 10a-10c);

image of deformation of material (FIG. 11);

Surface contract refraction/absorption (FIG. 12).

An example implementation of a tactile sensor array is a pressure sensor array. Pressure sensor arrays discussed in U.S. Pat. No. 6,570,078 and pending U.S. patent application Ser. No. 11/761,978. FIG. 7 depicts a pressure sensor array arrangement comprising a rectangular array of isolated individual two-terminal pressure sensor elements. Such two-terminal pressure sensor elements typically operate by measuring changes in electrical (resistive, capacitive) or optical properties of an elastic material as the material is compressed. In typical implementation, each sensor element in the sensor array can be individually accessed via multiplexing arrangement, for example as shown in FIG. 7, although other arrangements are possible and provided for by the invention. Examples of prominent manufacturers and suppliers of pressure sensor arrays include Tekscan™, Inc. (307 West First Street, South Boston, Mass., 02127, www.tekscan.com), Pressure Profile Systems™ (5757 Century Boulevard, Suite 600, Los Angeles, Calif. 90045, www.pressureprofile.com), Sensor Products™, Inc. (300 Madison Avenue, Madison, N.J. 07940 USA, www.sensorprod.com), and Xsensor™ Technology Corporation (Suite 111, 319-2nd Ave SW, Calgary, Alberta T2P 005, Canada, www.xsensor.com).

The capacitive touch sensors described above involve a capacitance change due to spatial compression of capacitive elements; there is no direct RF or electrostatic sensing of the finger itself, and the result is typically pressure sensing. Most capacitive touch sensors, however, do involve direct RF or electrostatic sensing of the finger itself, typically resulting in proximity sensing. It is also possible to create capacitive sensor arrays responsive to both proximity and pressure, for example such as the capacitive sensor arrays taught in U.S. Pat. No. 6,323,846 by Westerman.

Capacitive proximity sensors can be used in various handheld devices with touch interfaces (see for example, among many, http://electronics.howstuffworks.com/iphone2.htm, http://www.veritasetvisus.com/VVTP-12,%20Walker.pdf). Prominent manufacturers and suppliers of such sensors, both in the form of opaque touchpads and transparent touch screens, include Balda AG (Bergkirchener Str. 228, 32549 Bad Oeynhausen, DE, www.balda.de), Cypress™ (198 Champion Ct., San Jose, Calif. 95134, www.cypress.com), and Synaptics™ (2381 Bering Dr., San Jose, Calif. 95131, www.synaptics.com). In such sensors, the region of finger contact is detected by variations in localized capacitance resulting from capacitive proximity effects induced by an overlapping or otherwise nearly-adjacent finger. More specifically, the electrical field at the intersection of orthogonally-aligned conductive buses is influenced by the vertical distance or gap between the surface of the sensor array and the skin surface of the finger. Such capacitive proximity sensor technology is low-cost, reliable, long-life, stable, and can readily be made transparent. FIG. 8 (adapted from http://www.veritasetvisus.com/VVTP-12,%20Walker.pdf with slightly more functional detail added) shows a popularly accepted view of a typical cell phone or PDA capacitive proximity sensor implementation. Capacitive sensor arrays of this type can be highly susceptible to noise and various shielding and noise-suppression electronics and systems techniques can need to be employed for adequate stability, reliability, and performance in various electric field and electromagnetically-noisy environments. In some implementations of a touch-based user interface, the present invention can use the same spatial resolution as current capacitive proximity touchscreen sensor arrays. In other implementations, a higher spatial resolution is advantageous.

Forrest M. Mims is credited as showing that an LED can be used as a light detector as well as a light emitter. Recently, light-emitting diodes have been used as a tactile proximity sensor array (for example, as taught in U.S. Pat. No. 7,598,949 by Han and depicted in the associated video available at http://cs.nyu.edu/~jhan/ledtouch/index.html). Such tactile proximity array implementations typically need to be operated in a darkened environment (as seen in the video in the above web link). In one implementation, each LED in an array of LEDs can be used as a photodetector as well as a light emitter, although a single LED can either transmit or receive information at one time. Each LED in the array can sequentially be selected to be set to be in receiving mode while others adjacent to it are placed in light emitting mode. A particular LED in receiving mode can pick up reflected light from the finger, provided by said neighboring illuminating-mode LEDs. FIG. 9 depicts an implementation. The invention provides for additional systems and methods for not requiring darkness in the user environment in order to operate the LED array as a tactile proximity sensor. In one implementation, potential interference from ambient light in the surrounding user environment can be limited by using an opaque pliable or elastically deformable surface covering the LED array that is appropriately reflective (directionally, amorphously, etc. as can be advantageous in a particular design) on the side facing the LED array. Such a system and method can be readily implemented in a wide variety of ways as is clear to one skilled in the art. In another implementation, potential interference from ambient light in the surrounding user environment can be limited by employing amplitude, phase, or pulse width modulated circuitry or software to control the underlying light emission and receiving process. For example, in an implementation the LED array can be configured to emit modulated light modulated at a particular carrier frequency or variational waveform and respond to only modulated light signal components extracted from the received light signals comprising that same carrier frequency or variational waveform. Such a system and method can be readily implemented in a wide variety of ways as is clear to one skilled in the art.

An important special case of this is the use of OLED arrays such as those used in OLED displays increasingly deployed in cellphones, smartphones, and Personal Digital Assistants ("PDAs") manufactured by Samsung, Nokia, LG, HTC, Phillips, Sony and others. As taught in pending U.S. patent application Ser. Nos. 13/452,461, 13/180,345 and 13/547,024, such an arrangement can be implemented in a number of ways to provide a high-resolution optical tactile sensor for touch-based user interfaces. Color OLED array displays are of particular interest, in general and as pertaining to the present invention, because:

They can be fabricated (along with associated electrical wiring conductors) via printed electronics on a wide variety of surfaces such as glass, Mylar, plastics, paper, etc.;

Leveraging some such surface materials, they can be readily bent, printed on curved surfaces, etc.;

They can be transparent (and be interconnected with transparent conductors);

Leveraging such transparency, they can be:
Stacked vertically,
Used as an overlay element atop an LCD or other display,
Used as an underlay element between an LCD and its associated backlight.

As taught in U.S. Pat. No. 8,125,559 and pending U.S. patent application Ser. Nos. 13/452,461, 13/180,345 and 13/547,024—leveraging this in various ways, in accordance with implementations, array of inorganic-LEDs, OLEDs, or related optoelectronic devices is configured to perform functions of two or more of:

a visual image display (graphics, image, video, GUI, etc.),
a (lensless imaging) camera (as taught in U.S. Pat. Nos. 8,284,290 and 8,305,480,
a tactile user interface (touch screen),
a proximate gesture user interface.

As taught in pending U.S. patent application Ser. Nos. 13/452,461, 13/180,345 and 13/547,024, such arrangements further advantageously allow for a common processor to be used for both a display and a touch-based user interface. Further, the now widely-popular RF capacitive matrix arrangements used in contemporary multi-touch touchscreen is fully replaced with an arrangement involving far fewer electronic components.

Another type of optical tactile sensor approach arranged to serve as both a display and a tactile sensor is taught in U.S. Pat. No. 8,049,739 by Wu et al., which uses a deformable back-lit LCD display comprising internally reflective elements and photosensitive elements associated with the LCD display responsive to the reflective light.

Use of video cameras for gathering control information from the human hand in various ways is discussed in U.S. Pat. No. 6,570,078 and Pending U.S. patent application Ser. No. 10/683,915. Here the camera image array is employed as a touch-based user interface tactile sensor array. Images of the human hand as captured by video cameras can be used as an enhanced multiple-parameter interface responsive to hand positions and gestures, for example as taught in U.S. patent application Ser. No. 10/683,915 Pre-Grant-Publication 2004/0118268 (paragraphs [314], [321]-[332], [411], [653], both stand-alone and in view of [325], as well as [241]-[263]). FIGS. 10*a* and 10*b* depict single camera implementations. As taught in section 2.1.7.2 of U.S. Pat. No. 6,570,078, pending U.S. patent application Ser. No. 10/683,915, U.S. patent application Ser. No. 13/706,214, two or more video cameras can be used in orthogonal or stereoscopic arrangements to capture hand expressions within 3-space regions. FIG. 10*c* depicts a two camera implementation. As taught in the aforementioned references, a wide range of relative camera sizes and positions with respect to the hand are provided for, considerably generalizing the arrangements shown in FIG. 10*a*-10*c*.

In another video camera tactile controller implementation, a flat or curved transparent or translucent surface or panel can be used as sensor surface. When a finger is placed on the transparent or translucent surface or panel, light applied to the opposite side of the surface or panel reflects light in a distinctly different manner than in other regions where there is no finger or other tactile contact. The image captured by an associated video camera will provide gradient information responsive to the contact and proximity of the finger with respect to the surface of the translucent panel. For example, the parts of the finger that are in contact with the surface will provide the greatest degree of reflection while parts of the finger that curve away from the surface of the sensor provide less reflection of the light. Gradients of the reflected light captured by the video camera can be arranged to produce a gradient image that appears similar to the multilevel quantized image captured by a pressure sensor. By comparing changes in gradient, changes in the position of the finger and pressure applied by the finger can be detected. FIG. 11 depicts an implementation.

FIGS. 12a-12b depict an implementation of an arrangement comprising a video camera capturing the image of a deformable material whose image varies according to applied pressure. In the example of FIG. 12a, the deformable material serving as a touch interface surface can be such that its intrinsic optical properties change in response to deformations, for example by changing color, index of refraction, degree of reflectivity, etc. In another approach, the deformable material can be such that exogenous optic phenomena are modulated in response to the deformation. As an example, the arrangement of FIG. 12b is such that the opposite side of the deformable material serving as a touch interface surface comprises deformable bumps which flatten out against the rigid surface of a transparent or translucent surface or panel. The diameter of the image as seen from the opposite side of the transparent or translucent surface or panel increases as the localized pressure from the region of hand contact increases. Such an approach was created by Professor Richard M. White at U.C. Berkeley in the 1980's.

FIG. 13 depicts an optical or acoustic diffraction or absorption arrangement that can be used for contact or pressure sensing of tactile contact. Such a system can employ, for example light or acoustic waves. In this class of methods and systems, contact with or pressure applied onto the touch surface causes disturbances (diffraction, absorption, reflection, etc.) that can be sensed in various ways. The light or acoustic waves can travel within a medium comprised by or in mechanical communication with the touch surface. A slight variation of this is where surface acoustic waves travel along the surface of, or interface with, a medium comprised by or in mechanical communication with the touch surface.

Compensation for Non-Ideal Behavior of Tactile Sensor Arrays

Individual sensor elements in a tactile sensor array produce measurements that vary sensor-by-sensor when presented with the same stimulus. Inherent statistical averaging of the algorithmic mathematics can damp out much of this, but for small image sizes (for example, as rendered by a small finger or light contact), as well as in cases where there are extremely large variances in sensor element behavior from sensor to sensor, the invention provides for each sensor to be individually calibrated in implementations where that can be advantageous. Sensor-by-sensor measurement value scaling, offset, and nonlinear warpings can be invoked for all or selected sensor elements during data acquisition scans. Similarly, the invention provides for individual noisy or defective sensors can be tagged for omission during data acquisition scans.

FIG. 14 shows a finger image wherein rather than a smooth gradient in pressure or proximity values there is radical variation due to non-uniformities in offset and scaling terms among the sensors.

FIG. 15 shows a sensor-by-sensor compensation arrangement for such a situation. A structured measurement process applies a series of known mechanical stimulus values (for example uniform applied pressure, uniform simulated proximity, etc.) to the tactile sensor array and measurements are made for each sensor. Each measurement data point for each sensor is compared to what the sensor should read and a piecewise-linear correction is computed. In an implementation, the coefficients of a piecewise-linear correction operation for each sensor element are stored in a file. As the raw data stream is acquired from the tactile sensor array, sensor-by-sensor the corresponding piecewise-linear correction coefficients are obtained from the file and used to invoke a piecewise-linear correction operation for each sensor measurement. The value resulting from this time-multiplexed series of piecewise-linear correction operations forms an outgoing "compensated" measurement data stream. Such an arrangement is employed, for example, as part of the aforementioned Tekscan™ resistive pressure sensor array products.

Additionally, the macroscopic arrangement of sensor elements can introduce nonlinear spatial warping effects. As an example, various manufacturer implementations of capacitive proximity sensor arrays and associated interface electronics are known to comprise often dramatic nonlinear spatial warping effects. FIG. 16 (adapted from http://labs.moto.com/diy-touchscreen-analysis/) depicts the comparative performance of a group of contemporary handheld devices wherein straight lines were entered using the surface of the respective touchscreens. A common drawing program was used on each device, with widely-varying type and degrees of nonlinear spatial warping effects clearly resulting. For simple gestures such as selections, finger-flicks, drags, spreads, etc., such nonlinear spatial warping effects introduce little consequence. For more precision applications, such nonlinear spatial warping effects introduce unacceptable performance. Close study of FIG. 16 shows different types of responses to tactile stimulus in the direct neighborhood of the relatively widely-spaced capacitive sensing nodes versus tactile stimulus in the boundary regions between capacitive sensing nodes. Increasing the number of capacitive sensing nodes per unit area can reduce this, as can adjustments to the geometry of the capacitive sensing node conductors. In many cases improved performance can be obtained by introducing or more carefully implementing interpolation mathematics.

Overview of 3D, 6D, and Related Capabilities of HDTP Technology User Interface Technology Some implementations of HDTP technology is provided. This will be followed by a summarizing overview of HDTP technology. With the exception of a few minor variations and examples, the material presented in this overview section is draw from U.S. Pat. No. 6,570,078, pending U.S. patent application Ser. Nos. 11/761,978, 12/418,605, 12/502,230, 12/541,948, 12/724,413, 13/026,248, and related pending U.S. patent applications and is accordingly attributed to the associated inventors.

FIGS. 17a-17f (adapted from U.S. patent application Ser. No. 12/418,605 and described in U.S. Pat. No. 6,570,078) illustrate six independently adjustable degrees of freedom of touch from a single finger that can be simultaneously measured by the HDTP technology. The depiction in these figures is from the side of the touchpad. FIGS. 17a-17c show actions of positional change (amounting to applied pressure in the case of FIG. 17c) while FIGS. 17d-17f show actions of angular change. Each of these can be used to control a user interface parameter, allowing the touch of a single fingertip to control up to six simultaneously-adjustable quantities in an interactive user interface as shown in FIG. 18.

Each of the six parameters listed above can be obtained from operations on a collection of sums involving the geometric location and tactile measurement value of each tactile measurement sensor. Of the six parameters, the left-right geometric center, forward-back geometric center, and clockwise-counterclockwise yaw rotation can be obtained from binary threshold image data. The average downward pressure, roll, and pitch parameters are in some implementations beneficially calculated from gradient (multi-level) image data. One remark is that because binary threshold image data is sufficient for the left-right geometric center, forward-back geometric center, and clockwise-counterclockwise yaw rotation parameters, these also can be discerned for flat regions of rigid non-pliable objects, and thus the HDTP technology thus can be adapted to discern these three parameters from flat regions with striations or indentations of rigid non-pliable objects.

Additionally, as taught in U.S. Pat. No. 6,570,078 and pending U.S. patent application Ser. Nos. 11/761,978 and 12/418,605, a wide range of richly-parameterized multi-touch configurations are supported by the HDTP technology. FIG. 19 depicts example multi-touch positions and gestures involving two fingers that are supported by the HDTP technology, and FIG. 20 depicts various individual and compound images associated with touch by various portions of the human hand whose recognition and classification are supported by the HDTP technology.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIG. 21b illustrates an example an example set of eighteen primitive handwriting "graphemes" created from various translations and mirror-symmetry transformations of the example set of four primitive handwriting segment shapes depicted in FIG. 21a.

FIGS. 39a-39c illustrates examples of collections of gesture shape primitives which can be associated with a signal space and which can serve as gestemes.

FIG. 41a illustrates an example vector quantization of an example signal space associated with symbols useful for gesteme or gesture recognition.

FIG. 41b illustrates an example vector quantization of an example signal space associated with primitives of gestemes or gestures from the example signal space of FIG. 41a.

FIG. 41c illustrates an alternative example vector quantization of an example signal space associated with symbols useful for gesteme or gesture recognition.

FIG. 41d depicts the set relations among the symbol-associated signal space of FIG. 41a ("S" elements), symbol-associated signal space of FIG. 41c ("T" elements), and shared underlying primitives signal space of FIG. 41b ("P" elements).

FIGS. 43a-43c illustrate permitted transitions among symbol-associated signal space elements (representing gestemes) in the example symbol-associated signal spaces depicted in FIGS. 41a-41c, respectively.

FIG. 44a illustrates an example table depicting permitted consecutive pairs of transitions between triples of consecutive symbols among symbol-associated signal space elements in the example symbol-associated signal space depicted in FIG. 41a.

FIG. 44b illustrates an example table depicting permitted consecutive pairs of transitions between triples of consecutive symbols among symbol-associated signal space elements in the example symbol-associated signal space depicted in FIG. 41 b.

FIG. 44c illustrates an example table depicting permitted consecutive pairs of transitions between permitted triples of consecutive symbols among symbol-associated signal space elements in the example symbol-associated signal space depicted in FIG. 41 c.

FIG. 45 illustrates an example organization of permitted triples (sequences of 3-primitives) of permissible consecutive primitives from the 6-member collection of $S_1$ through $S_6$ depicted in FIG. 41a.

FIG. 46a and FIG. 46b illustrate an example organization of permitted consecutive pairs of triples of consecutive primitives, this beginning with triple comprising primitive $S_1$ that retraces back to primitive $S_1$.

FIG. 47a-FIG. 47c illustrate an example organization of permitted consecutive pairs of triples of consecutive primitives, this beginning with triple comprising primitive $S_2$ that retraces back to primitive $S_2$.

FIG. 48a and FIG. 48b illustrate an example organization of permitted consecutive pairs of triples of consecutive primitives, this beginning with triple comprising primitive $S_3$ that retraces back to primitive $S_3$.

FIG. 49a-FIG. 49c illustrates an example organization of permitted consecutive pairs of triples of consecutive primitives, this beginning with triple comprising primitive $S_4$ that retraces back to primitive $S_4$.

FIG. 50a-FIG. 50c illustrates an example organization of permitted consecutive pairs of triples of consecutive primitives, this beginning with triple comprising primitive $S_5$ that retraces back to primitive $S_5$.

FIG. 51a and FIG. 51b illustrates an example organization of permitted consecutive pairs of triples of consecutive primitives, this beginning with triple comprising primitive $S_6$ that retraces back to primitive $S_6$.

FIG. 52a-FIG. 52c illustrates an example organization of permitted consecutive pairs of triples of consecutive primitives, this beginning with triple comprising primitive $S_1$ that does not retrace back to primitive $S_1$.

FIG. 53a-FIG. 53d illustrates an example organization of permitted consecutive pairs of triples of consecutive primitives, this beginning with triple comprising primitive $S_2$ that retraces back to primitive $S_2$.

FIG. 55a-FIG. 55d illustrates an example organization of permitted consecutive pairs of triples of consecutive primitives, this beginning with triple comprising primitive $S_4$ that does not retrace back to primitive $S_4$.

FIG. 56a-FIG. 56d illustrates an example organization of permitted consecutive pairs of triples of consecutive primitives, this beginning with triple comprising primitive $S_5$ that does not retrace back to primitive $S_5$. In one application, this is effectively provides a list of gestemes (beginning with primitive $S_5$ and with no retracing) that can be executed in sequence without interruption.

FIG. 57a-FIG. 57c illustrates an example organization of permitted consecutive pairs of triples of consecutive primitives, this beginning with triple comprising primitive $S_6$ that does not retrace back to primitive $S_6$.

FIG. 60a illustrates an example general stochastic state transition matrix associated with the stochastic state transition map depicted in FIG. 58.

FIG. 60b illustrates an example general stochastic state transition matrix associated with the stochastic state transition map depicted in FIG. 59.

FIG. 62 illustrates an example stochastic state transition matrix associated with the stochastic state transition map depicted in FIG. 62.

FIG. 63a-FIG. 63h illustrate example variations in prosody for an example gesteme or gesture with only one parameter variation and two recognized execution speeds (8 cases).

FIG. 64c illustrates an example sample sequences associated with five of the cases in the examples of FIG. 63a-FIG. 63h.

FIG. 65a-FIG. 65c illustrate example variations in prosody for an example gesture with only one parameter variation and three recognized execution speeds (27 cases).

DETAILED DESCRIPTION

Figure 1A:
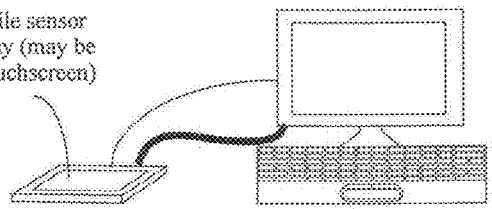
FIGS. 1a-1g depict a number of arrangements and implementations employing touch-based user interface technologies.
Figure 1B:
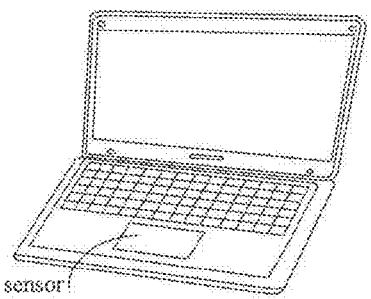
Figure 1C:
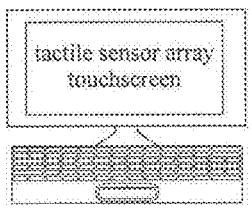
Figure 1D:
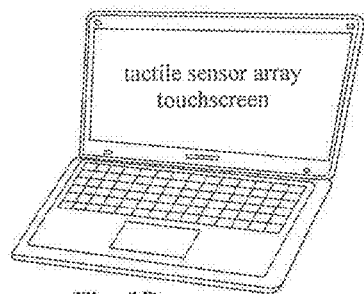
Figure 1E:
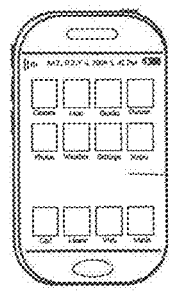
Figure 1F:
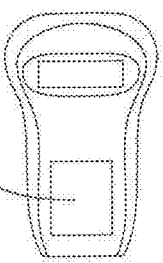
Figure 1G:
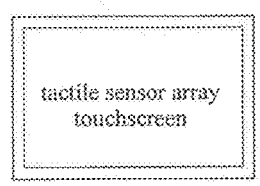
Figure 2A:
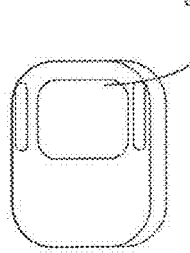
FIGS. 2a-2e and FIGS. 3a-3b depict various integrations of an HDTP into the back of a conventional computer mouse as taught in U.S. Pat. No. 7,557,797 and in pending U.S. patent application Ser. No. 12/619,678.
Figure 2B:
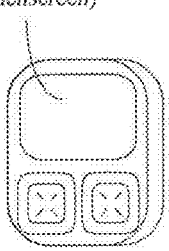
Figure 2C:
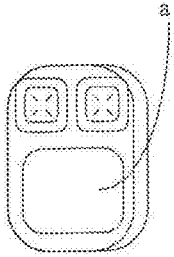
Figure 2D:
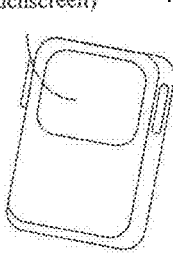
Figure 2E:
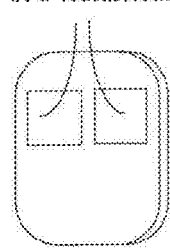
Figure 3A:
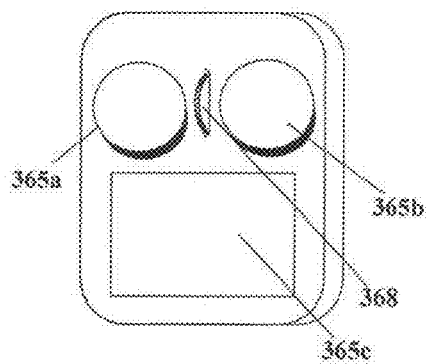
Figure 3B:
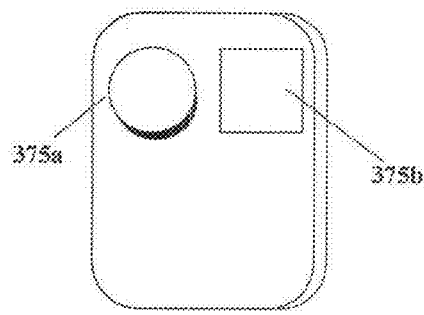
Figure 4:
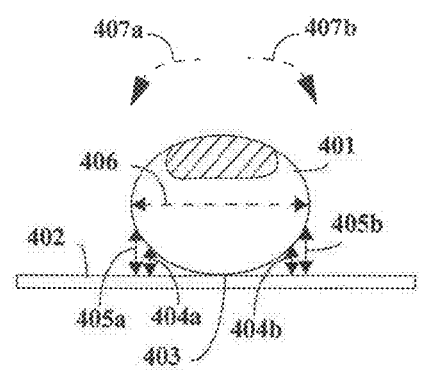
FIG. 4 illustrates the side view of a finger lightly touching the surface of a tactile sensor array.
Figure 5A:
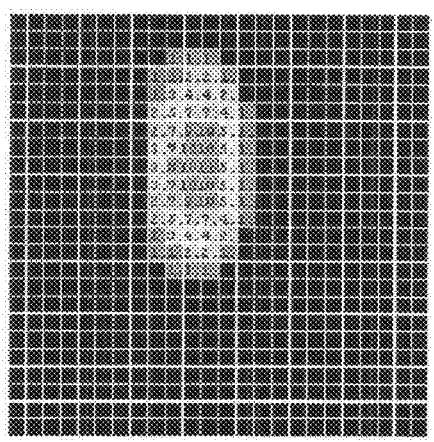
FIG. 5a is a graphical representation of a tactile image produced by contact of a human finger on a tactile sensor array.
Figure 5B:
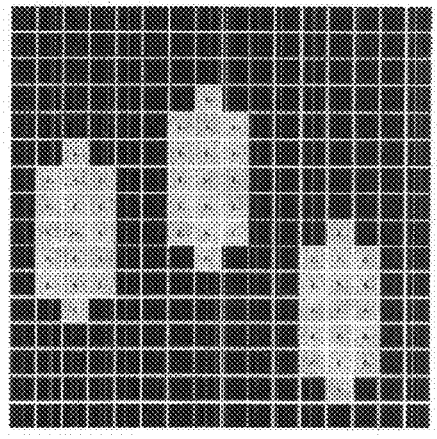
FIG. 5b provides a graphical representation of a tactile image produced by contact with multiple human fingers on a tactile sensor array.
Figure 6:
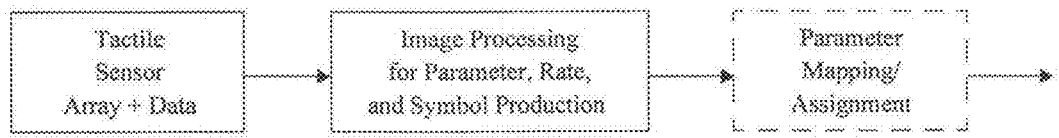
FIG. 6 depicts a signal flow in an example touch-based user interface implementation.
Figure 7:
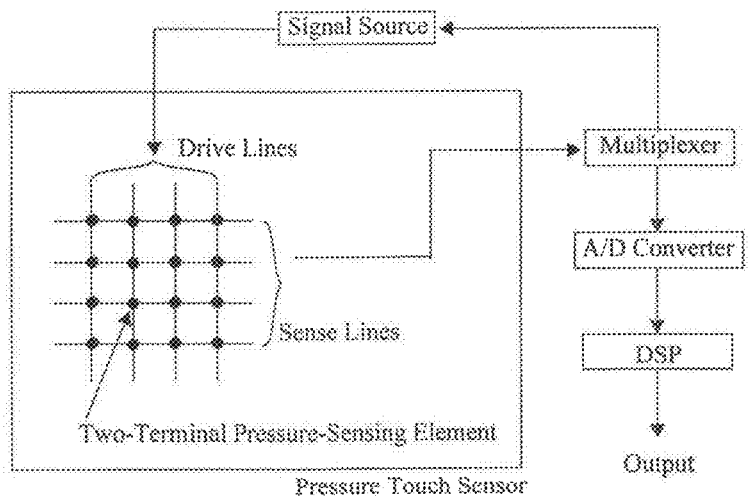
FIG. 7 depicts a pressure sensor array arrangement.
Figure 8:
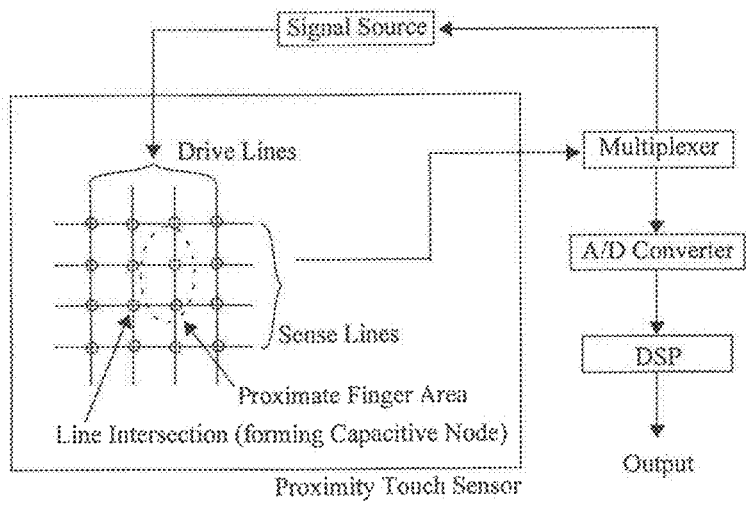
FIG. 8 depicts a popularly accepted view of a typical cell phone or PDA capacitive proximity sensor implementation.
Figure 9:
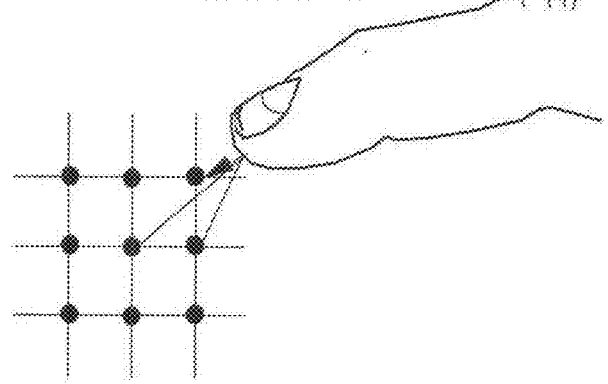
FIG. 9 depicts an implementation of a multiplexed LED array acting as a reflective optical proximity sensing array.
Figure 10A:
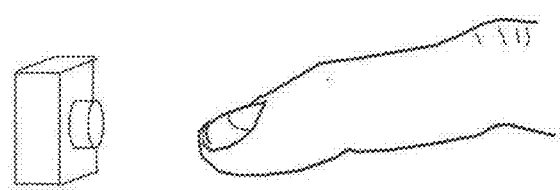
FIGS. 10a-10c depict camera implementations for direct viewing of at least portions of the human hand, wherein the camera image array is employed as an touch-based user interface tactile sensor array.
Figure 10B:
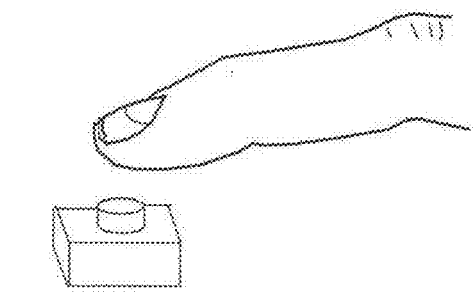
Figure 10C:
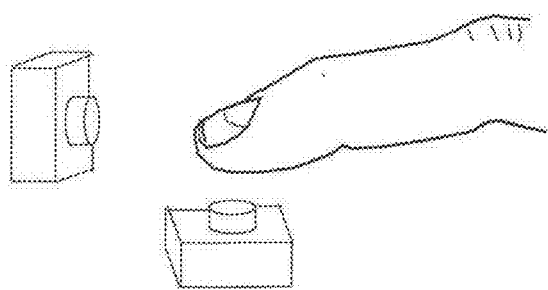
Figure 11:
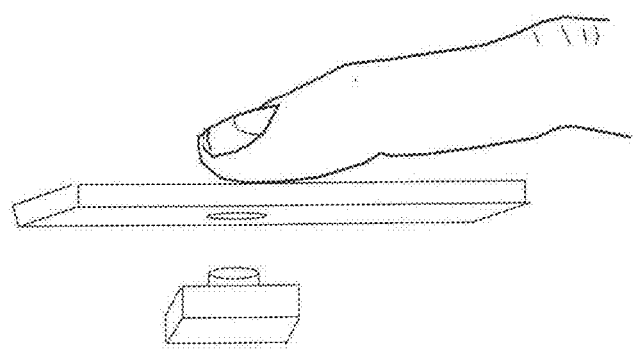
FIG. 11 depicts an embodiment of an arrangement comprising a video camera capturing the image of the contact of parts of the hand with a transparent or translucent surface.
Figure 12A:
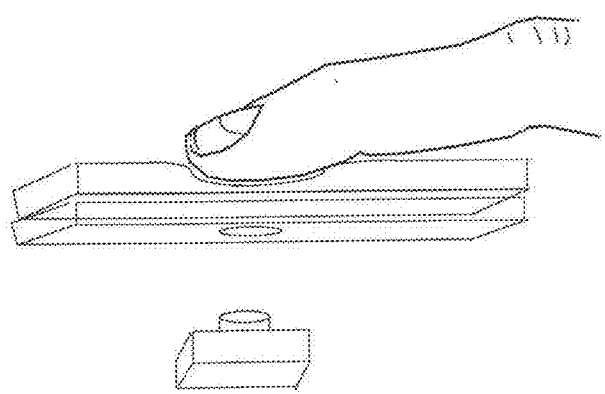
FIGS. 12a-12b depict an implementation of an arrangement comprising a video camera capturing the image of a deformable material whose image varies according to applied pressure.
Figure 12B:
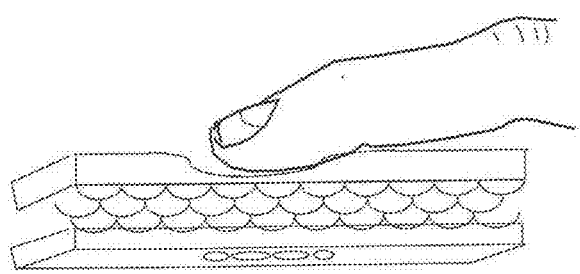
Figure 13:
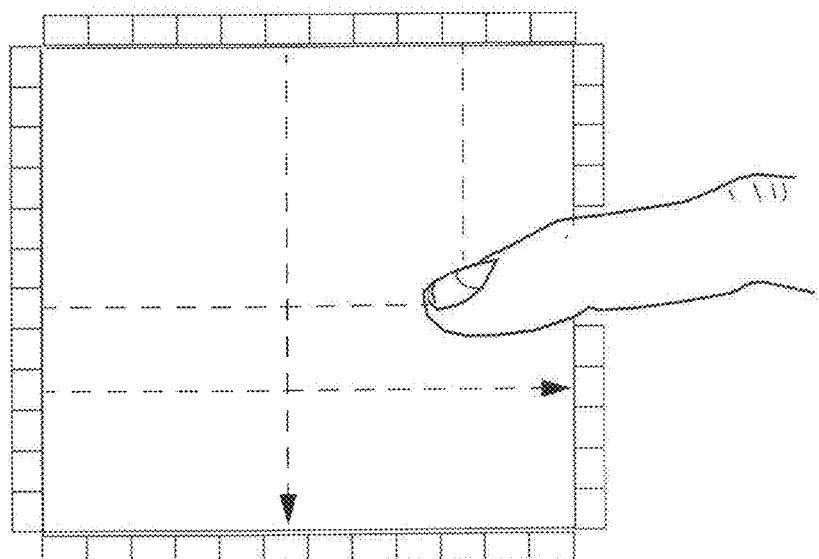
FIG. 13 depicts an implementation of an optical or acoustic diffraction or absorption arrangement that can be used for contact or pressure sensing of tactile contact.
Figure 14:
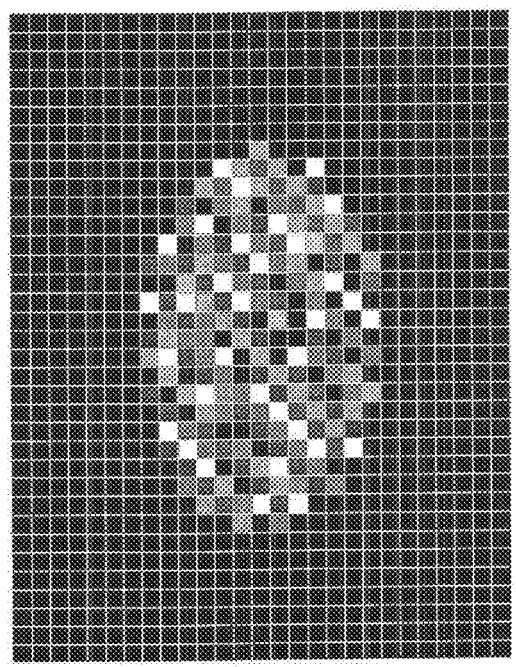
FIG. 14 shows a finger image wherein rather than a smooth gradient in pressure or proximity values there is radical variation due to non-uniformities in offset and scaling terms among the sensors.
Figure 15:
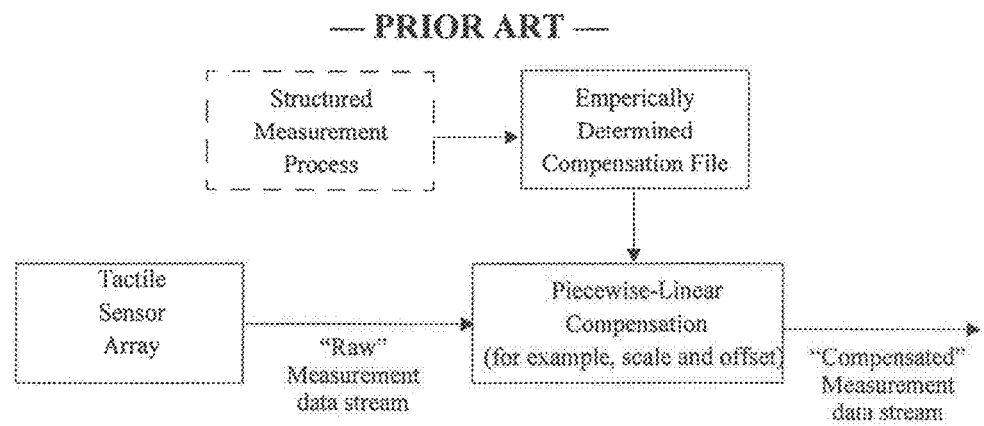
FIG. 15 shows a sensor-by-sensor compensation arrangement.
Figure 16:
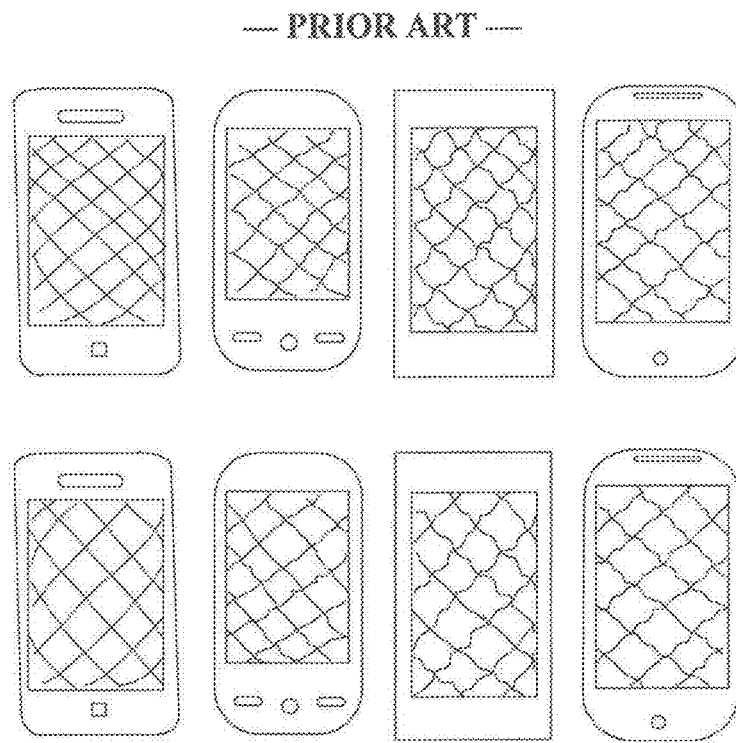
FIG. 16 (adapted from http://labs.moto.com/diy-touch-screen-analysis/) depicts the comparative performance of a group of contemporary handheld devices wherein straight lines were entered using the surface of the respective touchscreens.
Figure 17A:
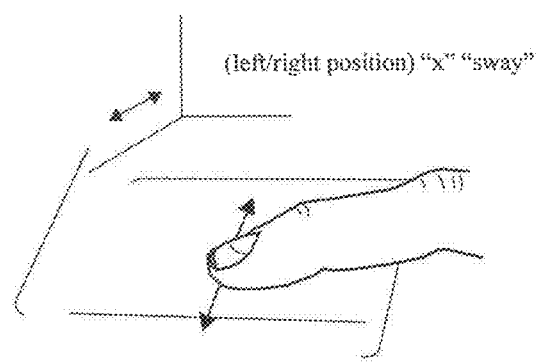
FIGS. 17a-17f illustrate the six independently adjustable degrees of freedom of touch from a single finger that can be simultaneously measured by the HDTP technology.
Figure 17D:
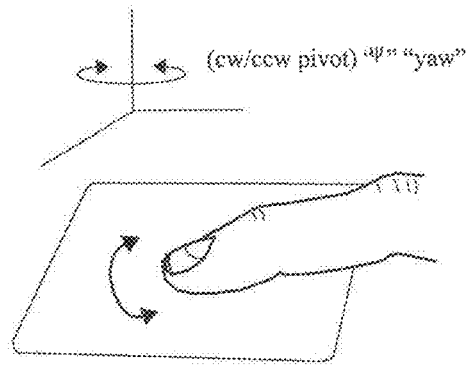
Figure 17B:
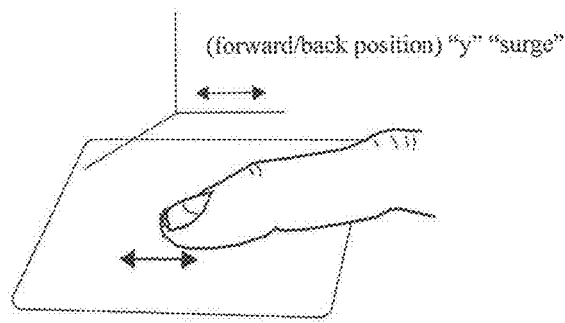
Figure 17E:
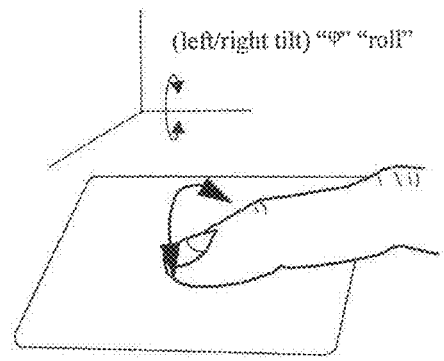
Figure 17C:
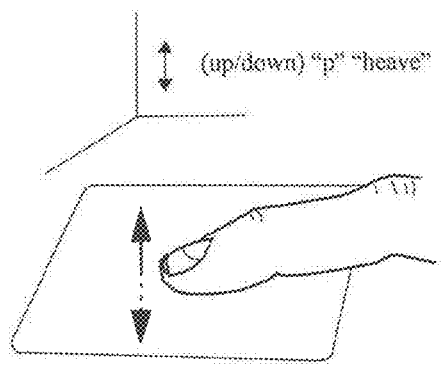
Figure 17F:
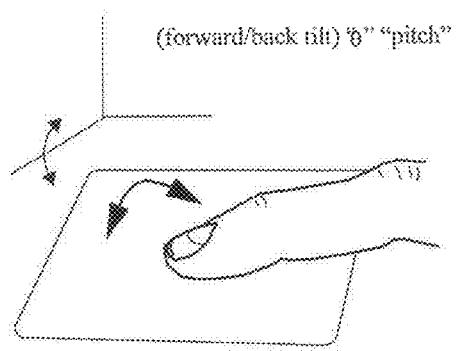
Figure 18:
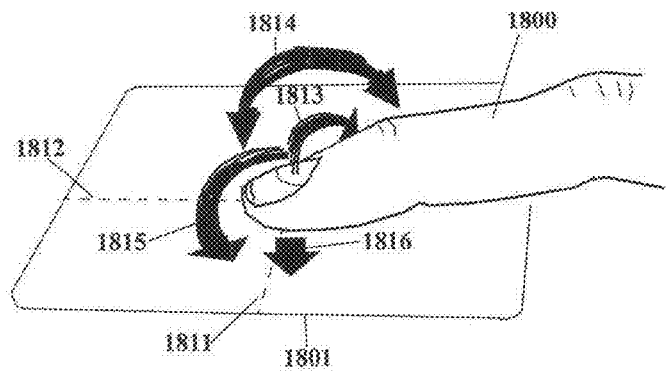
FIG. 18 suggests general ways in which two or more of these independently adjustable degrees of freedom adjusted at once as can be measured by the HDTP technology.
Figure 19:
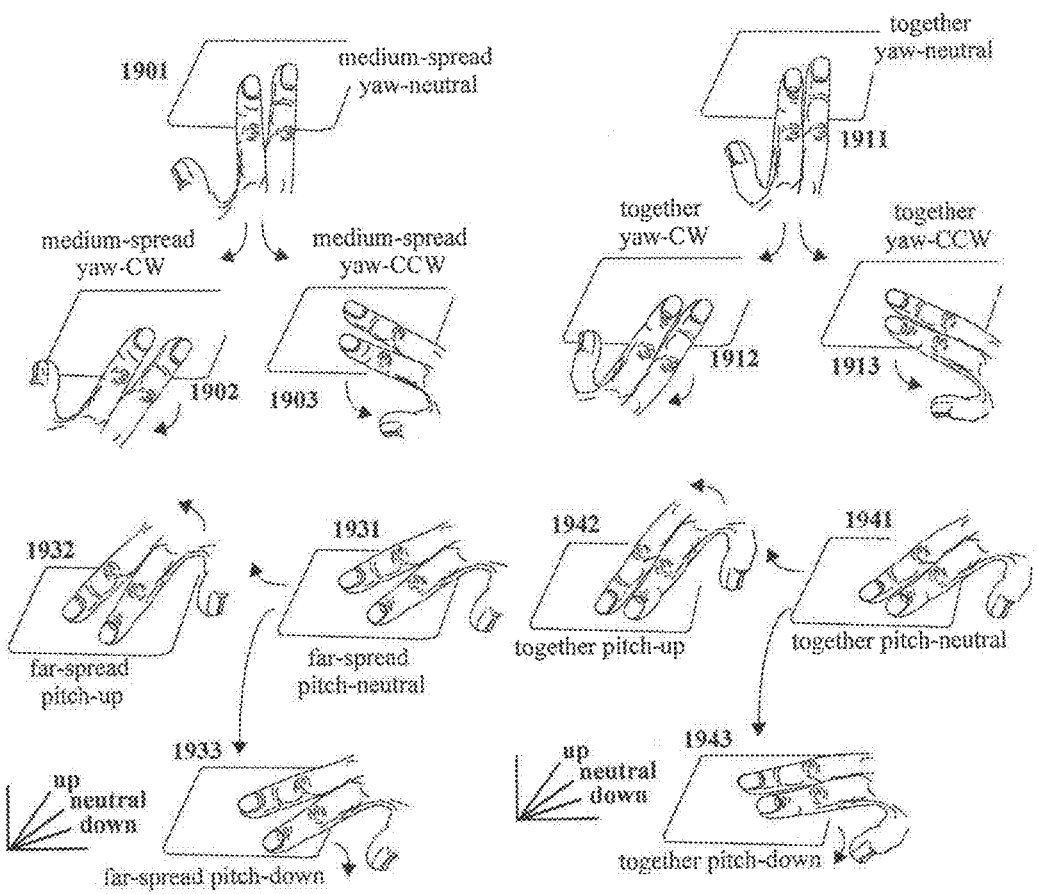
FIG. 19 demonstrates a few two-finger multi-touch postures or gestures from the many that can be recognized by HTDP technology.
Figure 20:
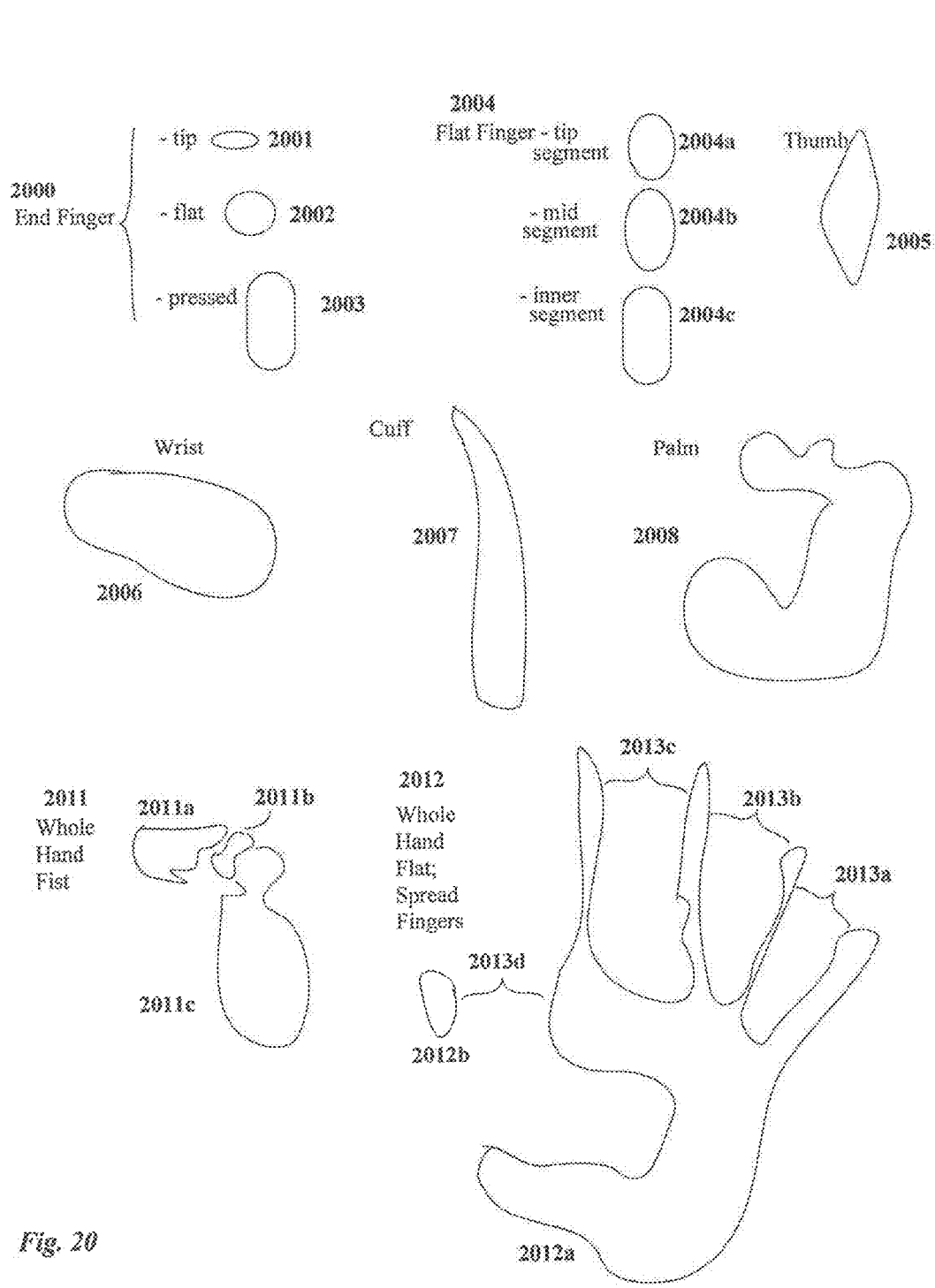
FIG. 20 illustrates the pressure profiles for a number of example hand contacts with a tactile-sensor array as can be recognized by the HDTP technology.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

Embodiments of the present invention relate to signal space architectures for generalized gesture capture and include a gesture-primitive approach involving families of "gesteme" from which gestures can be constructed, recognized, and modulated via prosody operations. Gestemes can be associated with signals in a signal space. Prosody operations can include temporal execution modulation, shape modulation, and modulations of other aspects of gestures and gestemes. The approaches can be used for advanced touch user interfaces such as High-Dimensional Touch Pad (HDTP) in touchpad and touchscreen forms, video camera hand-gesture user interfaces, eye-tracking user interfaces, etc.

Despite the many popular touch interfaces and gestures in contemporary information appliances and computers, there remains a wide range of additional control capabilities that can yet be provided by further enhanced user interface technologies. A number of enhanced touch user interface features are described in U.S. Pat. Nos. 6,570,078 and 8,169,414 as well as pending U.S. patent application Ser. Nos. 11/761,978, 12/418,605, 12/502,230, 12/541,948, and related pending U.S. patent applications. These patents and patent applications also address popular contemporary gesture and touch features. The enhanced user interface features taught in these patents and patent applications, together with popular contemporary gesture and touch features, can be rendered by the "High Dimensional Touch Pad" (HDTP) technology taught in those patents and patent applications.
Tactile and Gesture Grammar Capabilities of HDTP Technology User Interface Technology U.S. Pat. No. 6,570,078 and pending U.S. patent application Ser. Nos. 11/761,978, 12/418,605, 13/414,600, 13/414,705, and 13/464,946 also teach various aspects of expanding touch-based and gesture-based user interfaces to include higher-level linguistic functions such as non-trivial linguistic grammars. Such capabilities allow touch-based and gesture-based user interfaces to progress from low level 'mouse emulation' capabilities (requiring, among many other limitations and drawbacks, the need for high quantities of context switching overhead) to far more efficient, powerful, and natural user interface operation, transactions, and user experiences. Applications such as computer-aided design readily benefit from such approaches as demonstrated in pending U.S. patent application Ser. No. 13/464,946.

Embodiments of the present invention both include some aspects of generative linguistics and also provides features and capabilities facilitating the implementation of higher-level linguistic functions such as non-trivial linguistic grammars.

Additionally and alternatively, the teachings in the remainder of the present patent application can also be advantageously used as a useful, valuable, and flexible implementation approach for fixed or evolvable touch-based and gesture-based user interfaces. The user interface hardware need not be HDTP; it could be for example a simple touch sensor array, a traditional resistive, capacitive, or optical touch screen, a simple capacitive or optical matrix touch sensor, one or more video cameras, etc. The user interface actions can be touch or non-touch motions of a hand in 3-space.
Example "Graphemes" for Representing Cursive-Style Handwritten English-Alphabet Letters In formal linguistics, the basic primitive element of meaning in a language are termed "morphemes." In a similar manner, formal linguistics terms the basic primitive element of writing in a writing language are termed "graphemes."

Figure 21A:
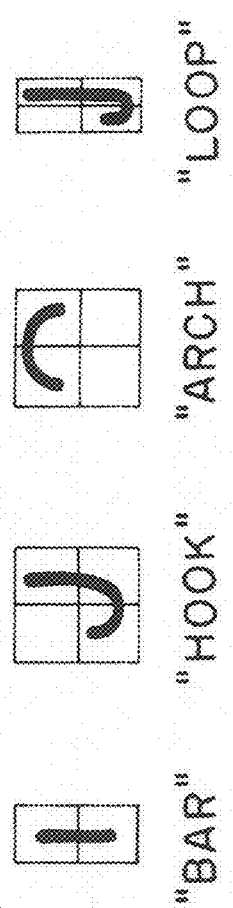
FIG. 21a illustrates an example set of four primitive handwriting segment shapes that could be used as components for representation of cursive-style handwritten English-alphabet letters.
Figure 21B:
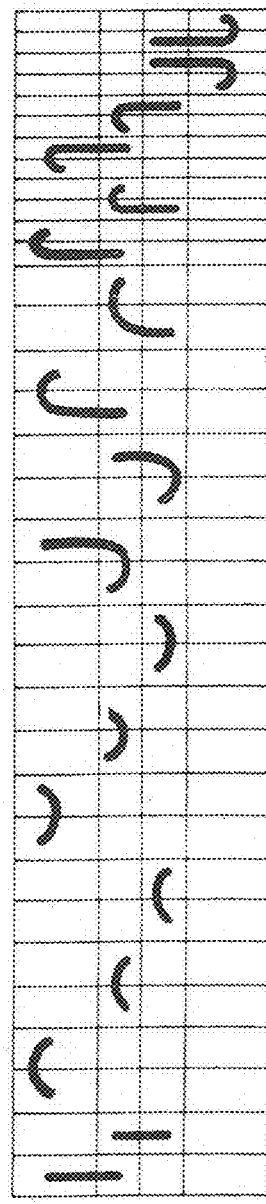

FIG. 21a, adapted from a 1961 paper by M. Eden, "On the Formalization of Handwriting" in Structure of Language and its Mathematical Aspects, American Mathematical Society, 1961 ("Eden" hereafter), illustrates an example set of four primitive handwriting segment shapes that could be used as components for representation of cursive-style handwritten English-alphabet letters. FIG. 21b, also adapted from Eden, illustrates an example an example set of eighteen primitive handwriting "graphemes" created from various translations and mirror-symmetry transformations of the example set of four primitive handwriting segment shapes depicted in FIG. 21a.

Figure 22:
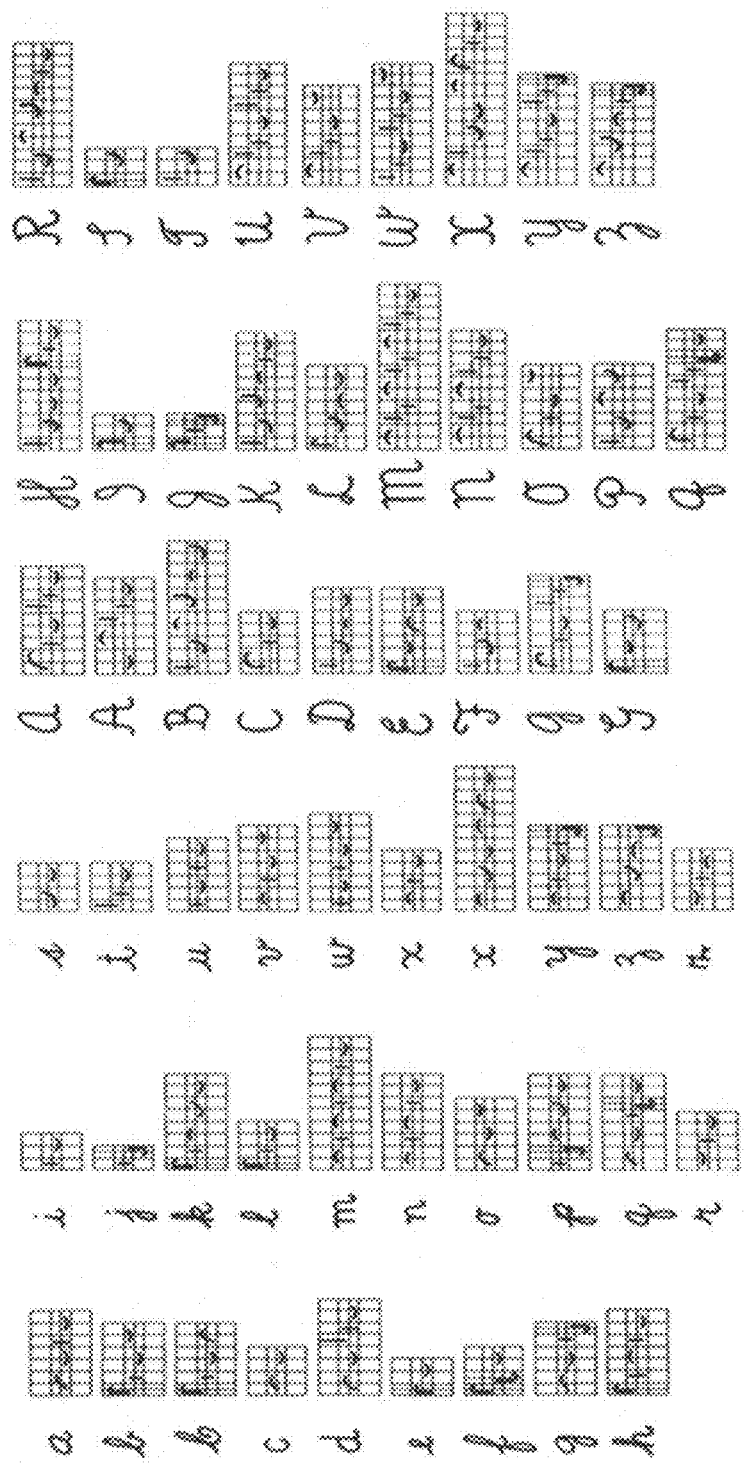
FIG. 22 illustrates an example decomposition of cursive-style handwritten English-alphabet letters in terms of the example set of eighteen primitive handwriting "graphemes" depicted in FIG. 21 b.

FIG. 22, also adapted from Eden, illustrates an example decomposition of cursive-style handwritten English-alphabet letters in terms of the example set of eighteen primitive handwriting "graphemes" depicted in FIG. 21a. In this example (Eden) system, the simultaneous presence of specific combinations of the eighteen primitive handwriting "graphemes" signifies a specific cursive-style handwritten English-alphabet letter.

Figure 23:
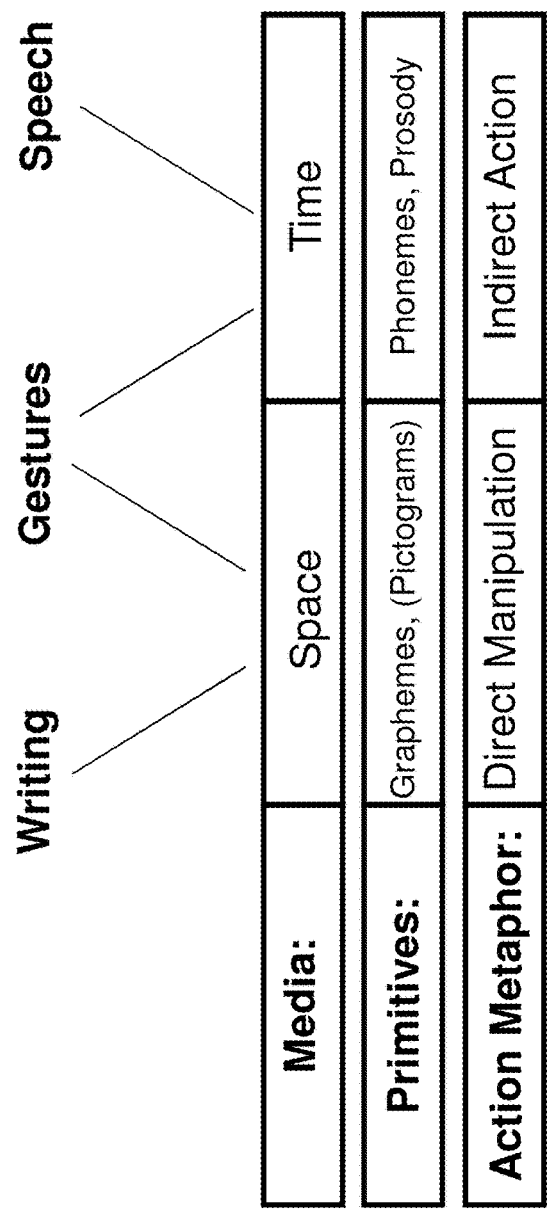
FIG. 23 illustrates an example comparison of gestures with writing and speech.

FIG. 23 illustrates an example comparison of gestures with writing and speech. Speech is rendered over time while writing is rendered over space. Gestures have aspects of both writing and speech, for example being rendered over space and over time. In relating this to the example provided in FIG. 22, the example (Eden) system employs simple combinatorial logic operations of the truth-values of the presence of the graphemes of FIG. 21.

In general (and in contrast), a gesture will replace Eden's simple combinatorial logic operations on the presence of specific graphemes used in writing with, instead, more complex "temporal logic" operations made on the detected sequence of specific graphemes. This can enable implementations wherein the temporal aspect of a rendered gesture can be advantageously included in the analysis of the detected sequence of the primitive elements of gestures and/or the structure of primitive elements of gestures. Accordingly, one can name a basic primitive element of a set of gestures as "gestemes" (a term devised and introduced in at least co-pending U.S. patent application Ser. Nos. 13/414,600, 13/414,705, and 13/464,946 as well as V. Zaliva, "3D Finger Posture Detection and Gesture Recognition on Touch Surfaces," *ICARCV* 2012:12*th International Conference on Control, Automation, Robotics and Vision*, Dec. 5-7, 2012). The gestures and their component gestemes can be for example, rendered by touch on a touch surface, rendered by hand motion in 3-space, rendered by eye motions in an eye-tracking user interface system, etc.

Because of the temporal aspects of gestures and gestemes, aspects of their rendering over time can be modulated as they often are in speech, and thus gestures also admit a chance for formal linguistic "prosody" to be imposed on gestures for conveyance of additional levels of meaning or representations of a parameter value. The notion of gesture prosody was introduced in at least co-pending U.S. patent application Ser. Nos. 13/414,600, 13/414,705, and 13/464,946.

Figure 24A:
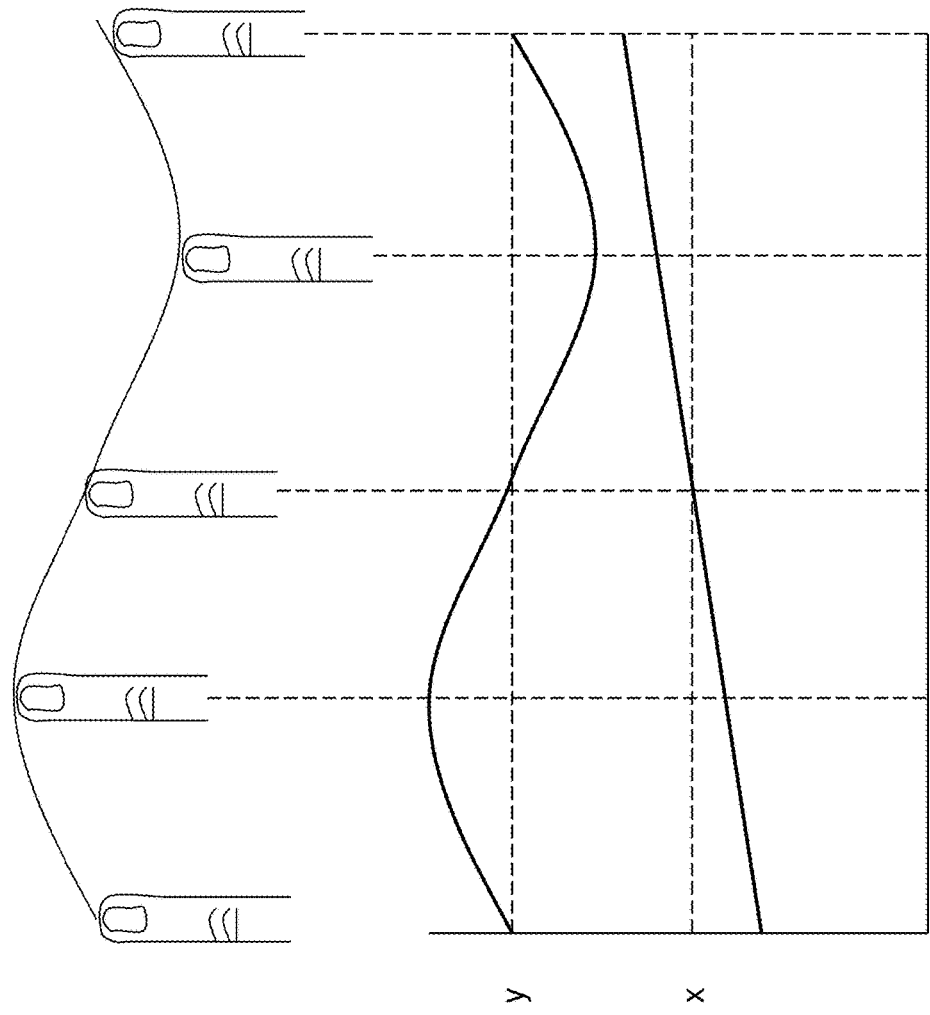
FIG. 24a illustrates an example "wiggle" gesture rendered in the shape of a sideways "S" and corresponding variation in "x" and "y" values associated with an aspect of the touch contact region on the touch surface (for example the top of the touch contact region, center of the touch contact region, etc.). Here the "x" value increases somewhat linearly and the "y" value is varied in a somewhat sinusoidal manner.

It this point it is useful to consider an example gesture and its execution. FIG. 24a illustrates an example "wiggle" gesture (rendered in the shape of a sideways "5") and the corresponding variation in "x" and "y" values over time associated with an aspect of the touch contact region on the touch surface (for example the top of the touch contact region, center of the touch contact region, etc.). In this example the "x" value increases somewhat linearly and the "y" value is varied in a somewhat sinusoidal manner, although of course many variations are possible and anticipated.

Figure 24B:
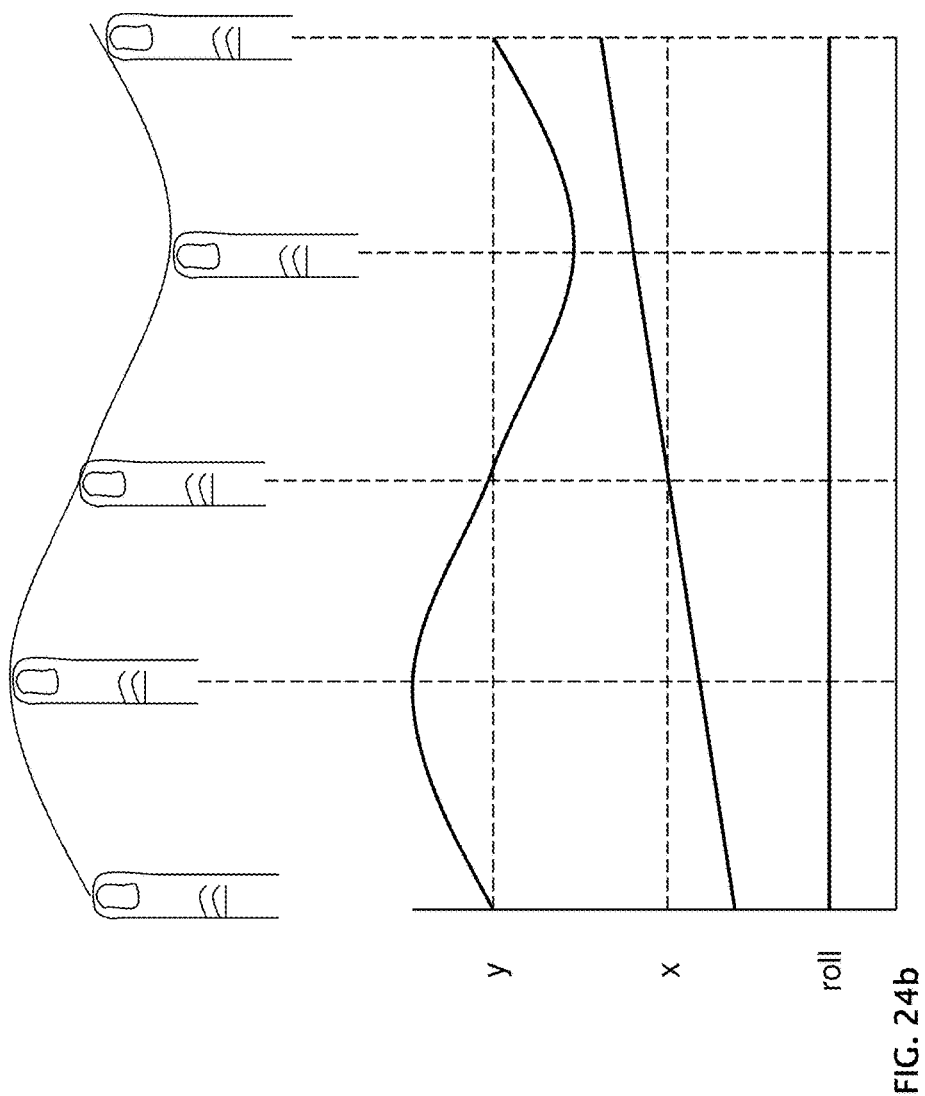
FIG. 24b illustrates an example broader view of the gesture of FIG. 24a wherein the gesture is measured by an HDTP system or other arrangement capable of measuring the angle of figure roll—here the roll angle of the finger is essentially constant.

As discussed earlier, an HDTP user interface can add additional touch sensor measurements, for example angles of roll, pitch, yaw, and variations in downward pressure, FIG. 24b illustrates an example broader view of the gesture of FIG. 24a wherein the gesture is measured by an HDTP system or other arrangement capable of measuring the angle of figure roll—here the roll angle of the finger is essentially constant. In some implementations, such a gesture would be executed differently (and recognized by an HDTP system as being different) from a touch gesture where one or more of downward pressure and the angles of roll, pitch, and yaw are varied over time. Similarly, in a user interface system responsive to rendered hand motion in 3-space, additional motion elements can be included as attributes that distinguish among gestures or elements of gestures.

Figure 25:
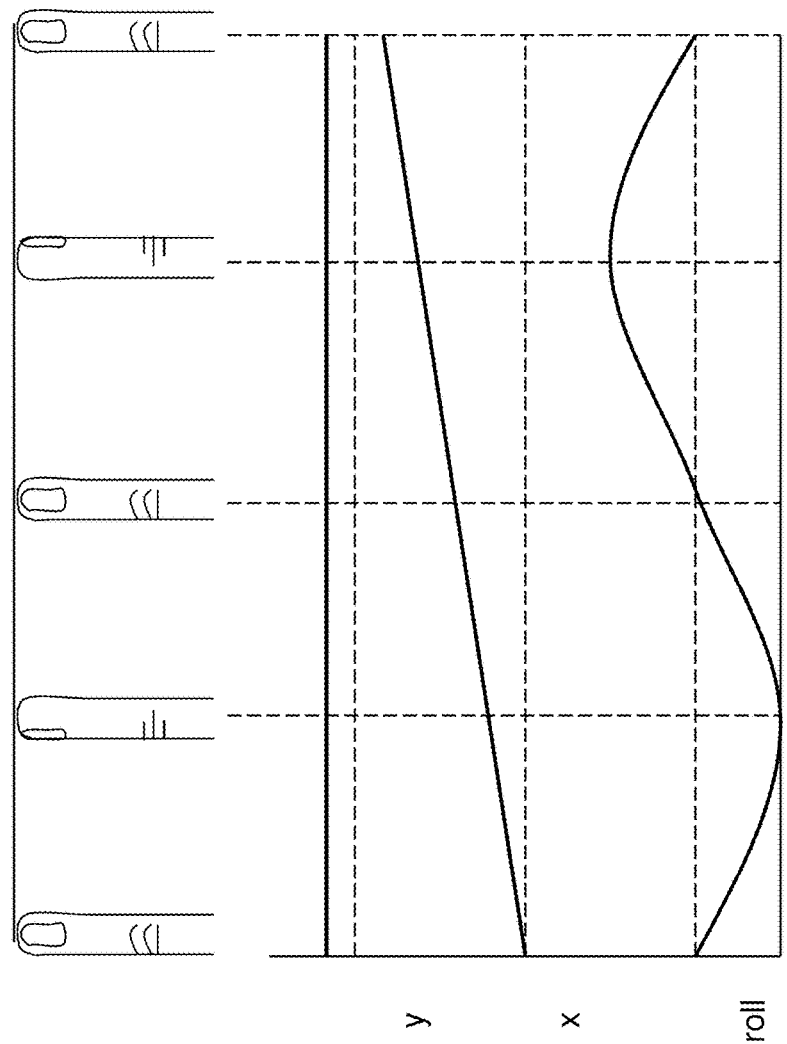
FIG. 25 illustrates an example variation on the example gesture of FIG. 24a wherein the roll angle of the finger is varied in a somewhat sinusoidal manner and the "y" value is essentially constant.
Figure 26:
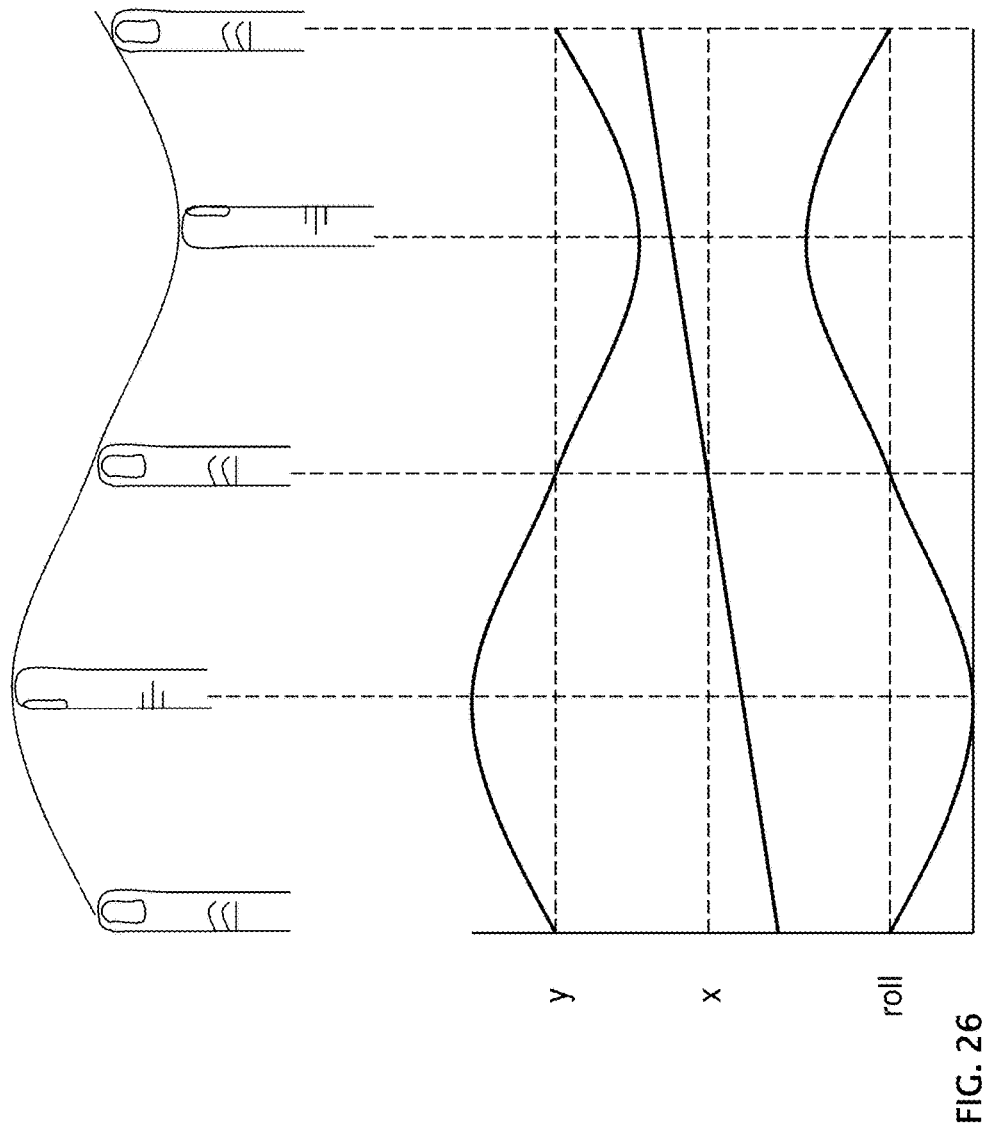
FIG. 26 illustrates an example variation on the example gesture of FIG. 24b and FIG. 25 wherein the "x" value increases somewhat linearly and both the "y" value and the finger roll angle are varied in a somewhat sinusoidal manner.
Figure 27:
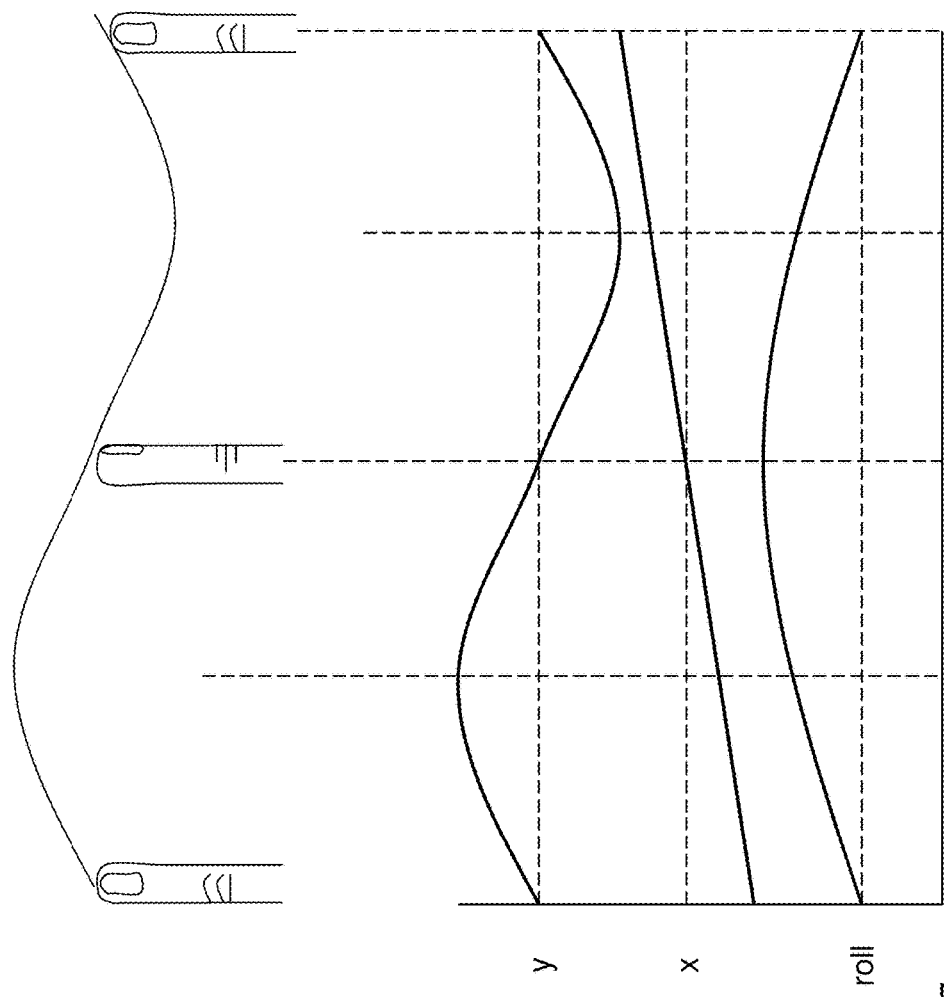
FIG. 27 illustrates an example variation on the example gesture of FIG. 24b, FIG. 25, and FIG. 26 wherein the "x" value increases linearly, the "y" value is varied in a somewhat sinusoidal manner, and the finger roll angle is varied in a somewhat parabolic manner.

As to the possibilities created by including additional measured or observed gesture execution attributes, FIG. 25 illustrates a first example variation on the example gesture of FIG. 24a wherein the roll angle of the finger is varied in a somewhat sinusoidal manner and the "y" value is essentially constant. That is, in this gesture, the roll angle is varied sinusoidally while the vertical position is maintained essentially constant. FIG. 26 illustrates a second example variation on the example gesture of FIG. 24b (and FIG. 25) wherein the "x" value increases somewhat linearly and both the "y" value and the finger roll angle are varied in a somewhat sinusoidal manner. FIG. 27 illustrates a more sophisticated example gesture, amounting to a variation on the example gesture of FIG. 24b, FIG. 25, and FIG. 26, wherein the "x" value increases linearly, the "y" value is varied in a somewhat sinusoidal manner, and the finger roll angle is varied in a somewhat parabolic (or half-sinusoidal) manner. Clearly the number of detectable gestures can be radically increased by including additional measured and/or observed gesture execution attributes. Additionally, including additional measured or observed gesture execution attributes creates the opportunities for creating a rich pallet of metaphors that the user interface can draw upon.

Figure 28:
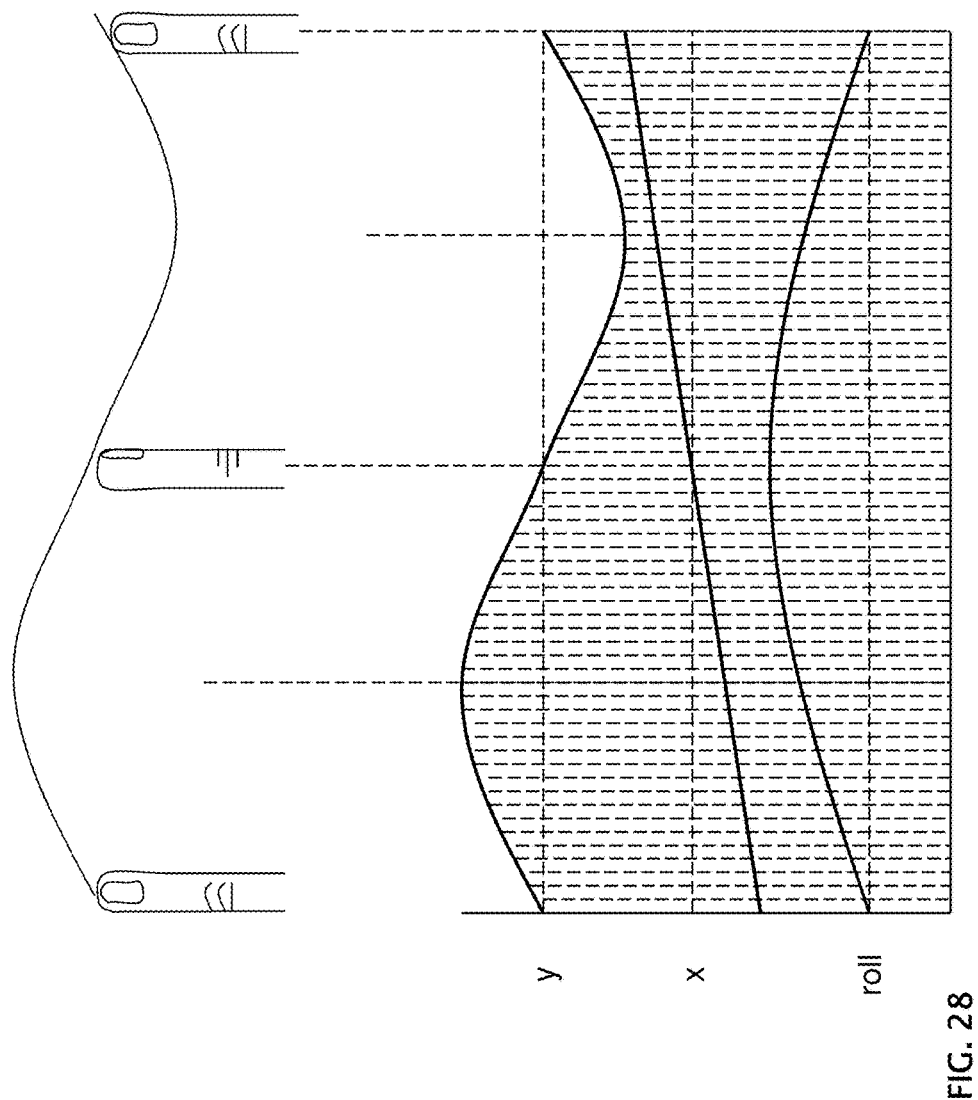
FIG. 28 illustrates an example instantaneous sampling of the example gesture rendered in FIG. 27.

It is noted in the measurement and acquisition of a rendered gesture, the sensing hardware is typically periodically scanned, sampled, polled, etc. The result can be a sequence of "frames" of measured tactile data and/or visual image data, a sequence of measured or derived user interface parameters calculated from the sequence of "frames" of measured tactile data and/or visual image data, etc. For example, FIG. 28 illustrates an example periodic sampling of the example gesture rendered in FIG. 27. Such periodic or near-periodic sampling could, for example, result in a sequence of measured or derived user interface parameter values.

Temporal, Spatial, and Other Forms of Prosody in the Rendering of Gestures or Gestemes The aforedescribed periodic or near-periodic sampling provides a way for measuring the length of time it takes to execute a gesture or parts of a gesture. This allows temporal variations in the rendering of a gesture, i.e. (temporal) gesture prosody, to be measured. Accordingly, the ability to measure temporal variations in the rendering of a gesture permits (temporal) gesture prosody to be used as another type of user interface input.

Figure 29:
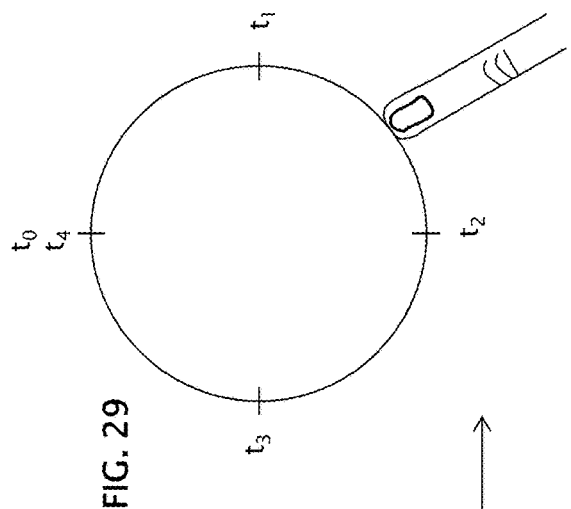
FIG. 29 illustrates an example circle-tracing (more generally, oval-tracing) gesture rendered over time. In this example, the interval of time between $t_0$ and $t_1$, $t_1$ and $t_2$, $t_2$ and $t_3$, as well as $t_3$ and $t_4$ are essentially identical.
Figure 30:
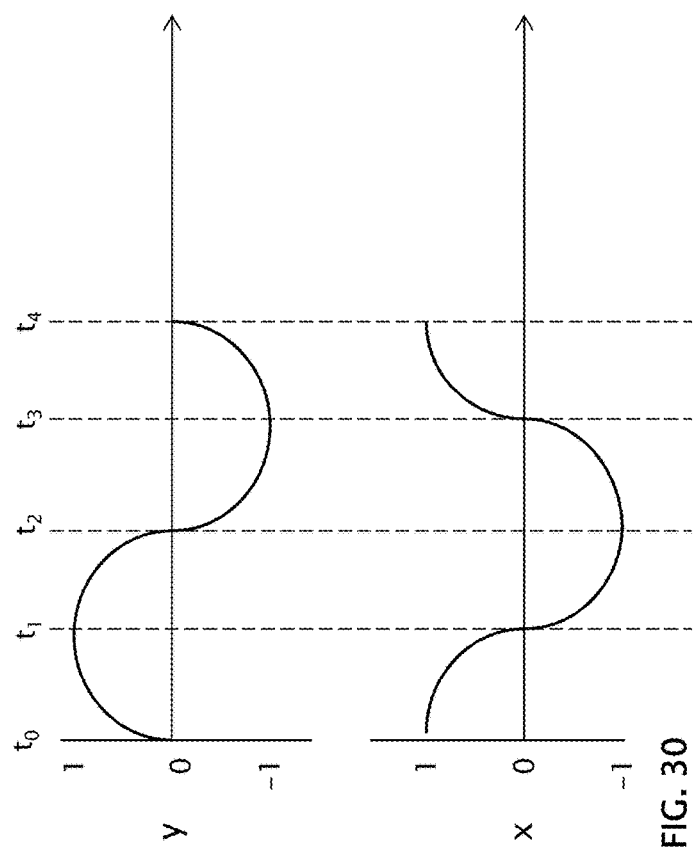
FIG. 30 illustrates an example variation in "x" and "y" values responsive to the circle-tracing gesture of FIG. 29.

FIG. 29 illustrates an example circle-tracing (or more generally, oval-tracing) gesture rendered over time, and FIG. 30 illustrates an example of the associated variation in "x" and "y" values responsive to the circle-tracing gesture of FIG. 29. In each of FIGS. 29 and 30, the rendering of the gesture has been segmented into four separate intervals, i.e., the interval of time between $t_0$ and $t_1$, $t_1$, the interval of time between $t_2$, the interval of time between $t_2$, and $t_3$, and the interval of time between $t_3$ and $t_4$. In the example relating to FIGS. 29 and 30, the interval of time between $t_0$ and $t_1$, $t_1$ and $t_2$, $t_2$ and $t_3$, as well as $t_3$ and $t_4$ are essentially identical. It is noted that varying the lengths of these time intervals with respect to each other and/or overall, variations in gesture prosody are rendered. In a similar fashion, other gestures, such as those depicted in FIGS. 24a, 24b, 25, 26, and 27 can be viewed as comprising two or more portions and the time taken to render each portion can be measured, calculated, and used as (temporal) gesture prosody user interface input.

Accordingly, it can be advantageous to have the notion of a gesteme to have both a spatial and temporal (i.e., temporal prosody) component. In various cases, temporal prosody of a gesteme and/or an overall gesture or sequence of gestures can be used selectively, as part of a gesteme's or gesture's semantic content, as a secondary channel of information, as a grammatical element, etc. More will provided as to (temporal) gesture prosody in the final sections of the present patent application. For the present, a few more remarks and example are provided concerning gestures and attributes of gestures, using touch-based gestures as the example framework.

Figure 32:
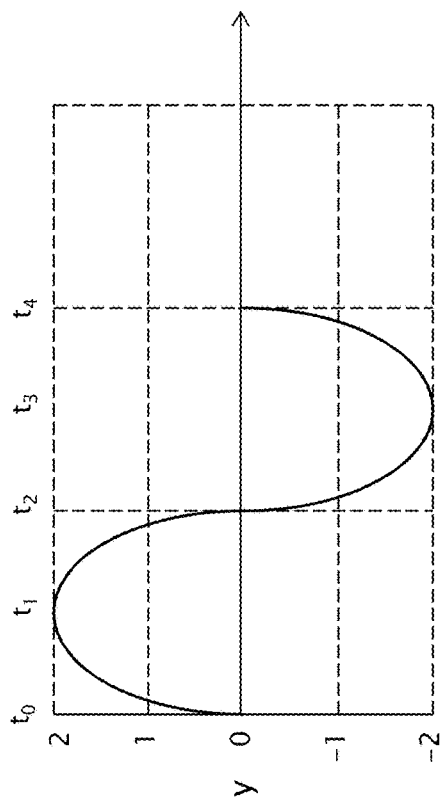
FIG. 32 illustrates an example variation in "x" values responsive to the oval-tracing gesture of FIG. 31.
Figure 33:
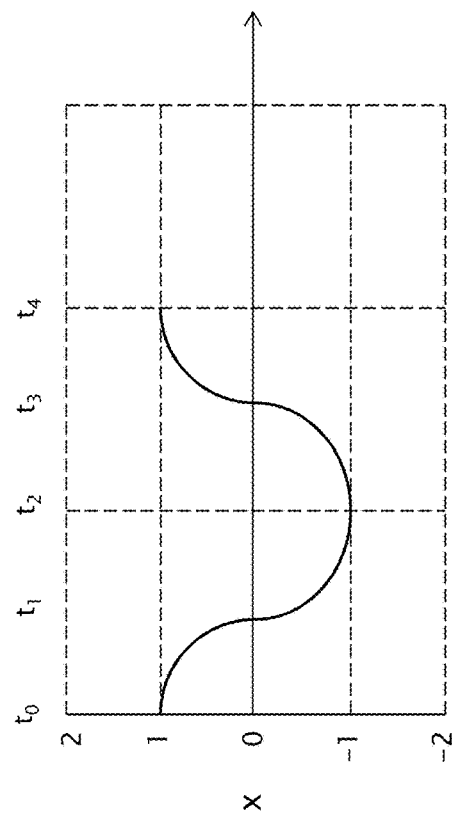
FIG. 33 illustrates an example variation in "y" values responsive to the oval-tracing gesture of FIG. 31.
Figure 31:
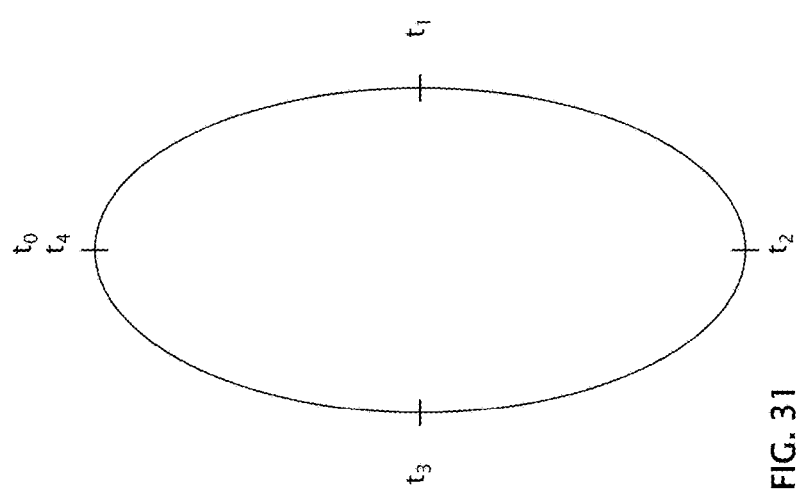
FIG. 31 illustrates an example variation on circle-tracing gesture of FIG. 29 wherein the gesture is either vertically elongated, horizontally contracted, both, or otherwise scaled so as to render a vertically aligned oval.

FIG. 31 illustrates an example shape variation on circle-tracing gesture of FIG. 29 wherein the gesture is either vertically elongated, horizontally contracted, both, or otherwise scaled so as to render a vertically aligned oval. FIG. 32 illustrates an example variation in "x" values responsive to the oval-tracing gesture of FIG. 31, while FIG. 33 illustrates an example variation in "y" values responsive to the oval-tracing gesture of FIG. 31. The differences in amplitude between the variation in "x" values and variation in "y" values are measureable and/or can be calculated. Note these, too, in comparison to those of the variation in "x" values and variation in "y" values shown in FIG. 30 for the circular gesture of depicted in FIG. 29.

Figure 34:
FIG. 34 illustrates an example set of parameterized gestemes which could be used to represent the oval-tracing gesture of FIG. 31.

FIG. 34 illustrates an example set of gestemes which could be used to represent the oval-tracing gesture of FIG. 31. These are different from quarter-circle shape gestemes that can be used in recognition of the circular gesture depicted in FIG. 29. The example set of gestemes depicted in FIG. 34 differ from the aforementioned quarter-circle gestemes by a warping of the proportions of the vertical dimension to the horizontal dimension, i.e., eccentricity (as in the eccentricity of an ellipse). The eccentricity of the gestemes can be measured as a "continuously-variable" parameter, classified into a set of ranges, etc. If the eccentricities include a case more symmetric in "x" and "y" directions, the parameterized gestemes can be used to represent both circle-tracing gesture of FIG. 29 and the oval-tracing gesture of FIG. 31. Also note that the example set of gestemes depicted in FIG. 34 differ in rotation angle. In some embodiments, gesteme detection can be implemented so as to include rotation angle as a "continuously-variable" parameter, classified into a set of ranges, etc.

Further as to the example of FIG. 31 and compared to the gesture of FIG. 29, here an elongated or contraction metaphor can use be rendered and used as type of "spatial prosody" for the gesture. Other examples of spatial prosody could include, for example, rotation of the gesture, localized distortions in the rendering of a gesture (for example, contracting or expanding a local portion of the gesture shape), etc.

The invention also provides for prosody rendered in or with other attributes of gestures and/or gestemes besides spatial (shape) and temporal span (length of time taken to render). For example, variations in downward pressure can be rendered by the user and measured by the system as various distinguishable types of gesture prosody. As another example, variations in one or more finger angles (i.e., roll, pitch, yaw) can be rendered by the user and measured by the system as various distinguishable types of gesture prosody. As another example, variations in the final velocity of a gesture that ends in a velocity of a spatial touch parameter can be rendered by the user and measured by the system as various distinguishable types of gesture prosody. As another example, variations in the final velocity of a gesture that ends in a velocity of a angle touch parameter (i.e., roll, pitch, yaw) can be rendered by the user and measured by the system as various distinguishable types of gesture prosody.

The invention further provides for rendered and detected gesture prosody in single-finger gestures, multiple-finger gestures, and mixed single-finger/multiple-finger gestures.

Figure 35:
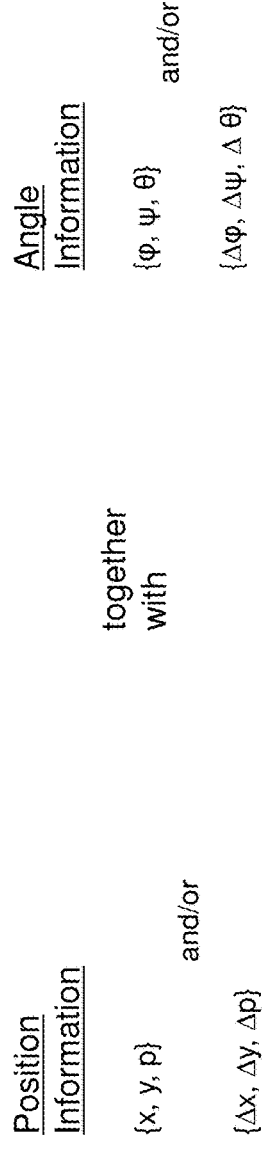
FIG. 35 illustrates an example set of parameters useful for classifying gestures measured by an example HDTP system.

Gestures and Gestemes Using HDTP, Video Cameras, and Other High-Dimensional User Interfaces As previously mentioned, the HDTP ("High Dimensional Touch Pad") technology, which can be implemented as a touchscreen, provides many more measured parameters, for example, downward pressure and the angles of roll, pitch, and yaw for a single finger, plus other types of parameters from multiple-finger contact with the touch sensor. Further, these can be varied over time, thus allowing variation in one or more of these many measured parameters to be used in the rendering and detection of touch gestures (for example, as pointed out in the preceding examples relating to FIGS. 24b, 25, 26, and 27, in addition to a wide range of other possibilities). FIG. 35 illustrates an example set of parameters useful for classifying gestures measured by an example HDTP system.

As taught in section 2.1.7.2 of U.S. Pat. No. 6,570,078, pending U.S. patent application Ser. No. 10/683,915, and U.S. patent application Ser. No. 13/706,214, two or more video cameras can be used in orthogonal or stereoscopic arrangements to capture hand expressions within 3-space regions. Also as taught in U.S. patent application Ser. No. 13/706,214, a user interface comprising one or more video cameras can be used to implement user interface functions beyond those of HDTP functions, which in turn can be used to control applications. These user interface functions beyond those of HDTP functions would typically also comprise many measured parameters that can be varied over time, thus allowing variation in one or more of these many measured parameters to be used in the rendering and detection of hand and/or touch gestures.

In a simple approach, the values of one or more of the parameters (produced by an HDTP system, a video camera user interface system, or similar user interface system) and the simple numerical sign (sufficiently positive, sufficiently close to zero, or sufficiently negative) of the change in one or more of user interface parameters (produced by an HDTP system, a video camera user interface system, or similar user interface system) can be used as primitives for creating a gesteme and/or gesture detection system. Such teachings can be found, for example, in pending U.S. patent application Ser. No. 13/414,705. However, more sophisticated approaches for creating a gesteme and/or gesture detection system are possible as will be described in the material to follow.

Signal-Space Approaches to Gesteme and Gesture Detection and Gesture Grammars

Figure 36A:
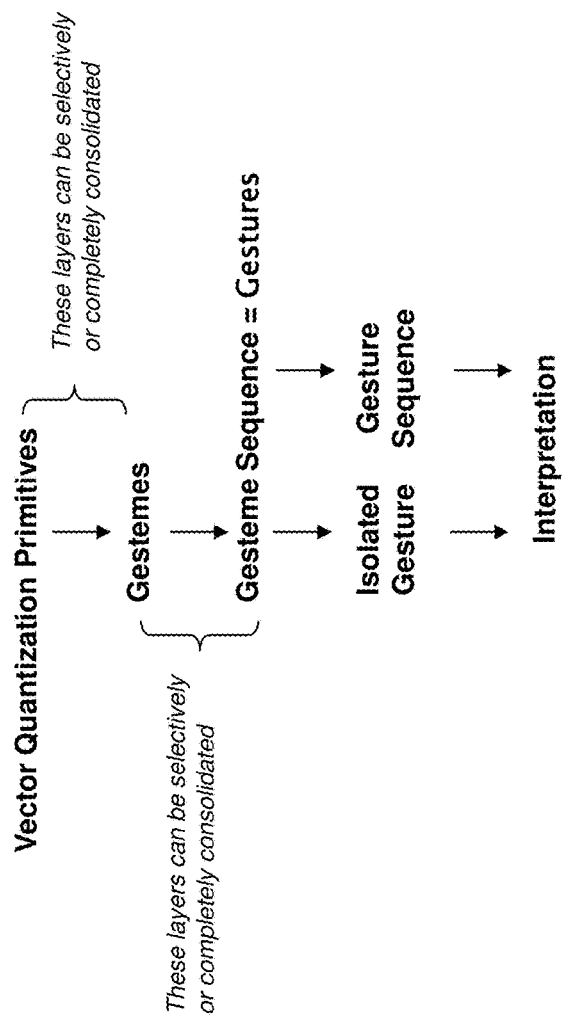
FIG. 36a illustrates an example hierarchy of gestemes, gestures, and other elements as can be advantageous in the design of a signal space and automata architecture for gesture capture, including support for interpretation.

FIG. 36a illustrates an example hierarchy of gestemes, gestures, and other elements as can be advantageous in the design of a signal space and automata architecture for gesture capture, including support for interpretation. For the purposes of this framework, a gesture will be viewed as a sequence of gestemes. Embodiments of the invention also provide for the inclusion of gestures that comprise only a single gesteme. In this example, measurements and signals from user interface hardware are presented to vector quantizing functions that classify (and thus recognize) at least some of the most recent measurements and signals as recognizable gestemes. One or more recognizable gestemes can be recognized as a recognizable gesteme sequence, and at least some of the possible recognizable gesteme sequences can be interpreted as a recognizable gesture. An isolated gesture can be assigned meaning and/or interpretation, and further a sequence of two or more gestures can be assigned meaning and/or interpretation. In various implementations, it can be advantageous to merge some of the aforedescribed steps, operations, and functions, for example as suggested in the FIG. 36a.

Figure 36B:
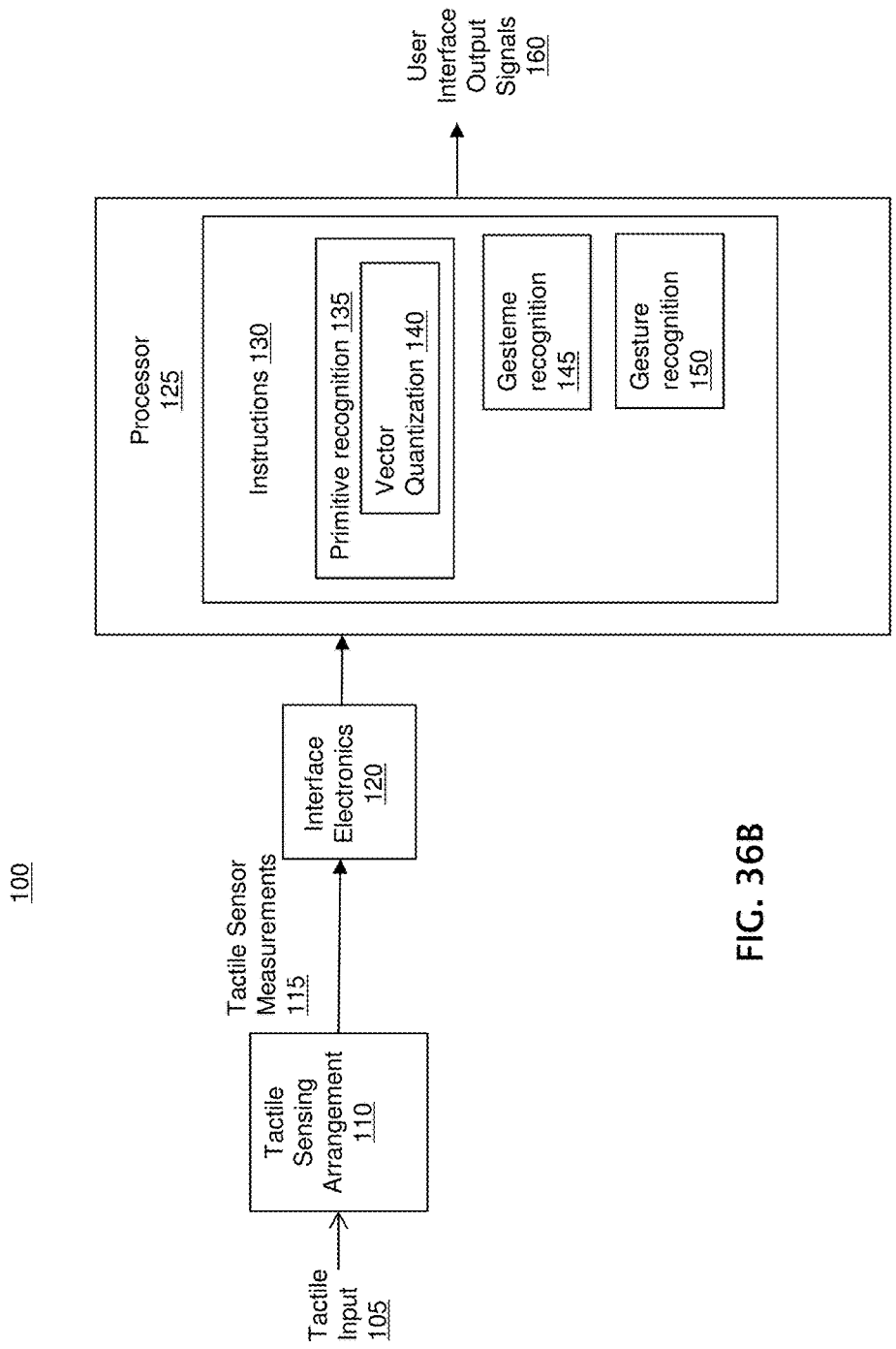
FIG. 36b illustrates an embodiment of a system according to an embodiment of the present invention.

FIG. 36b depicts a system 100 for providing a touch-based user interface according to an embodiment of the invention. System 100 implements a user interface that receives a tactile input 105, such as by touch contact by at least one finger of a human user. A tactile sensing arrangement 110 generates tactile sensing measurements 115 in response to the tactile input 105 and provides tactile sensing measurements 115 via interface electronics 120 to a computational processor 125. The processor 125 stores instructions 130 in memory, which upon execution, use the tactile sensing measurements 105 to generate user interface output signals 160.

Instructions 130 include primitive recognition instructions 135 to process the tactile sensor measurements 114 and extract a plurality of primitives. In one embodiment, primitive recognition instructions 135 generate a primitive recognition event responsive to the detection of a primitive. In one embodiment, a primitive is detected by a vector quantization operation 140 acting on a vector of user interface parameter values, which are calculated from tactile sensing measurements 115. In one embodiment, the primitive is detected by a vector quantization operation 140 acting on a sequence of user interface parameter values, the user interface parameter values calculated from tactile sensing measurements 115.

Instructions 130 include gesteme recognition instructions 145 to process one or more primitives to generate a gesteme recognition event. As discussed above with reference to FIG. 36a, a gesteme comprises at least one specific primitive. In one embodiment, the gesteme recognition event is responsive to a sequence of primitive recognition events. In one embodiment, the gesteme recognition event comprises shape recognition. In one embodiment, the gesteme recognition event comprises prosody recognition.

Instructions 130 include gesteme recognition instructions 150 to process a sequence of gesteme recognition events to generate a gesture recognition event. As discussed above with reference to FIG. 36a, a gesture corresponds to a particular sequence of gestemes. Instructions 130 cause processor 125 to generate user interface output signals 160 responsive to the gesture recognition event.

In one embodiment, the gesture prosody recognition comprises temporal gesture prosody. In one embodiment, the gesture prosody recognition comprises gesture shape prosody. In one embodiment, the gesture prosody comprises modulation of at least one user interface parameter.

In one embodiment, the gesture recognition event is accompanied by gesture prosody recognition. In one embodiment, the gesture prosody recognition comprises temporal gesture prosody. In one embodiment, the gesture prosody recognition comprises gesture shape prosody. In one embodiment, the gesture prosody recognition modifies the interpretation of the gesteme recognition event.

In one embodiment, the gesture prosody recognition modifies the interpretation of the gesteme recognition event.

In one embodiment, the gesture prosody comprises modulation of at least one user interface parameter.

In one embodiment, the gesture prosody recognition modifies the interpretation of the gesture recognition event.

In one embodiment, gesture prosody is used as part of gesture grammar arrangement.

Figure 37A:
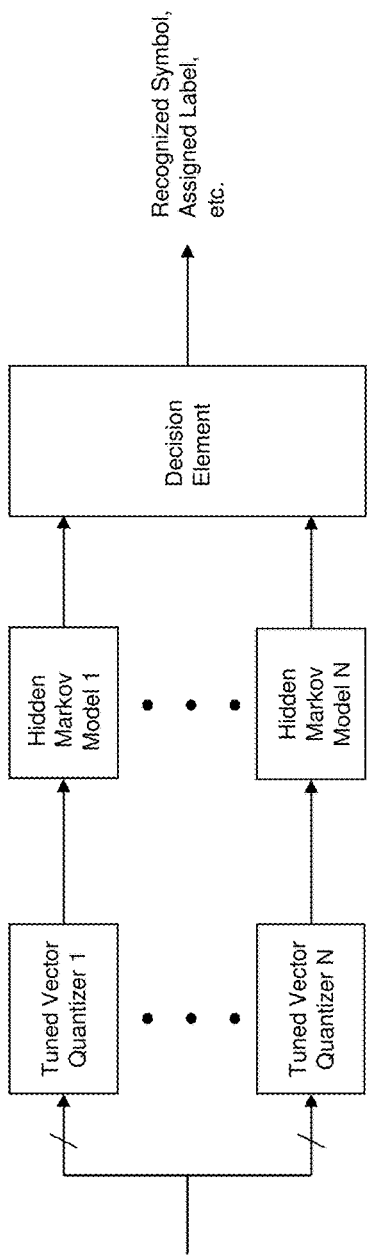
FIG. 37a illustrates an example gesteme or gesture recognition arrangement employing one or more tuned vector quantizers and associated Hidden Markov Model elements, each providing output signals to a decision element which in turn produces a recognition signal.
Figure 37B:
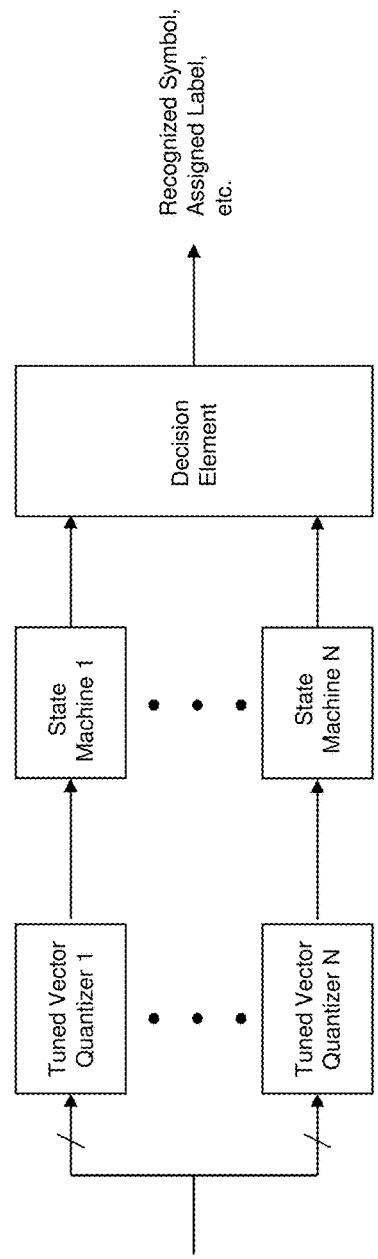
FIG. 37b illustrates an example gesteme or gesture recognition arrangement employing one or more tuned vector quantizers and associated State Machine elements, each providing output signals to a decision element which in turn produces a recognition signal.

A wide range of approaches can be used to recognize gestemes and gestures, and several will be considered in the material to follow. In one example high-level approach, FIG. 37a illustrates an example gesteme or gesture recognition arrangement employing one or more tuned vector quantizers and associated Hidden Markov Model elements, each providing output signals to a decision element which in turn produces a recognition signal. In an implementation, each of the vector quantizers is provided at each periodic (or near-periodic) sample time with a vector of parameter values provided by the user interface system (for example, the current {x,y} coordinates of touch in a simple touch pad, the more complex collection of parameter values provided by a HDTP system or video camera user interface system, etc.) FIG. 37b illustrates an example "deterministic" variation of this comprising State Machine elements (rather than Hidden Markov Model elements) associated with the one or more tuned vector quantizers, each providing output signals to a decision element which in turn produces a recognition signal. In these approaches, a plurality of vector quantizers, each individually tuned for user interface hardware measurements or signals corresponding to specific gestemes are used, and each Hidden Markov Model or State Machine is used to match a sequence of recognized gestemes to a specific gesture. The matching provided by each of the Hidden Markov Model or State Machine elements results in some sort of yes/no or scoring output, and from these yes/no or scoring outputs a decision element provides indication of a recognized symbol, an assigned label, etc.

Figure 38A:
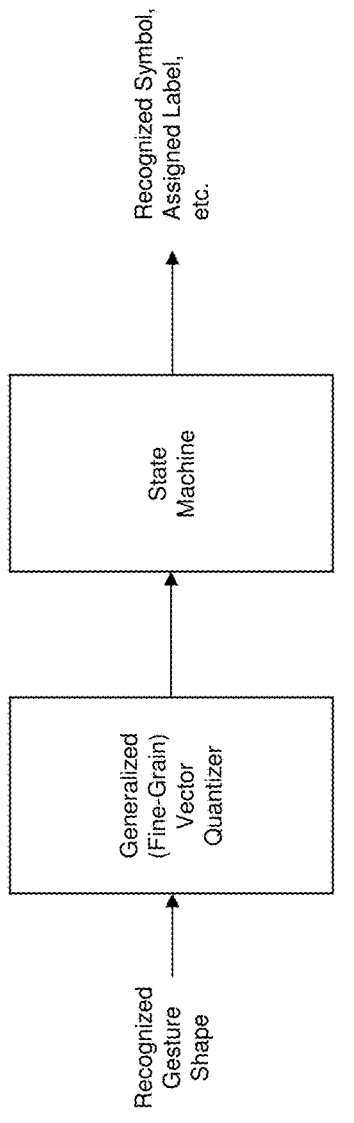
FIG. 38a illustrates an example wherein a single generalized vector quantizer is provided with parameters of a recognized gesture shape.
Figure 38B:
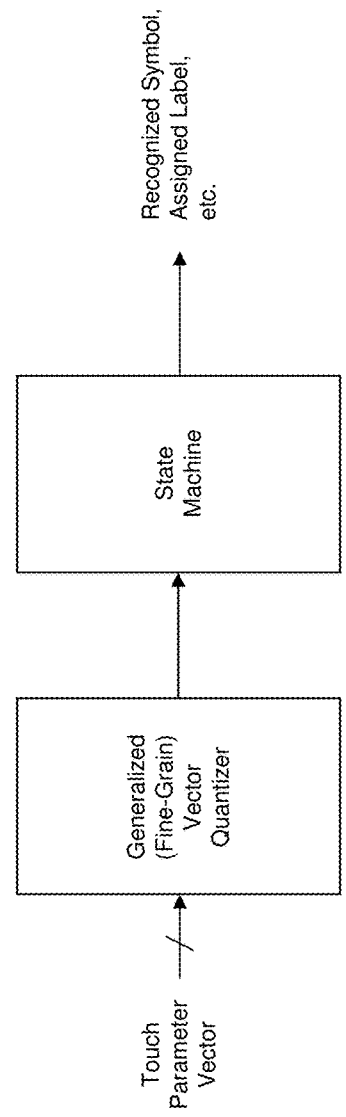
FIG. 38b illustrates an example generalized "fine-grain" vector quantizer is provided with a vector of touch parameters.
Figure 38C:
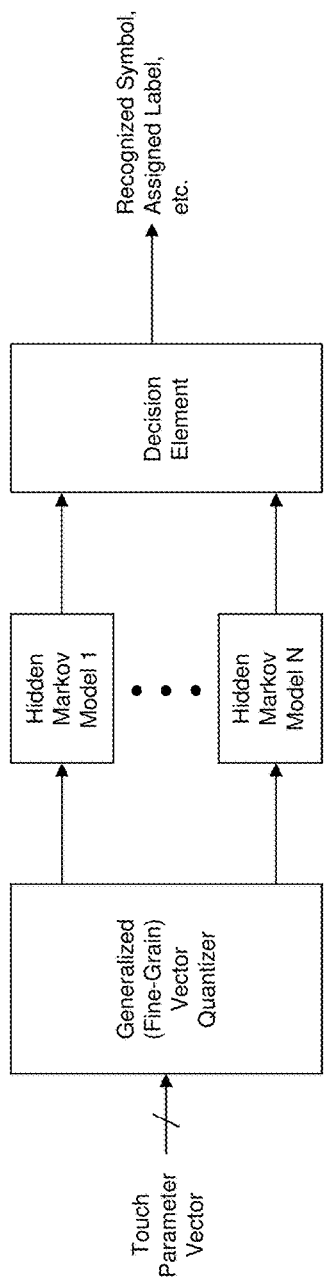
FIG. 38c illustrates an example generalized "fine-grain" vector quantizer providing multiple outputs to a plurality of Hidden Markov Model elements which in turn produce signals directed to a decision element, which in turn produces a recognition signal.
Figure 38D:
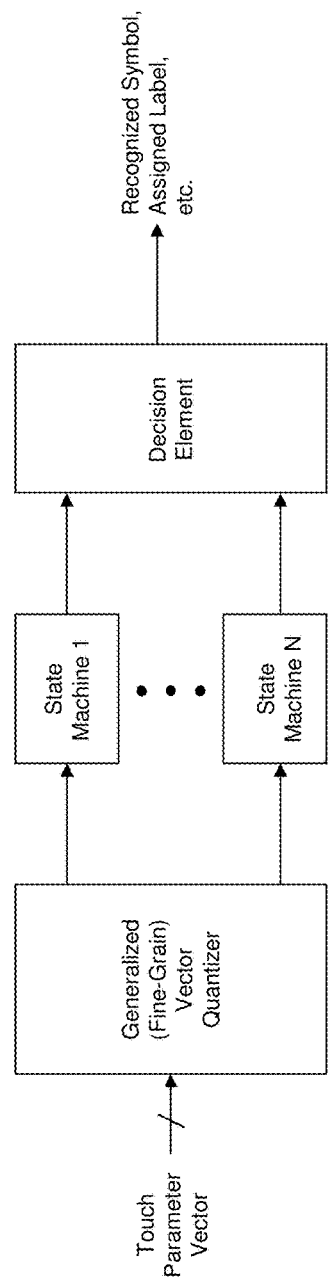
FIG. 38d illustrates an example generalized "fine-grain" vector quantizer providing multiple outputs to a plurality of state machine elements which in turn produce signals directed to a decision element, which in turn produces a recognition signal.

Alternatively, the ensemble of tuned quantizers can be replaced with a single generalized vector quantizer and the associated ensemble of Hidden Markov Model or State Machine elements can be replaced with a single generalized Hidden Markov Model or State Machine element. Here the single generalized vector quantizer is arranged so that it provides a fine-grain quantization spanning the primitive regions needed to recognize and distinguish among all the anticipated gesteme conditions—some examples of this will be provided shortly. As an example FIG. 38a illustrates an example wherein a single generalized vector quantizer is provided with parameters of a recognized gesture shape. The generalized "fine-grain" vector quantizer provides its output to a single generalized state machine which in turn produces a recognition signal. FIG. 38b illustrates an example generalized "fine-grain" vector quantizer is provided with a vector of touch parameters The generalized "fine-grain" vector quantizer provides its output to a generalized state machine which in turn produces a recognition signal. Hybrid arrangements are also possible, for example FIG. 38c illustrates an example generalized "fine-grain" vector quantizer providing multiple outputs to a plurality of Hidden Markov Model elements which in turn produce signals directed to a decision element, which in turn produces a recognition signal, while FIG. 38d illustrates an example generalized "fine-grain" vector quantizer providing multiple outputs to a plurality of state machine elements which in turn produce signals directed to a decision element, which in turn produces a recognition signal.

Figure 39A:
Figure 39A:
Figure 39C:

FIGS. 39a-39c illustrates examples of collections of gesture shape primitives which can be associated with a signal space and which can serve as gestemes. The distinguished recognition of these can include curve fitting, match filters, least-squared error comparison, parameterized curve fitting (i.e., polynomial regression, etc.). FIG. 39a depicts the largest example collection comprising lines and curves of various rotation angles and (in the case of curves) eccentricities. FIG. 39b depicts a slightly smaller collection comprising lines and curves of various rotation angles but without variations in eccentricities. As will be described, detector approaches can include rotation corrections alignment operations. These can be used to simplify the collections of gesture shape primitives. For example, FIG. 39b depicts a much smaller collection comprising one lines and one curve, useful because rotation operations can be used together with the collection depicted in FIG. 39c to create all of the members of the collection depicted in FIG. 39b.

Figure 40E:
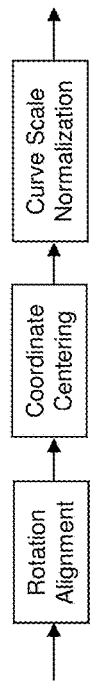
FIGS. 40e-40j depict example arrangements that can precede the arrangements of FIG. 40a and FIG. 40b or other detector, the example arrangements comprising the concatenation of three or more of the above operations (curve coordinate centering operations, curve scale normalization operations, and rotation alignment operations).
Figure 40F:
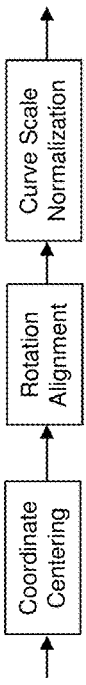
Figure 40G:
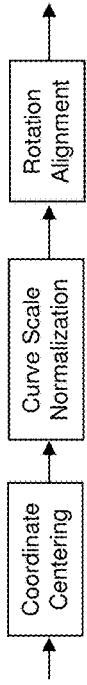
Figure 40H:
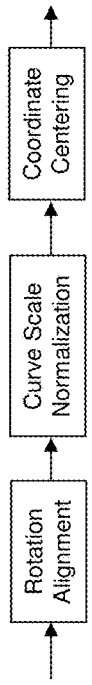
Figure 40I:
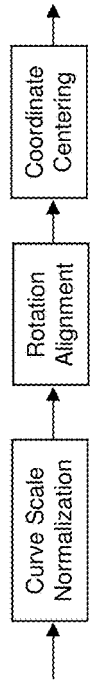
Figure 40J:
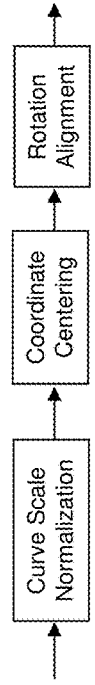
Figure 40A:
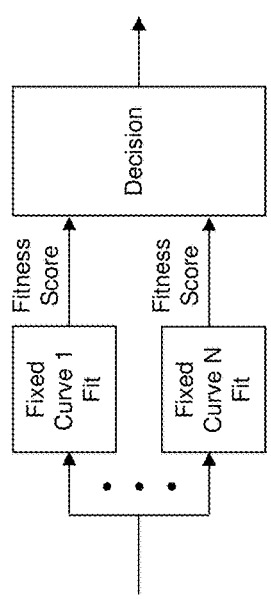
FIG. 40a illustrates an example arrangement wherein a series of vectors corresponding to user interface parameters or measurements made over time is presented to a plurality of curve fit operations.

FIG. 40a illustrates an example arrangement wherein a series of vectors corresponding to user interface parameters or measurements made over time is presented to a plurality of curve fit operations. Each such curve fit operation, for example, attempts to match the series of vectors (corresponding to parameters or measurements made over time) to the lines and curves from a provided or selected "gesteme" collection (for example any of the collections depicted in FIGS. 39a-39c), and produce a corresponding "fitness score." A decision element compares the scores and provides indication of a recognized symbol, an assigned label, etc.

Figure 40B:
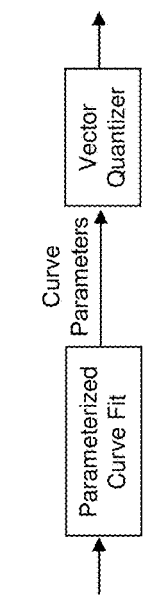
FIG. 40b illustrates an example of an alternative arrangement to that of FIG. 40a wherein a parameterized curve fitting (i.e., polynomial regression) operation is used to create distinguishing sets of coefficient values that uniquely correspond to each of the collections of lines and curves from a provided or selected gesteme collection; the sets of coefficient values can be provided to a vector quantizer that classifies these to provide indication of a recognized symbol, an assigned label, etc.

Further, it is noted that a detector comprising at least a second order parameterized curve fitting (i.e., polynomial regression) capability can provide distinguishing sets of coefficient values, each set uniquely correspond to each of the collections depicted in FIGS. 39a-39c as well as other collections. Accordingly FIG. 40b illustrates an example of an alternative arrangement to that of FIG. 40a wherein a parameterized curve fitting (i.e., polynomial regression) operation is used to create distinguishing sets of coefficient values that uniquely correspond to each of the collections of lines and curves from a provided or selected gesteme collection. The sets of coefficient values can be provided to a vector quantizer that classifies these to provide indication of a recognized symbol, an assigned label, etc.

Implementations of the arrangements of FIG. 40a and FIG. 40b can advantageously leverage or benefit from various sorts of preprocessing steps. These can include curve coordinate centering operations, curve scale normalization operations, and rotation alignment operations. Each of the operations can be used to modify the curve data provided to it, and also provide the value(s) of the parameters used to implement the correction (centroid values, computed size or scaling value, rotation value, etc.). The value(s) of the parameters used to implement the correction (centroid values, computed size or scaling value, rotation value, etc.) can then serve as part of the detected information. In many cases, as indicated above, the collection of primitive signals or gestemes can be accordingly be greatly simplified.

Curve coordinate centering operations can be implemented in various ways, for example determining the extreme ranges in coordinate values of the curve, determining the distance between these for each dimension, dividing each by 2 to obtain the centroid, and shifting each point of the curve by an amount responsive to the values of the coordinates of the centroid. Similarly, curve normalizing operations can be implemented in various ways, for example determining the extreme ranges in coordinate values of the centered curve, determining the distance between the extremes for each dimension, and dividing the value of each point of the curve by a factor responsive to the values of the distance between the extremes for each dimension. Curve rotation alignment operations can be implemented in various ways, for example using the same algorithm and/or closed-form calculation approach taught in U.S. Pat. No. 8,170,346.

In various embodiments, the arrangements of FIG. 40a and FIG. 40b or other detector can be provided the output of any one of the above operations curve coordinate centering operations, curve scale normalization operations, and rotation alignment operations.

Figure 40C:
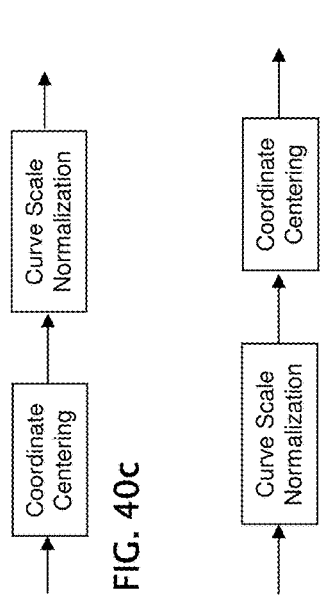
FIG. 40c illustrates an example arrangement that can precede the detector arrangements of FIG. 40a or FIG. 40b wherein a coordinate centering operation is followed by a curve scale normalization operation, and the result is provided to detector arrangements of FIG. 40a or FIG. 40b.
Figure 40D:
FIG. 40d illustrates an example arrangement that can precede the arrangements of FIG. 40a or FIG. 40b wherein a curve scale normalization operation is followed by a coordinate centering operation, and the result is provided to detector arrangements of FIG. 40a or FIG. 40b.

Additionally, in various embodiments, the arrangements of FIG. 40a and FIG. 40b or other detector can be provided the output of the concatenation of two or more of the above operations (curve coordinate centering operations, curve scale normalization operations, and rotation alignment operations). For example, FIG. 40c illustrates an example arrangement that can precede the detector arrangements of FIG. 40a or FIG. 40b wherein a coordinate centering operation is followed by a curve scale normalization operation, and the result is provided to detector arrangements of FIG. 40a or FIG. 40b. Similarly, FIG. 40d illustrates an example arrangement that can precede the arrangements of FIG. 40a or FIG. 40b wherein a curve scale normalization operation is followed by a coordinate centering operation, and the result is provided to detector arrangements of FIG. 40a or FIG. 40b. Other combinations and variations are also possible and are provided for and anticipated by the present invention.

Further, in various embodiments, the arrangements of FIG. 40a and FIG. 40b or other detector can be provided the output of the concatenation of three or more of the above operations (curve coordinate centering operations, curve scale normalization operations, and rotation alignment operations). For example, FIG. 40e illustrates an example arrangement than can precede the arrangements of FIG. 40a or FIG. 40b wherein a rotation alignment operation is followed by a coordinate centering operation, which is in turn followed by a curve scale normalization operation, and the result is provided to detector arrangements of FIG. 40a or FIG. 40b.

FIG. 40f illustrates an example arrangement than can precede the arrangements of FIG. 40a or FIG. 40b wherein a coordinate centering operation is followed by a rotation alignment operation, which is in turn followed by a curve scale normalization operation, and the result is provided to detector arrangements of FIG. 40a or FIG. 40b.

FIG. 40g illustrates an example arrangement than can precede the arrangements of FIG. 40a or FIG. 40b wherein a coordinate centering operation is followed by a curve scale normalization operation, which is in turn followed by a rotation alignment operation, and the result is provided to detector arrangements of FIG. 40a or FIG. 40b.

FIG. 40h illustrates an example arrangement than can precede the arrangements of FIG. 40a or FIG. 40b wherein a rotation alignment operation is followed by a curve scale normalization operation, which is in turn followed by a coordinate centering operation, and the result is provided to detector arrangements of FIG. 40a or FIG. 40b.

FIG. 40i illustrates an example arrangement than can precede the arrangements of FIG. 40a or FIG. 40b wherein a curve scale normalization operation is followed by a rotation alignment operation, which is in turn followed by a coordinate centering operation, and the result is provided to detector arrangements of FIG. 40a or FIG. 40b.

FIG. 40j illustrates an example arrangement than can precede the arrangements of FIG. 40a or FIG. 40b wherein a curve scale normalization operation is followed by a coordinate centering operation, which is in turn followed by a rotation alignment operation, and the result is provided to detector arrangements of FIG. 40a or FIG. 40b.

Attention is now directed to vector quantization details. FIG. 41a illustrates an example vector quantization of an example two-dimensional signal space associated with symbols useful for gesteme or gesture recognition. Here the admissible portions of a region of two user interface parameter values (for example $\{x,y\}$ although other parameter pairs can be used, such as $\{x, \text{roll-angle}\}$) is divided up into bordering sub-regions labeled $S_1$ through $S_6$, each associated with symbols $S_1$ through $S_6$. Such a vector quantizer is "tuned" to the gesteme collection comprising gestemes $S_1$ through $S_6$. For example, another gesteme collection comprising a different set of gestemes $T_1$ through $T_6$ would not (except for a degenerate case of equivalence or subsets) be completely served by a vector quantizer "tuned" to the gesteme collection comprising gestemes $S_1$ through $S_6$.

Regarding fine-grain vector quantization spanning the capabilities, consider a somewhat finer partition of the admissible portions of a region of two user interface parameter values considered above. For example, FIG. 41b illustrates an example vector quantization of an example signal space associated with primitives of gestemes or gestures from the example signal space of FIG. 41a. Note a given symbol in the signal space of FIG. 41a ("S" elements) is comprised of one or primitive sub-regions ("P" elements) in the signal space of FIG. 41b, and a given primitive can be comprised by one or more symbols. Because region $S_1$ is comprised of the joiner of three smaller sub-regions regions $P_1$, $P_5$, and $P_6$, a vector quantizer tuned to the "P" primitives collection can fully serve the "S" gesteme collection as well as other possible gesteme collections. In particular, FIG. 41c illustrates an alternative example vector quantization of the example two-dimensional signal space associated with symbols useful for gesteme or gesture recognition, and which is compatible with the set of "P" primitives. Note a given symbol in the signal space of FIG. 41c ("T" elements) is comprised of one or primitives ("P" elements) in the signal space of FIG. 41b, and a given primitive can be comprised by one or more symbols. Thus both the symbol-associated signal space of FIG. 41a ("S" elements) and symbol-associated signal space of FIG. 41c ("T" elements) can be supported from the same primitives signal space of FIG. 41b ("P" elements). FIG. 41d depicts the set relations among the symbol-associated signal space of FIG. 41a ("S" elements), symbol-associated signal space of FIG. 41c ("T" elements), and the underlying primitives signal space of FIG. 41b ("P" elements).

Note that in each of FIGS. 41a-41c the sub-regions, pairs of directly adjacent sub-regions actually border one another. Alternatively, use of the underlying primitives, or even the collection of the underlying primitives themselves, can comprise insulating separating "guard bands." Use of these in the construction so as to reduce errors, for example by creating signal space separations akin to Hamming distances. In the aforedescribed figured, this would be depicted as versions of FIGS. 41a-41c wherein the depicted regions do not share borders but instead are separated with gaps between them.

Figures 42A, 42B:
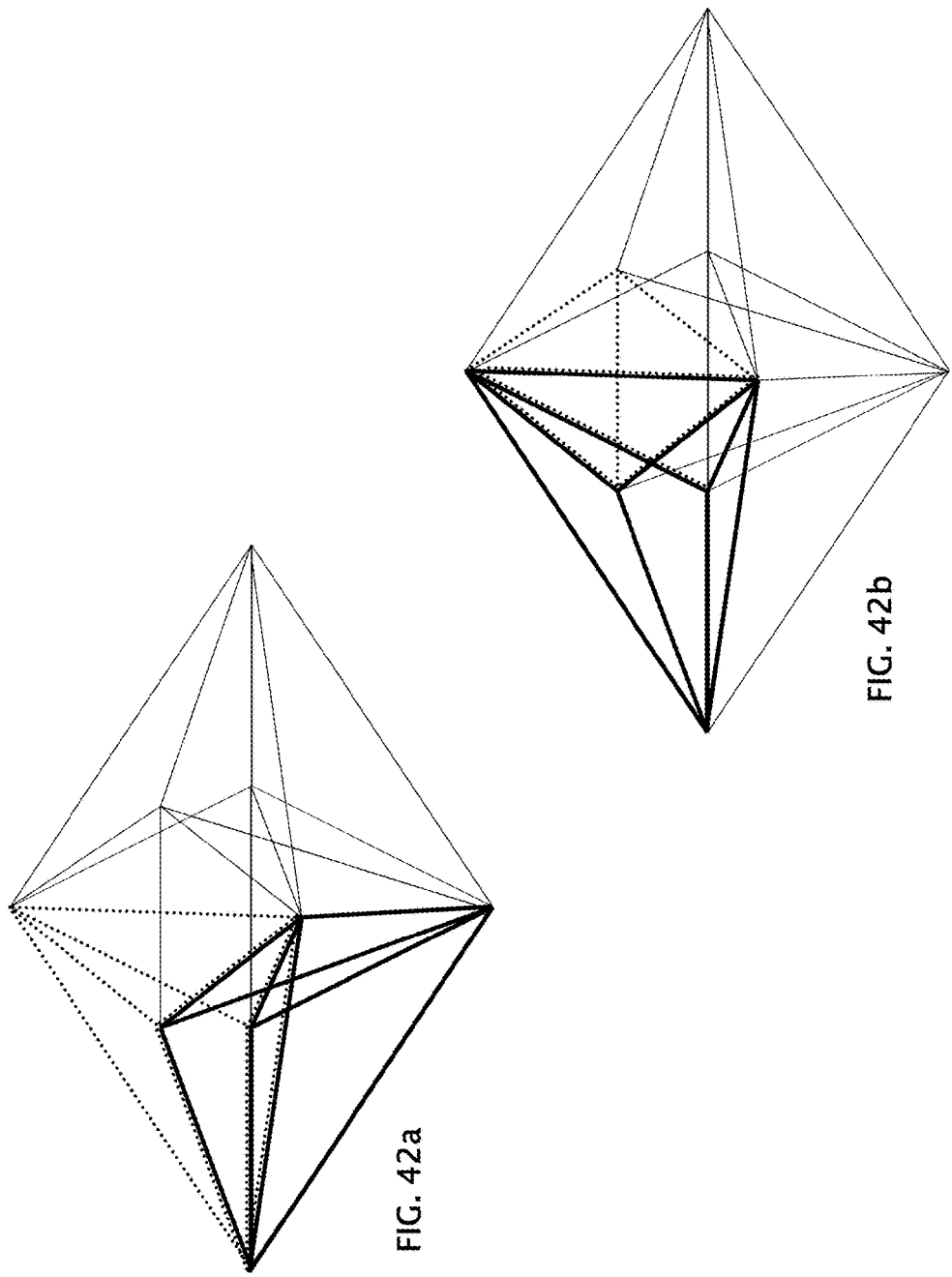
FIGS. 42a and 42b depict an example three-dimensional signal space partitioned into a collection of adjacent sub-regions within the signal space akin to the "P" elements of FIG. 41b, where FIG. 42a further depicts a first highlighted pair of elements that can be joined into a larger sub-region (akin to sub-region $S_1$ in FIG. 41a), while FIG. 42b further depicts a second highlighted pair of elements that can be joined into a larger sub-region (akin to sub-region $T_1$ in FIG. 41c).

FIGS. 42a and 42b depict an example three-dimensional signal space (for example, representing admissible values of {x,y,yaw angle}) which is partitioned into a collection of adjacent sub-regions within the signal space. In an example embodiment, the collection of all individual 'smallest' adjacent sub-regions within the signal space can be viewed as primitives (such as the "P" elements of FIG. 41b in the previous example). FIG. 42a further depicts a first highlighted pair of elements that can be joined into a larger sub-region (for example, akin to sub-region $S_1$ in FIG. 41a), while FIG. 42b further depicts a second highlighted pair of elements that can be joined into a larger sub-region (for example, akin to sub-region $T_1$ in FIG. 41c).

Attention is now redirected to the two-dimensional gesteme signal space example represented by FIGS. 41a-41d. It is noted that upon executing one gesteme it is not always possible, or (in a given design) permissible, to then directly execute all other gestemes with a gradual change in user interface actions (and thus a gradual change in user interface provided parameter values). This is naturally captured by the adjacency and non-adjacency of pairs of sub-regions in the partitioned signal space. For example, gesteme $S_1$ has ranges of parameter values that allow it to continuously lead to gestemes $S_2$, $S_4$ and with care $S_5$ (by crossing the borders gestemes $S_2$, $S_4$ and $S_5$ share with gestemes $S_1$ in FIG. 41a), but gesteme $S_1$ does not have ranges of parameter values that allow it to continuously lead to gestemes $S_3$ or $S_6$ (which do not share a border with gestemes $S_1$ in FIG. 41a).

Accordingly, FIGS. 43a-43c illustrate permitted transitions among symbol-associated signal space elements (representing gestemes) in the example symbol-associated signal spaces depicted in FIGS. 41a-41c, respectively. Associated with these, FIG. 44a illustrates an example table depicting permitted consecutive pairs of transitions between triples of consecutive symbols among symbol-associated signal space elements in the example symbol-associated signal space depicted in FIG. 41a. Similarly, FIG. 44b illustrates an example table depicting permitted consecutive pairs of transitions between triples of consecutive symbols among symbol-associated signal space elements in the example symbol-associated signal space depicted in FIG. 41b, and FIG. 44c illustrates an example table depicting permitted consecutive pairs of transitions between permitted triples of consecutive symbols among symbol-associated signal space elements in the example symbol-associated signal space depicted in FIG. 41 c.

The permitted and non-permitted transitions among symbol-associated signal space elements (representing gestemes) thus define the available gestures that can be continuously executed (i.e., akin to cursive writing where the writing instrument is not lifted from the page as a word is written). To illustrate the implications of this further, consideration is for the next discussion segment directed to the example of collections of gestures that are comprised of gestemes that comprise exactly three primitives, and although earlier the 8-member collection of $P_1$ through $P_g$ depicted in FIG. 41 b were used as primitives, for the following illustrative discussion we take the 6-member collection of $S_1$ through $S_6$ depicted in FIG. 41a as the set of primitives (so as to reduce the number of combinations that must be considered, as will be seen). Thus, in the illustrative discussion to follow, consideration is directed to the example of the collections of gestures comprised of gestemes that in turn comprise exactly three primitives 6-member collection of $S_1$ through $S_6$ depicted in FIG. 41a.

Figure 45:
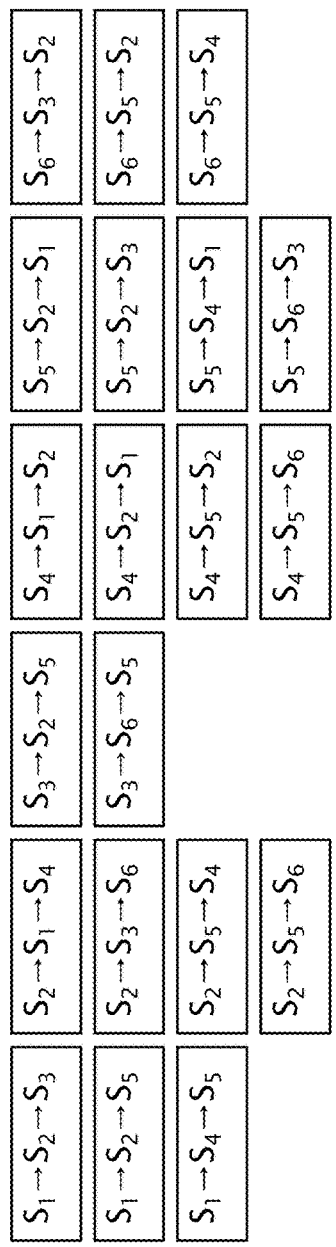

To begin, FIG. 45 illustrates an example organization of permitted triples (3 primitive sequence) of permissible consecutive primitives from the 6-member collection of $S_1$ through $S_6$ depicted in FIG. 41a. In FIG. 45 these triples are arranged into columns organized by the first primitive in the triple.

FIG. 46a and FIG. 46b illustrates an example organization of permitted consecutive pairs of triples of consecutive primitives, this beginning with triple comprising primitive $S_1$ that retraces back to primitive $S_1$. In one application, this effectively provides a list of gestemes (beginning with primitive $S_1$ and a retracing) that can be executed in sequence without interruption.

FIG. 47a-FIG. 47c illustrates an example organization of permitted consecutive pairs of triples of consecutive primitives, this beginning with triple comprising primitive $S_2$ that retraces back to primitive $S_2$. In one application, this effectively provides a list of gestemes (beginning with primitive $S_2$ and a retracing) that can be executed in sequence without interruption.

FIG. 48a and FIG. 48b illustrates an example organization of permitted consecutive pairs of triples of consecutive primitives, this beginning with triple comprising primitive $S_3$ that retraces back to primitive $S_3$. In one application, this effectively provides a list of gestemes (beginning with primitive $S_3$ and a retracing) that can be executed in sequence without interruption.

FIG. 49a-FIG. 49c illustrates an example organization of permitted consecutive pairs of triples of consecutive primitives, this beginning with triple comprising primitive $S_4$ that retraces back to primitive $S_4$. In one application, this effectively provides a list of gestemes (beginning with primitive $S_4$ and a retracing) that can be executed in sequence without interruption.

FIG. 50a-FIG. 50c illustrates an example organization of permitted consecutive pairs of triples of consecutive primitives, this beginning with triple comprising primitive $S_5$ that retraces back to primitive $S_5$. In one application, this effectively provides a list of gestemes (beginning with primitive $S_5$ and a retracing) that can be executed in sequence without interruption.

FIG. 51a and FIG. 51b illustrates an example organization of permitted consecutive pairs of triples of consecutive primitives, this beginning with triple comprising primitive $S_6$ that retraces back to primitive $S_6$. In one application, this effectively provides a list of gestemes (beginning with primitive $S_6$ and a retracing) that can be executed in sequence without interruption.

FIG. 52a-FIG. 52c illustrates an example organization of permitted consecutive pairs of triples of consecutive primitives, this beginning with triple comprising primitive $S_1$ that does not retrace back to primitive $S_1$. In one application, this effectively provides a list of gestemes (beginning with primitive $S_1$ and with no retracing) that can be executed in sequence without interruption.

FIG. 53a-FIG. 53d illustrates an example organization of permitted consecutive pairs of triples of consecutive primitives, this beginning with triple comprising primitive $S_2$ that retraces back to primitive $S_2$. In one application, this effectively provides a list of gestemes (beginning with primitive $S_2$ and with no retracing) that can be executed in sequence without interruption.

Figures 54A, 54B:
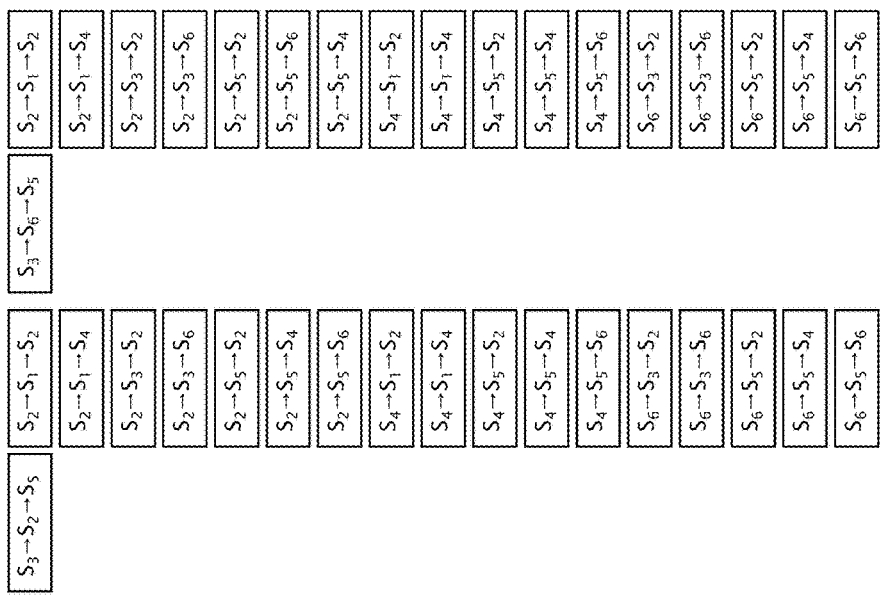
FIG. 54a and FIG. 54b illustrates an example organization of permitted consecutive pairs of triples of consecutive primitives, this beginning with triple comprising primitive $S_3$ that does not retrace back to primitive $S_3$.

FIG. 54a and FIG. 54b illustrates an example organization of permitted consecutive pairs of triples of consecutive primitives, this beginning with triple comprising primitive $S_3$ that does not retrace back to primitive $S_3$. In one application, this effectively provides a list of gestemes (beginning with primitive $S_3$ and with no retracing) that can be executed in sequence without interruption.

FIG. 55a-FIG. 55d illustrates an example organization of permitted consecutive pairs of triples of consecutive primitives, this beginning with triple comprising primitive $S_4$ that does not retrace back to primitive $S_4$. In one application, this effectively provides a list of gestemes (beginning with primitive $S_4$ and with no retracing) that can be executed in sequence without interruption.

FIG. 56a-FIG. 56d illustrates an example organization of permitted consecutive pairs of triples of consecutive primitives, this beginning with triple comprising primitive $S_5$ that does not retrace back to primitive $S_5$. In one application, this effectively provides a list of gestemes (beginning with primitive $S_5$ and with no retracing) that can be executed in sequence without interruption.

FIG. 57a-FIG. 57c illustrates an example organization of permitted consecutive pairs of triples of consecutive primitives, this beginning with triple comprising primitive $S_6$ that does not retrace back to primitive $S_6$. In one application, this effectively provides a list of gestemes (beginning with primitive $S_6$ and with no retracing) that can be executed in sequence without interruption.

Figure 58:
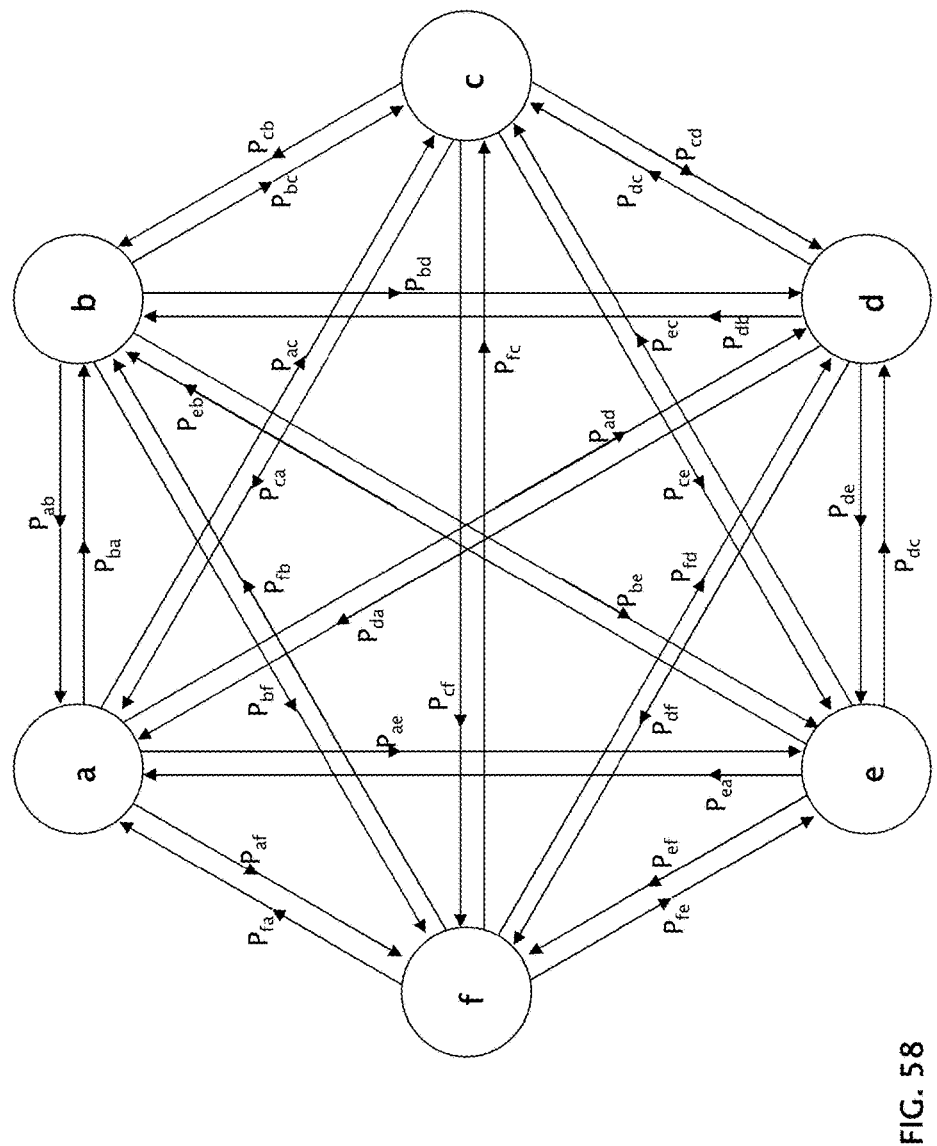
FIG. 58 illustrates an example general state transition map among six elements that does not include stationary-state transition steps.
Figure 59:
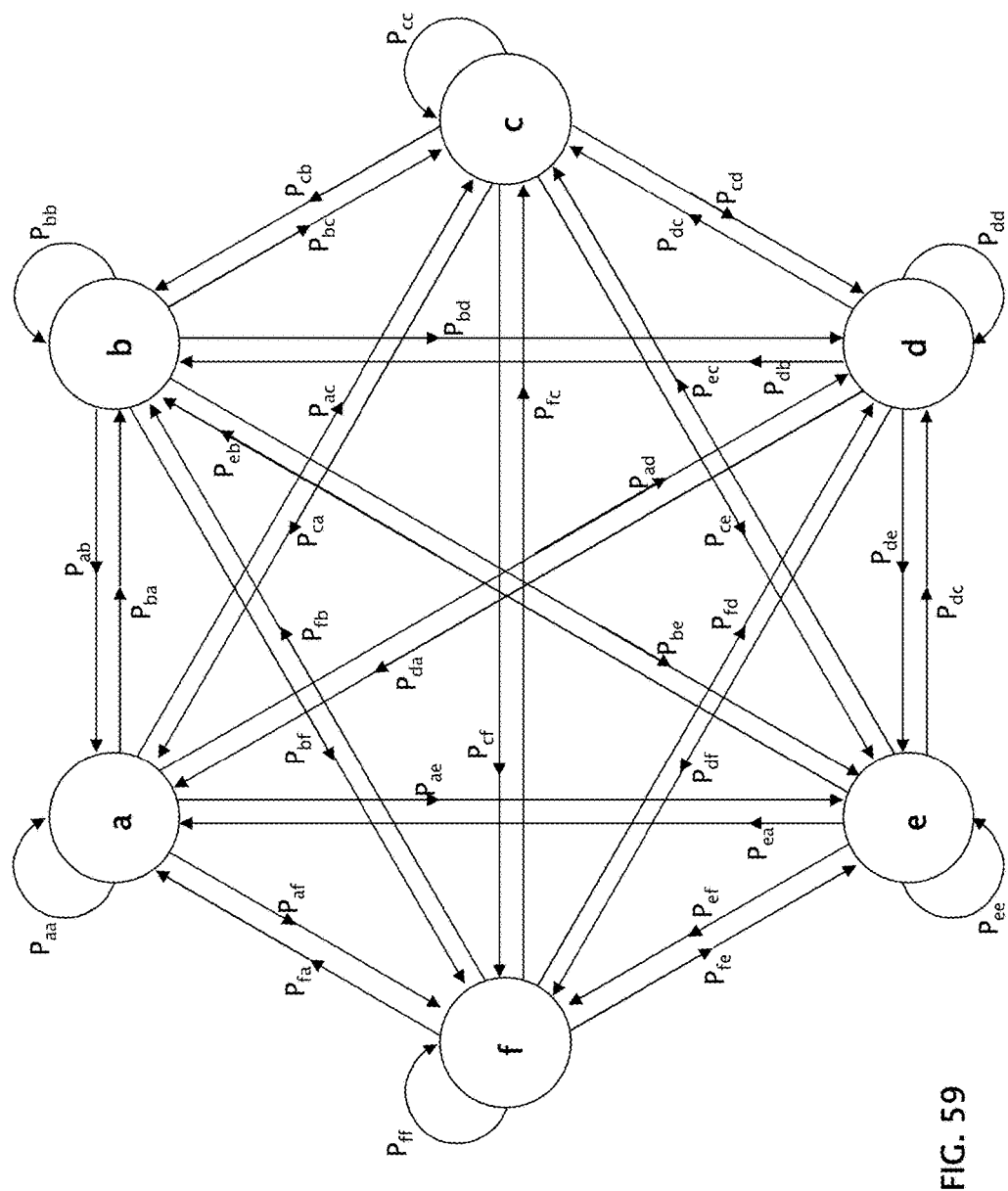
FIG. 59 illustrates an example general state transition map among six elements that does include stationary-state transition steps.

The above example concludes the consideration is directed to the example of the collections of gestures comprised of gestemes that in turn comprise exactly three primitives 6-member collection of $S_1$ through $S_6$ depicted in FIG. 41a. More broadly permitted transitions among rendered primitives, as well as permitted transitions among rendered gestemes, can be represented as a state transition map. FIG. 58 illustrates an example general (stochastic or non-stochastic) state transition map among six elements that does not include stationary-state transition steps. FIG. 59 illustrates an example general (stochastic or non-stochastic) state transition map among six elements that does include stationary-state transition steps.

Figure 61:
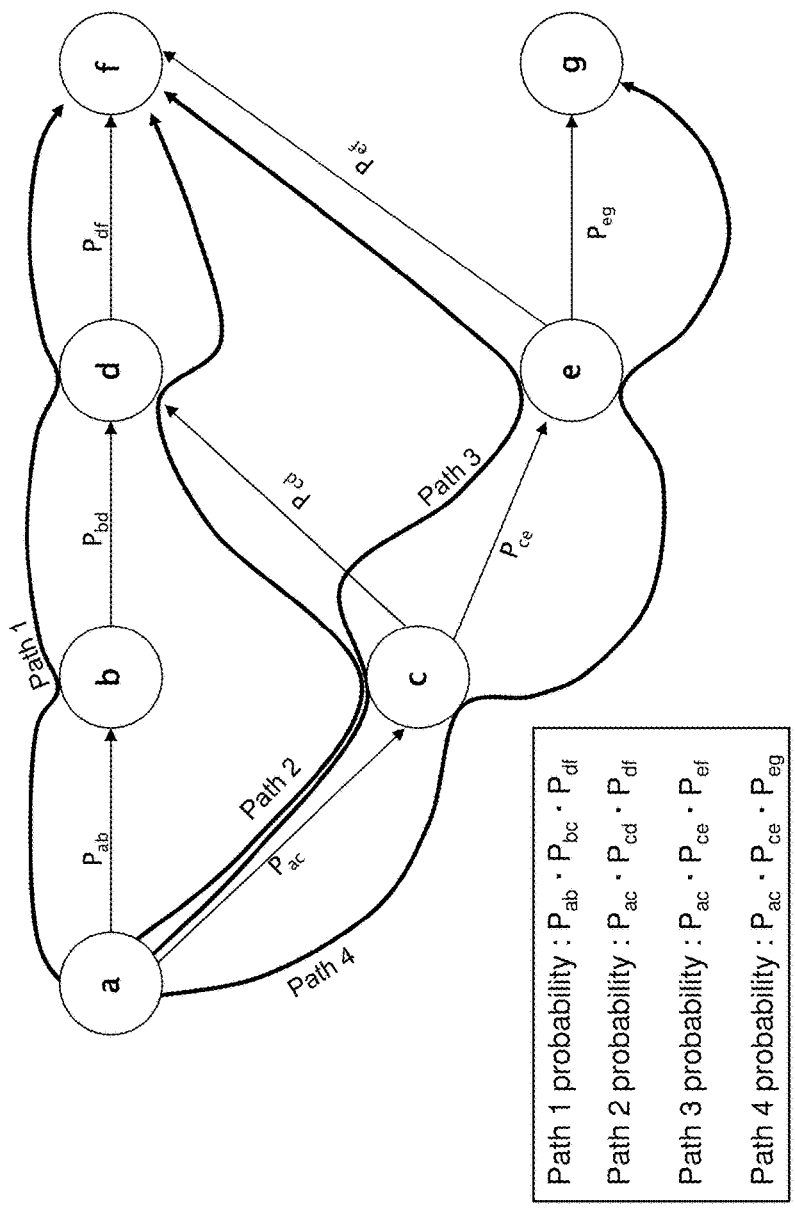
FIG. 61 illustrates an example stochastic state transition map associated with an example signal space, and the composite probabilities for four example trajectories through the permitted pairwise transitions.
Figure 63A:
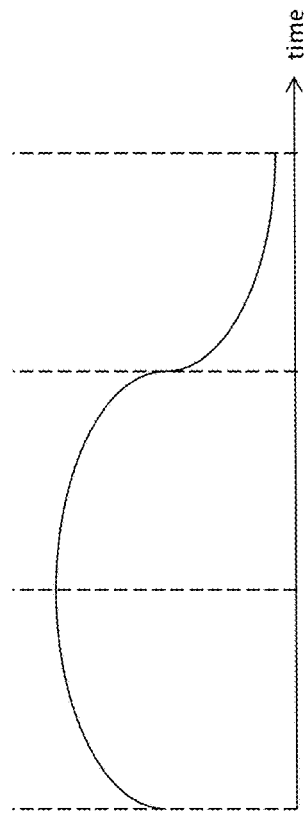
Figure 63B:
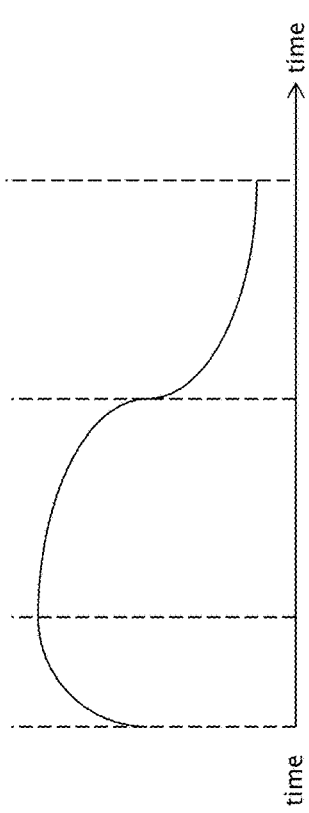
Figure 63C:
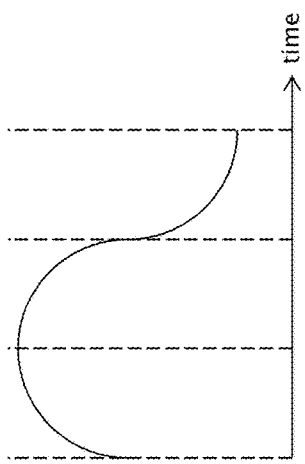
Figure 63D:
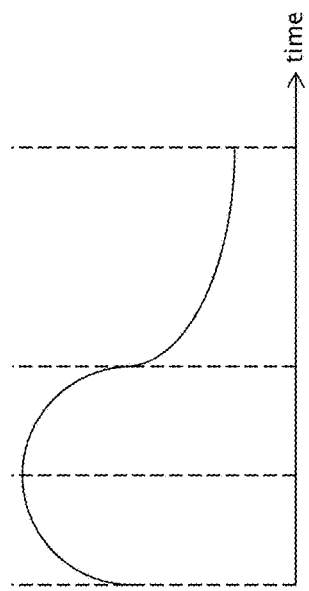

The aforedescribed state transition map can be represented as a matrix mapping current states to next states. Typically the matrix is fixed and does not vary over time, although the invention provides for a time-varying state transition matrix representing permitted transitions among rendered primitives or permitted transitions among rendered gestemes. Further, if the elements in the state transition map are (properly uniformly-normalized conditional) probabilities, the matrix is a stochastic matrix as commonly used in Markov chain representations, and as such can be used in the formulation of Hidden Markov Models for use in the invention. FIG. 60a illustrates an example general stochastic state transition matrix associated with the stochastic state transition map depicted in FIG. 58. FIG. 60b illustrates an example general stochastic state transition matrix associated with the stochastic state transition map depicted in FIG. 59. FIG. 61 illustrates an example stochastic state transition map associated with an example signal space, and the composite probabilities for four example trajectories through the permitted pairwise transitions. FIG. 62 illustrates an example stochastic state transition matrix associated with the stochastic state transition map depicted in FIG. 62.

Temporal Gesture Prosody

Temporal gesture prosody was considered earlier. Here some additional considerations, uses, and applications are considered. To maintain the spirit of previous examples, consideration given to the temporal rendering of gestemes or gestures that comprise three elements—that is gestemes that comprise three primitives, or gestures that comprise three gestemes. Further, for illustration, the examples to be provided quantize the recognized rendering speed into two values—"fast" ("F") and "slow" ("S").

FIG. 63a-FIG. 63h illustrate example variations in prosody for an example "sideways hook" gesteme or gesture with only one parameter variation (vertical position or "y" value). The three comprised elements and two recognized execution speeds give rise to the 8 easily user-rendered cases illustrated in FIG. 63a-FIG. 63h. Thus, the simple incorporation of two-speed prosody recognition in this simple setting magnifies the potential semantic content of the gesteme or gesture rendering by a factor of as much as eight.

Figure 64A:
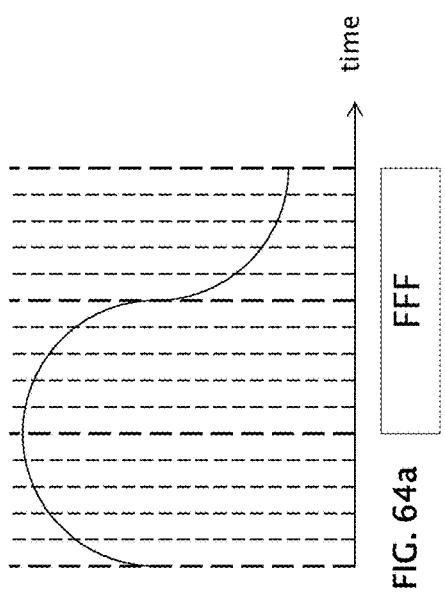
FIG. 64a and FIG. 64b illustrate example samplings of gesteme or gesture measurements.
Figure 64B:
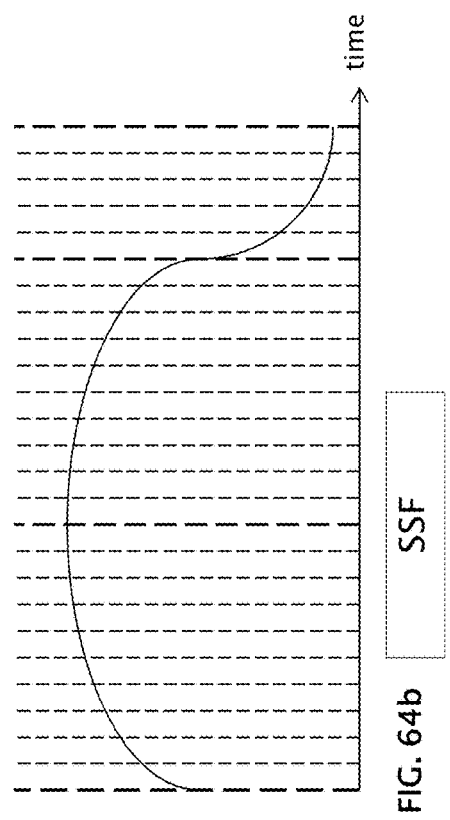
Figure 64C:
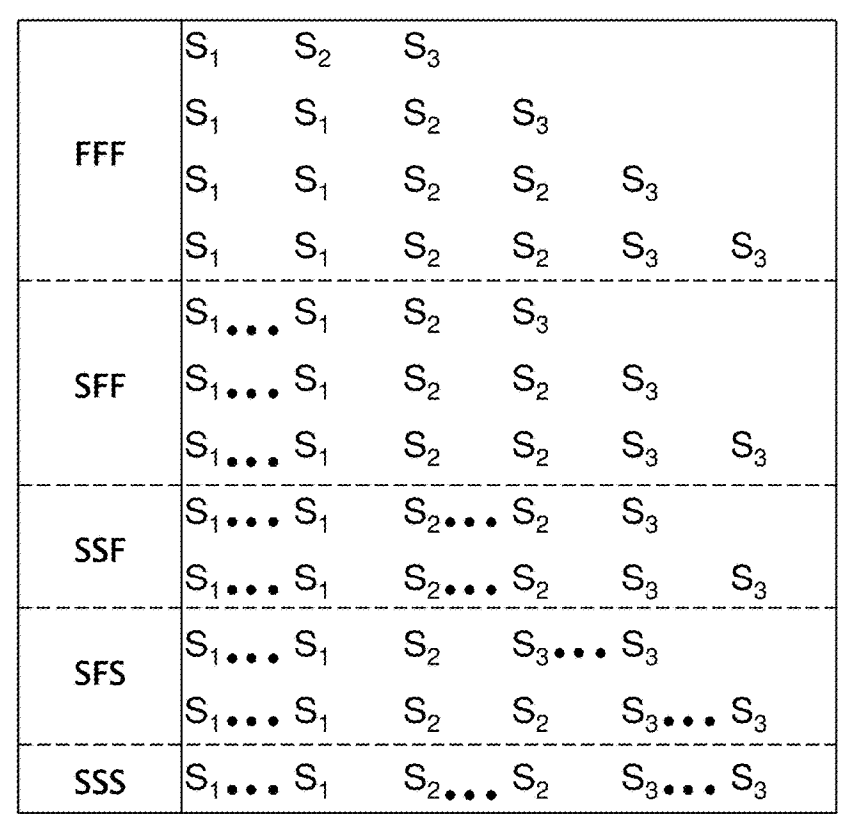

As described earlier in conjunction with FIG. 28, periodic or near-periodic sampling is typically involved in user interface hardware measurement acquisition. As a result, this periodic or near-periodic sampling drives the information stream presented to the analysis systems described above. FIG. 64a and FIG. 64b illustrate an example sampling of gesteme or gesture measurements. Note that each of the three elements of the gesteme or gesture experience the duration of multiple times. This effectively gives rise a situation where each primitive or gesteme can be associated with the associated number of sampling intervals it experiences during its rendering. For example, as illustration, let the three elements be the (by now old friends) $S_1$, $S_2$, and $S_3$. FIG. 64c illustrates an example sample sequences associated with five of the cases in the examples of FIG. 63a-FIG. 63h. The prosody of each element can be determined by counting the corresponding sample intervals experienced during its rendering. Accordingly, the measurement of prosody need not be limited tow two values. As semantic power illustration of the implications, consider now recognizing three levels of temporal prosody. FIG. 65a-FIG. 65c illustrate example variations in prosody for an example gesture with only one parameter variation and three recognized execution speeds. This results in there being 27 possible cases. Thus two-three levels of recognized execution speeds, these being a number easily operable by users, gives rise to immense multiplications of potential semantic content.

Applications of Prosody

Figure 66A:
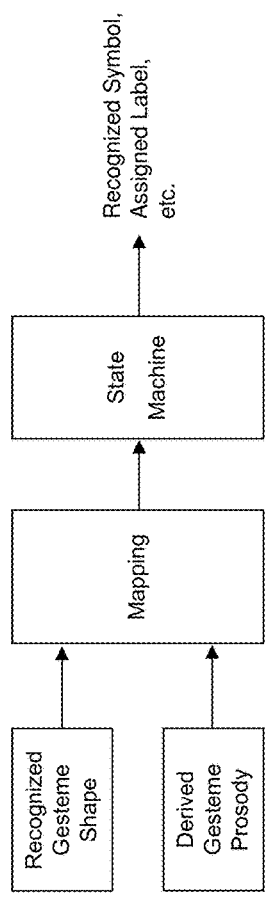
FIG. 66a illustrates an example wherein sequences of recognized gesteme shape and derived gesteme prosody are combined in a mapping to determine a composite value that is then directed to a state machine that provides a recognized symbol, assigned label, etc. In an example alternate implementation.
Figure 66B:
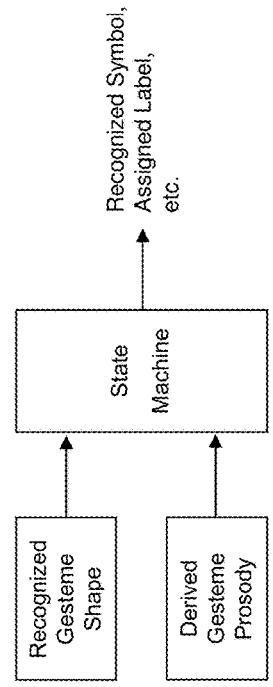
FIG. 66b illustrates an example wherein sequences of recognized gesteme shape and derived gesteme prosody are provided directly to a state machine that provides a recognized symbol, assigned label, etc.

The various types of prosody (temporal, shape, and other forms) can be used to directly determine the meaning or interpretation of a gesture. For example FIG. 66a illustrates an example wherein sequences of recognized gesteme shape and derived gesteme prosody are combined in a mapping to determine a composite value that is then directed to a state machine that provides a recognized symbol, assigned label, etc. In an example alternate implementation, FIG. 66b illustrates an example wherein sequences of recognized gesteme shape and derived gesteme prosody are provided directly to a state machine that provides a recognized symbol, assigned label, etc.

Figure 67A:
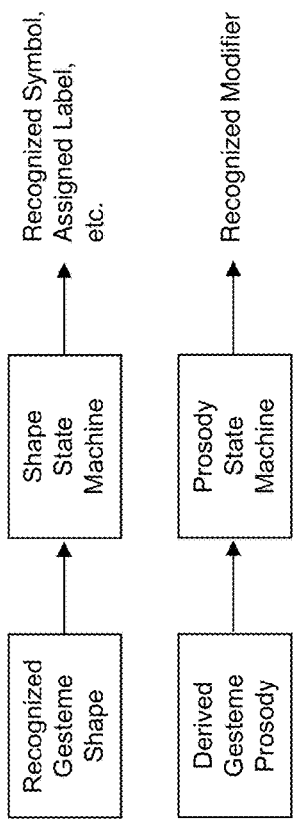
FIG. 67a illustrates an example wherein derived gesteme prosody is processed by a prosody state machine and subsequently provided as a modifier via a secondary channel while the recognized gesteme shape is directed to a separate "shape" state machine that provides a recognized symbol, assigned label, etc.
Figure 67B:
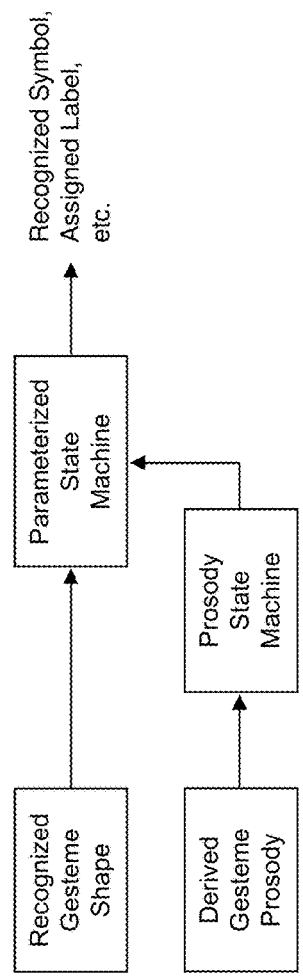
FIG. 67b illustrates an example derived gesteme prosody that is used to control a parameterized state machine that provides a recognized symbol, assigned label, etc.

The various types of prosody (temporal, shape, and other forms) can be used to modify the meaning or interpretation of a gesture. As an illustration, FIG. 67a illustrates an example wherein derived gesteme prosody is processed by a prosody state machine and subsequently provided as a modifier via a secondary channel while the recognized gesteme shape is directed to a separate "shape" state machine that provides a recognized symbol, assigned label, etc. In an example alternate approach, FIG. 67b illustrates an example derived gesteme prosody is used to control a parameterized state machine that provides a recognized symbol, assigned label, etc.

Figure 68:
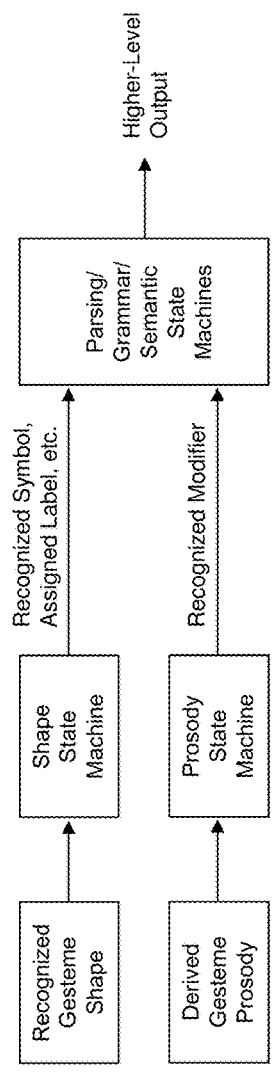
FIG. 68 illustrates an example wherein the arrangement of FIG. 67a is directed to one or more state machines associated with parsing, grammar, and/or semantics that can be used to implement more advanced gesture grammar arrangements.
Figure 69:
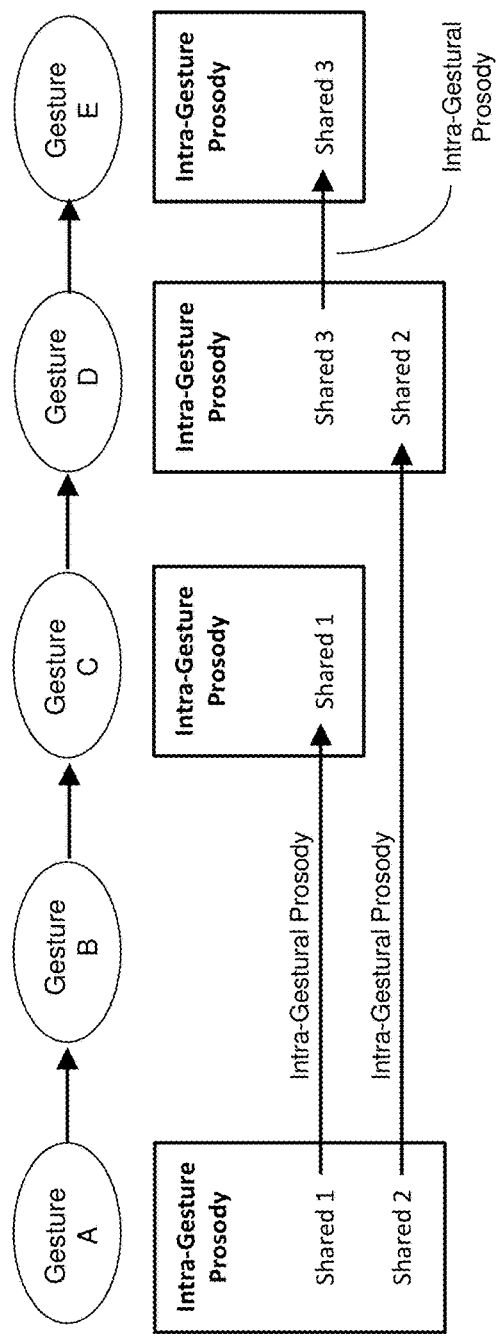
FIG. 69, adapted from U.S. patent application Ser. Nos. 13/414,705 and 13/464,946, illustrates an example arrangement wherein prosody of various gestures can be used to create grammatical linkages that transcend gesture order.
Figure 70:
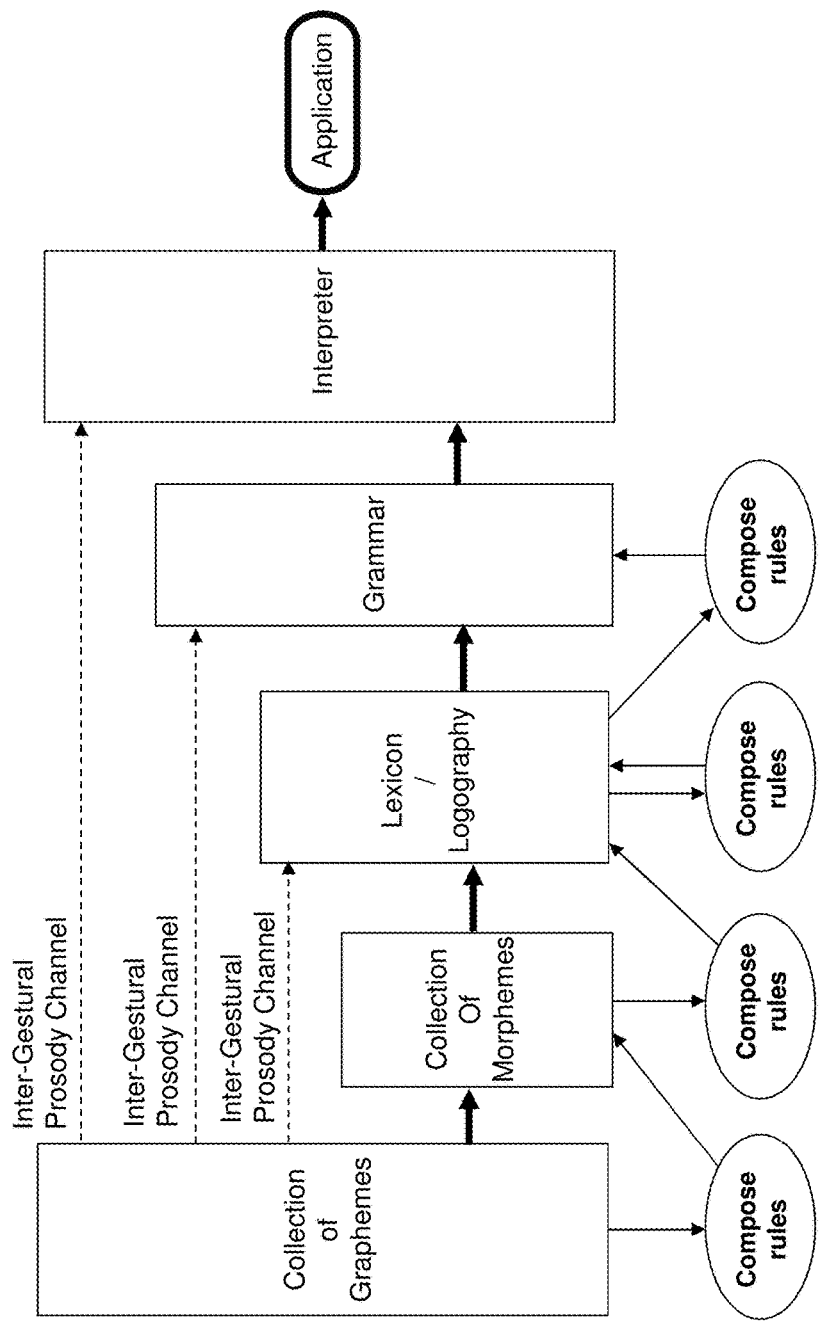
FIG. 70, adapted from U.S. patent application Ser. Nos. 13/414,705 and 13/464,946, illustrates an example general arrangement wherein prosody actions spanning two or more gestures can be directed to various levels in a semantic hierarchy.

The various types of prosody (temporal, shape, and other forms) can be used as part of a larger grammatical structure. As an implementation example, FIG. 68 illustrates an example wherein the arrangement of FIG. 67a is directed to one or more state machines associated with parsing, grammar, and/or semantics. Such an arrangement, for example, can be used to implement more advanced gesture grammar arrangements. For example, FIG. 69, adapted from U.S. patent application Ser. Nos. 13/414,705 and 13/464,946, illustrates an example sophisticated arrangement wherein gesteme prosody of various gestures can be used to create grammatical linkages that transcend gesture order. As another example, FIG. 70, also adapted from U.S. patent application Ser. Nos. 13/414,705 and 13/464,946, illustrates an example general arrangement wherein prosody actions spanning two or more gestures can be directed to various levels in a semantic hierarchy.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for the embodiments may be realized in any combination desirable for each particular application. Thus particular limitations and embodiment enhancements described herein, which may have particular advantages to a particular application, need not be used for all applications. Also, not all limitations need be implemented in methods, systems, and apparatuses including one or more concepts described with relation to the provided embodiments. Therefore, the invention properly is to be construed with reference to the claims.

What is claimed is:

1. A system for implementing a user interface, the system comprising:
   a finger touch sensing arrangement for generating tactile sensing measurements of one or more finger-rendered non-writing touch gestures from a set of non-writing gestures, the tactile sensing measurements in response to tactile input on the user interface without graphically rendering the tactile contact path on a visual screen, each non-writing gesture comprising a sequence of at least two gestemes, each gesteme comprising a primitive element of finger-rendered tactile input comprised by at least one non-writing gesture from the set of gestures; and
   a processor for receiving the tactile sensing measurements and executing instructions to:
      generate at least one gesteme recognition event responsive to the detection of a gesteme from the tactile sensing measurements,
      process a sequence of gesteme recognition events to generate a non-writing gesture recognition event, wherein a non-writing gesture corresponds to a particular temporally-ordered sequence of gestemes, and
      generate user interface output signals responsive to the non-writing gesture recognition event.

2. The system of claim 1 wherein each gesteme is comprised of at least one primitive.

3. The system of claim 2, wherein the processor further executes instructions to generate a primitive recognition event responsive to the detection of a primitive.

4. The system of claim 3, wherein the gesteme recognition event is responsive to a sequence of primitive recognition events.

5. The system of claim 4 wherein the primitive is detected by a vector quantization operation acting on a vector of user interface parameter values, the user interface parameter values calculated from tactile sensing measurements.

6. The system of claim 4 wherein the primitive is detected by a vector quantization operation acting on a sequence of user interface parameter values, the user interface parameter values calculated from tactile sensing measurements.

7. The system of claim 4 wherein a plurality of different gestemes comprise at least one specific primitive.

8. The system of claim 1 wherein a plurality of different gestures comprise at least one specific gesteme.

9. The system of claim 1 wherein the gesteme recognition event comprises shape recognition.

10. The system of claim 1 wherein the gesteme recognition event comprises prosody recognition.

11. The system of claim 10 wherein the gesture prosody recognition comprises temporal gesture prosody.

12. The system of claim 10 wherein the gesture prosody recognition comprises gesture shape prosody.

13. The system of claim 10 wherein the gesture prosody comprises modulation of at least one user interface parameter.

14. The system of claim 1 wherein the gesteme recognition event is accompanied by gesteme prosody recognition.

15. The system of claim 14 wherein the gesture prosody recognition comprises temporal gesture prosody.

16. The system of claim 14 wherein the gesture prosody recognition comprises gesture shape prosody.

17. The system of claim 14 wherein the gesture prosody recognition modifies the interpretation of the gesteme recognition event.

18. The system of claim 14 wherein the gesture prosody comprises modulation of at least one user interface parameter.

19. The system of claim 1 wherein the gesture prosody recognition modifies the interpretation of the gesture recognition event.

20. The system of claim 1 wherein gesture prosody is used as part of gesture grammar arrangement.

21. The system of claim 1 wherein the tactile sensing of the tactile input on the user interface comprises multi-dimensional posture detection.

22. The system of claim 1 wherein a prosody of the temporally-ordered sequence of gestemes is used as part of a larger grammatical structure.

23. The system of claim 1 wherein the user interface output signals control a behavior of a software application.

24. The system of claim 1 wherein the user interface output signals control a behavior of an operating system.

* * * * *